(12) United States Patent
Zhou et al.

(10) Patent No.: US 12,082,020 B2
(45) Date of Patent: Sep. 3, 2024

(54) IDENTIFYING NULLING WIRELESS NODES FOR DISTRIBUTED MIMO COMMUNICATION IN A WIRELESS NODE CLUSTER

(71) Applicant: QUALCOMM Incorporated, San Diego, CA (US)

(72) Inventors: Yan Zhou, San Diego, CA (US); George Cherian, San Diego, CA (US); Abhishek Pramod Patil, San Diego, CA (US); Alfred Asterjadhi, San Diego, CA (US); Venkata Ramanan Venkatachalam Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 16/926,479

(22) Filed: Jul. 10, 2020

(65) Prior Publication Data

US 2020/0413278 A1 Dec. 31, 2020

Related U.S. Application Data

(63) Continuation of application No. 15/916,141, filed on Mar. 8, 2018, now Pat. No. 10,750,395.
(Continued)

(51) Int. Cl.
*H04W 24/10* (2009.01)
*H04B 7/024* (2017.01)
(Continued)

(52) U.S. Cl.
CPC ............ *H04W 24/10* (2013.01); *H04B 7/024* (2013.01); *H04B 7/0413* (2013.01);
(Continued)

(58) Field of Classification Search
None
See application file for complete search history.

(56) References Cited

U.S. PATENT DOCUMENTS

| 7,804,800 B2 | 9/2010 | Li et al. |
| 8,787,341 B2 | 7/2014 | Sohn et al. |
| (Continued) | | |

FOREIGN PATENT DOCUMENTS

| CN | 102648472 A | 8/2012 |
| CN | 104365164 A | 2/2015 |
| (Continued) | | |

OTHER PUBLICATIONS

Abusubaih M., et al., "A Framework for Interference Mitigation in Multi-BSS 802.11 Wireless LANs," In Proc. Of 10th IEEE International Symposium on a World of Wireless, Mobile and Multimedia Networks (IEEE WoWMoM 2009), Jun. 2009, pp. 1-11.
(Continued)

*Primary Examiner* — Marcus Smith
(74) *Attorney, Agent, or Firm* — Loza & Loza LLP

(57) ABSTRACT

Various aspects of the disclosure relate to distributed multiple-input multiple-output (MIMO) communication such as coordinated beamforming or Joint MIMO. In some aspects, distributed MIMO is used to support communication in a cluster of wireless nodes (e.g., access points). A distributed MIMO scheduling scheme as taught herein is used to determine each wireless node (e.g., station) in the cluster that needs to be nulled by another wireless node (e.g., an access point). For example, one of the wireless nodes may obtain signal measurement information from the other wireless nodes and thereby generate a list of wireless nodes (e.g., access points) that need to null one or more wireless nodes (e.g., stations).

12 Claims, 58 Drawing Sheets

Related U.S. Application Data

(60) Provisional application No. 62/471,945, filed on Mar. 15, 2017, provisional application No. 62/601,116, filed on Mar. 11, 2017.

(51) Int. Cl.
| | |
|---|---|
| *H04B 7/0413* | (2017.01) |
| *H04B 7/06* | (2006.01) |
| *H04B 17/318* | (2015.01) |
| *H04B 17/336* | (2015.01) |
| *H04B 17/373* | (2015.01) |
| *H04J 11/00* | (2006.01) |
| *H04B 17/21* | (2015.01) |

(52) U.S. Cl.
CPC ........ *H04B 7/0632* (2013.01); *H04B 17/318* (2015.01); *H04B 17/336* (2015.01); *H04B 17/373* (2015.01); *H04J 11/0053* (2013.01); *H04B 7/0617* (2013.01); *H04B 17/21* (2015.01)

(56) References Cited

U.S. PATENT DOCUMENTS

| | | | |
|---|---|---|---|
| 9,191,084 | B2 | 11/2015 | Bao et al. |
| 9,210,694 | B2* | 12/2015 | Lee ..................... H04W 48/20 |
| 9,294,160 | B2 | 3/2016 | Hou et al. |
| 9,392,618 | B2 | 7/2016 | Choi et al. |
| 9,407,347 | B2 | 8/2016 | Chu et al. |
| 9,860,761 | B2 | 1/2018 | Elsherif et al. |
| 9,893,784 | B2 | 2/2018 | Lee et al. |
| 10,750,395 | B2 | 8/2020 | Zhou et al. |
| 11,032,781 | B2* | 6/2021 | Chang ................ H04W 52/243 |
| 11,477,800 | B2 | 10/2022 | Zhou et al. |
| 2003/0031119 | A1 | 2/2003 | Kim et al. |
| 2006/0056340 | A1 | 3/2006 | Hottinen et al. |
| 2010/0311357 | A1 | 12/2010 | Asanuma |
| 2011/0310827 | A1* | 12/2011 | Srinivasa ............ H04L 25/0242 370/329 |
| 2013/0121195 | A1 | 5/2013 | Sundaresan et al. |
| 2014/0056204 | A1 | 2/2014 | Suh et al. |
| 2014/0241240 | A1 | 8/2014 | Kloper et al. |
| 2014/0256341 | A1* | 9/2014 | Nayeb Nazar ...... H04W 72/082 455/452.1 |
| 2014/0304078 | A1 | 10/2014 | Abraham et al. |
| 2014/0328242 | A1 | 11/2014 | Tong et al. |
| 2015/0063327 | A1 | 3/2015 | Barriac et al. |
| 2015/0117324 | A1 | 4/2015 | Ponnuswamy |
| 2015/0124690 | A1 | 5/2015 | Merlin et al. |
| 2015/0156794 | A1 | 6/2015 | Kwon et al. |
| 2015/0201368 | A1 | 7/2015 | Cudak et al. |
| 2015/0264578 | A1 | 9/2015 | Chaves et al. |
| 2015/0270879 | A1 | 9/2015 | Chen et al. |
| 2015/0281993 | A1 | 10/2015 | Chen et al. |
| 2015/0288428 | A1 | 10/2015 | Choi et al. |
| 2015/0334729 | A1 | 11/2015 | Ji et al. |
| 2016/0029226 | A1 | 1/2016 | Aboul-Magd et al. |
| 2016/0029373 | A1 | 1/2016 | Seok |
| 2016/0088637 | A1 | 3/2016 | Suh et al. |
| 2016/0119902 | A1 | 4/2016 | Cheong et al. |
| 2016/0157195 | A1 | 6/2016 | Wang et al. |
| 2016/0198358 | A1 | 7/2016 | Rong et al. |
| 2016/0255620 | A1 | 9/2016 | Li et al. |
| 2016/0269993 | A1 | 9/2016 | Ghosh |
| 2016/0330714 | A1 | 11/2016 | Hedayat |
| 2017/0026853 | A1 | 1/2017 | Aboul-Magd et al. |
| 2017/0034826 | A1 | 2/2017 | Shahar |
| 2017/0063503 | A1* | 3/2017 | Liu ..................... H04B 7/0478 |
| 2017/0070914 | A1 | 3/2017 | Chun et al. |
| 2017/0078052 | A1 | 3/2017 | Matsuo et al. |
| 2017/0104659 | A1 | 4/2017 | Suh et al. |
| 2017/0135085 | A1 | 5/2017 | Kaushik |
| 2017/0163446 | A1 | 6/2017 | Li et al. |
| 2017/0188362 | A1 | 6/2017 | Cariou et al. |
| 2017/0201970 | A1* | 7/2017 | Takano ................ H04L 5/0035 |
| 2017/0264418 | A1 | 9/2017 | Hsu et al. |
| 2017/0339660 | A1* | 11/2017 | Kazmi ............... H04W 64/003 |
| 2018/0020460 | A1* | 1/2018 | Hedayat ............. H04W 72/121 |
| 2018/0152860 | A1 | 5/2018 | Huang et al. |
| 2018/0176901 | A1 | 6/2018 | Huang et al. |
| 2018/0199333 | A1 | 7/2018 | Feng et al. |
| 2018/0213424 | A1 | 7/2018 | Du et al. |
| 2018/0242355 | A1 | 8/2018 | Lou et al. |
| 2018/0263043 | A1 | 9/2018 | Zhou et al. |
| 2018/0263044 | A1 | 9/2018 | Zhou et al. |
| 2018/0263045 | A1 | 9/2018 | Zhou et al. |
| 2018/0279293 | A1* | 9/2018 | Harrison ............. H04B 7/0639 |
| 2018/0375690 | A1 | 12/2018 | Kapetanovic et al. |
| 2019/0013881 | A1 | 1/2019 | Olesen et al. |
| 2019/0150011 | A1 | 5/2019 | Shoji et al. |
| 2019/0306729 | A1 | 10/2019 | Lopes et al. |
| 2020/0059811 | A1* | 2/2020 | Chen .................... H04W 16/14 |
| 2020/0068561 | A1 | 2/2020 | Lan et al. |
| 2021/0007113 | A1 | 1/2021 | Zhou |
| 2021/0045134 | A1 | 2/2021 | Zhou et al. |
| 2021/0045135 | A1 | 2/2021 | Zhou et al. |

FOREIGN PATENT DOCUMENTS

| | | |
|---|---|---|
| CN | 105165100 A | 12/2015 |
| CN | 105230108 A | 1/2016 |
| CN | 105379397 A | 3/2016 |
| CN | 105850212 A | 8/2016 |
| CN | 105874838 A | 8/2016 |
| JP | 2015119392 A | 6/2015 |
| WO | 2010019445 A2 | 2/2010 |
| WO | 2015031487 A1 | 3/2015 |
| WO | 2016040837 A1 | 3/2016 |
| WO | 2016140877 A1 | 9/2016 |
| WO | 2016159849 A1 | 10/2016 |

OTHER PUBLICATIONS

Inoue Y., et al., (NTT): "Improved Spectrum Efficiency for the Next Generation WLANs", 11-12-0820-00-0wng-Improved-spectrum-efficiency-for-the -next-generation-wlans, IEEE SA Mentor; 11-12-0820-00-0wng-improved- spectrum-efficiency-for-the -next-generation-wlans, IEEE-SA Mentor, Piscataway, NJ USA, vol. 802.11 WNG, Jul. 13, 2012, pp. 1-18, XP068039340, [retrieved on Jul. 13, 2012]. International Search Report and Written Opinion—PCT/US2018/021846—ISA/EPO—Jun. 29, 2018.
Ishihara K., et al., "Selective Beamforming for Inter-Cell Interference Mitigation in Coordinated Wireless LANs", 16th International Symposium on Wireless Personal Multimedia Communications (WPMC), NICT, Jun. 24, 2013 (Jun. 24, 2013), pp. 1-5, XP032493950, ISSN: 1347-6890 [retrieved on Oct. 2, 2013].
Ishihara K., et al., "Cooperative Inter-cell Interference Mitigation Scheme with Downlink MU-MIMO Beamforming for Dense Wireless LAN Environment", Wireless Personal Communications, Apr. 2017, vol. 93, No. 3, pp. 661-674.
Ito T., et al., "Improving Wireless LAN Throughput by Using Concurrent Transmissions From Multiple Access Points Based on Location of Mobile Hosts", The 12th IEEE International Workshop on Managing Ubiquitous Communications and Services, 2015, pp. 99-104.
Michaloliakos A., et al., "Efficient MAC for Distributed Multiuser MIMO Systems", IEEE 10th Annual Conference on Wireless On-demand Network Systems and Services (WONS), 2013, pp. 52-59.
Miyamoto S., et al., "Wide-area Centralized Radio Resource Management for DCF-based Multi-hop Ad hoc Wireless Networks", IEEE International Conference on Computing, Networking and Communications, Wireless Networks Symposium, 2014, pp. 710-715.
Syed A.U., et al., "Improving VHT MU-MIMO Communications by Concatenating Long Data Streams in Consecutive Groups", IEEE Wireless Communications and Networking Conference, Workshop, Next Generation WiFi Technology, Mar. 9, 2015, pp. 107-112,

(56) References Cited

OTHER PUBLICATIONS

XP032786281, DOI: 10.1109/WCNCW.2015.7122538 [retrieved on Jun. 11, 2015].

* cited by examiner

IDENTIFYING NULLING WIRELESS NODES FOR DISTRIBUTED MIMO COMMUNICATION IN A WIRELESS NODE CLUSTER

CROSS-REFERENCE TO RELATED APPLICATION(S)

This application is a continuation of patent application Ser. No. 15/916,141 filed in the U.S. Patent and Trademark Office on Mar. 8, 2018. Patent application Ser. No. 15/916,141 claims priority to and the benefit of provisional patent application No. 62/601,116 filed in the U.S. Patent and Trademark Office on Mar. 11, 2017, and provisional patent application No. 62/471,945 filed in the U.S. Patent and Trademark Office on Mar. 15, 2017, the entire content of each of which is incorporated herein by reference.

INTRODUCTION

Various aspects described herein relate to wireless communication and, more particularly but not exclusively, to distributed multiple-input multiple-output (MIMO) communication for a cluster of wireless nodes (e.g., access points).

Some types of wireless communication devices employ multiple antennas to provide a higher level of performance as compared to devices that use a single antenna. One example is multiple-input multiple-output (MIMO) system where a transmitting device uses multiple transmit antennas to send signals to a receiving device that has one or more receive antennas. Another example is a millimeter wave (mmW) system where multiple antennas are used for beamforming (e.g., in the range of 30 GHz, 60 GHz, etc.).

FIG. 1 illustrates a communication system 100 where a mmW access point (AP) 102 communicates with a first mmW station (STA) 104 and a second mmW STA 106 via different beamforming directions. As indicated by a set of beams 108, the mmW AP 102 may communicate via any one of a plurality of directional beams. As indicated by a set of beams 110, the first mmW STA 104 may communicate via any one of a plurality of directional beams. As indicated by a set of beams 112, the second mmW STA 106 may communicate via any one of a plurality of directional beams. For example, the AP 102 may communicate with the first mmW STA 104 via a first beamforming direction 114 and communicate with the second mmW STA 106 via a second beamforming direction 116.

In practice, different devices will transmit (e.g., send beamformed transmissions) on a shared communication resource. However, transmissions by a one device on a particular communication resource may interfere with communication of another device on that same communication resource, even when the signals are beamformed. Thus, there is a need for effective techniques for sharing a communication resource.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication that includes a processing system and an interface. The interface is configured to obtain signal measurement information indicative of channel conditions between a plurality of first wireless nodes and a plurality of second wireless nodes. The processing system is configured to: determine which of the plurality of first wireless nodes is to perform a nulling operation for one or more of the plurality of second wireless nodes, wherein the determination is based on the obtained signal measurement information, and generate a list identifying each of the plurality of first wireless nodes that is to perform a nulling operation for a particular one of the plurality of second wireless nodes, wherein the generation of the list is based on the determination. The interface is further configured to output the list for transmission.

In some aspects, the disclosure provides a method for communication for an apparatus. The method includes: obtaining signal measurement information indicative of channel conditions between a plurality of first wireless nodes and a plurality of second wireless nodes; determining which of the plurality of first wireless nodes is to perform a nulling operation for one or more of the plurality of second wireless nodes, wherein the determination is based on the obtained signal measurement information; generating a list identifying each of the plurality of first wireless nodes that is to perform a nulling operation for a particular one of the plurality of second wireless nodes, wherein the generation of the list is based on the determination; and outputting the list for transmission.

In some aspects, the disclosure provides an apparatus configured for communication. The apparatus includes: means for obtaining signal measurement information indicative of channel conditions between a plurality of first wireless nodes and a plurality of second wireless nodes; means for determining which of the plurality of first wireless nodes is to perform a nulling operation for one or more of the plurality of second wireless nodes, wherein the determination is based on the obtained signal measurement information; means for generating a list identifying each of the plurality of first wireless nodes that is to perform a nulling operation for a particular one of the plurality of second wireless nodes, wherein the generation of the list is based on the determination; and means for outputting the list for transmission.

In some aspects, the disclosure provides a wireless node. The wireless node includes a processing system, a receiver, and a transmitter. The receiver is configured to receive signal measurement information indicative of channel conditions between a plurality of first wireless nodes and a plurality of second wireless nodes. The processing system is configured to: determine which of the plurality of first wireless nodes is to perform a nulling operation for one or more of the plurality of second wireless nodes, wherein the determination is based on the received signal measurement information, and generate a list identifying each of the plurality of first wireless nodes that is to perform a nulling operation for a particular one of the plurality of second wireless nodes, wherein the generation of the list is based on the determination. The transmitter is configured to transmit the list.

In some aspects, the disclosure provides a computer-readable medium (e.g., a non-transitory computer-readable medium) storing computer-executable code. The computer-executable code includes code to: obtain signal measurement information indicative of channel conditions between a plurality of first wireless nodes and a plurality of second wireless nodes; determine which of the plurality of first wireless nodes is to perform a nulling operation for one or more of the plurality of second wireless nodes, wherein the determination is based on the obtained signal measurement information; generate a list identifying each of the plurality of first wireless nodes that is to perform a nulling operation for a particular one of the plurality of second wireless nodes, wherein the generation of the list is based on the determination; and output the list for transmission.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
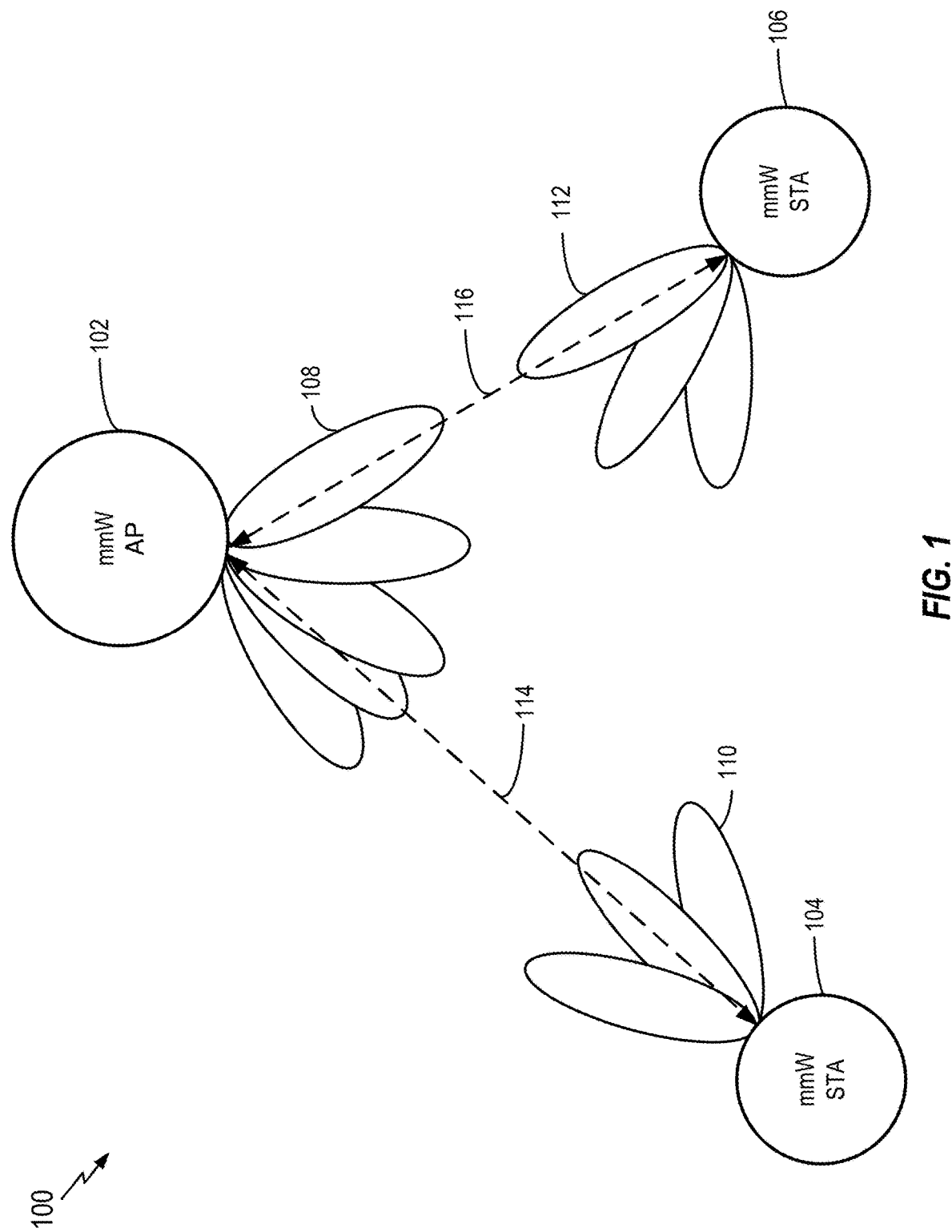
FIG. 1 illustrates an example of a wireless communication system in which aspects of the present disclosure may be employed.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may include at least one element of a claim. For example, a method of communication may include: obtaining signal measurement information indicative of channel conditions between a plurality of first wireless nodes and a plurality of second wireless nodes; determining which of the plurality of first wireless nodes is to perform a nulling operation for one or more of the plurality of second wireless nodes, wherein the determination is based on the obtained signal measurement information; generating a list identifying each of the plurality of first wireless nodes that is to perform a nulling operation for a particular one of the plurality of second wireless nodes, wherein the generation of the list is based on the determination; and outputting the list for transmission.

A wireless MIMO system may use multiple transmit antennas to provide beamforming-based signal transmission. Typically, beamforming-based signals transmitted from different antennas are adjusted in phase (and optionally amplitude) such that the resulting signal power is focused toward a receiver device (e.g., an access terminal).

A wireless MIMO system may support communication for a single user at a time or for several users concurrently. Transmissions to a single user (e.g., a single receiver device) are commonly referred to as single-user MIMO (SU- MIMO), while concurrent transmissions to multiple users are commonly referred to as multi-user MIMO (MU-MIMO).

MIMO may be used in a wireless local area network (WLAN) that supports IEEE 802.11ax or some other 802.11-based standard. An access point (e.g., a base station) of an 802.11-based MIMO system employs multiple antennas for data transmission and reception, while each user STA (which may be referred to as a user equipment) employs one or more antennas. The access point communicates with the STAs via forward link channels and reverse link channels. In some aspects, a downlink (DL) channel refers to a communication channel from a transmit antenna of the access point to a receive antenna of a STA, and an uplink (UL) channel refers to a communication channel from a transmit antenna of a STA to a receive antenna of the access point. Downlink and uplink may be referred to as forward link and reverse link, respectively.

MIMO channels corresponding to transmissions from a set of transmit antennas to a receive antenna are referred to spatial streams since precoding (e.g., beamforming) is employed to direct the transmissions toward the receive antenna. Consequently, in some aspects each spatial stream corresponds to at least one dimension. A MIMO system thus provides improved performance (e.g., higher throughput and/or greater reliability) through the use of the additional dimensionalities provided by these spatial streams.

Various aspects of the disclosure relate to distributed MIMO communication which may be referred to or implemented using, for example, coordinated beamforming (COBF), joint MIMO, multiple basis service set (multi-BSS) joint communication, or orthogonal frequency division multiple access (OFDMA) communication. In some aspects, distributed MIMO is used to support communication in a cluster of access points. For example, a distributed MIMO scheduling scheme as taught herein may be used to schedule COBF transmissions by the access points and/or stations operating within the cluster, where nulling is scheduled as needed to mitigate interference between these devices. For purposes of illustration, various aspects of the disclosure may be described in the context of COBF or another form of distributed MIMO communication. It should be appreciated, however, that these teachings may be equally applicable to distributed MIMO communication generally and/or other forms of communication. Also, various aspects of the disclosure may be described in the context of UL and/or DL communication. It should be appreciated that these teachings may be equally applicable to other forms of communication (e.g., peer-to-peer communication, etc.).

Access points (APs) that don't use all of their dimensions (e.g., antennas) for communication with their served STAs can be grouped for coordinated beamforming. In some aspects, coordinated beamforming may fully utilize the unused AP dimensions by grouping the dimension-under-utilized APs together in the same time slot. In this case, the unused AP dimensions are used to form nulls to the stations (STAs) of other APs (e.g., other basic service sets, BSSs) of the beamforming group to mitigate interference caused by transmissions from the cluster devices during the time slot. A null may be formed, for example, by configuring the beamforming parameters (e.g., phase) for a set of antennas to reduce interference caused by the nulling device at another device or to reduce interference from another device at the nulling device.

Figure 2:
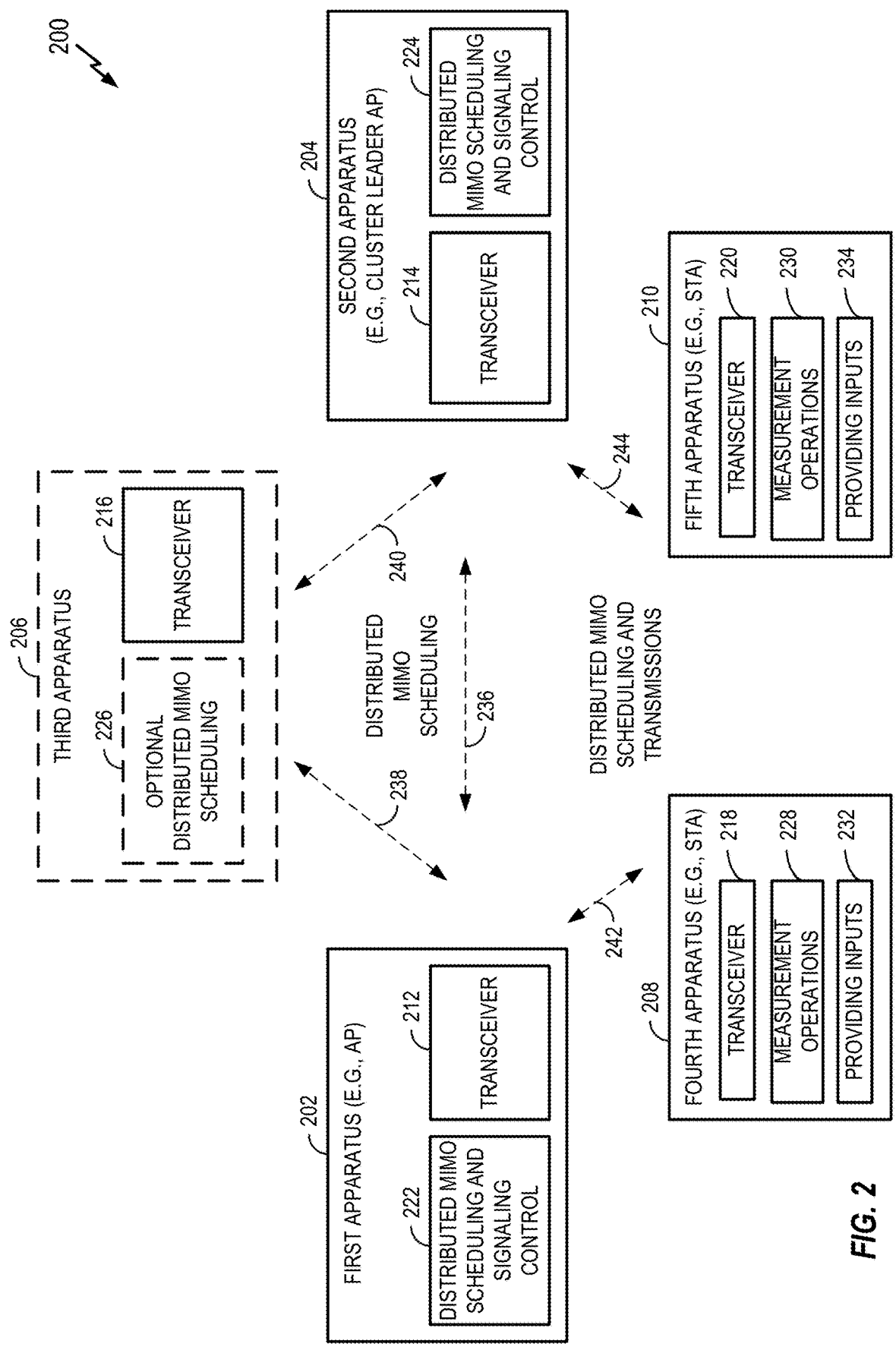
FIG. 2 illustrates another example of a wireless communication system in which aspects of the present disclosure may be employed.

FIG. 2 illustrates a wireless communication system 200 where a first apparatus 202 (e.g., an AP) and a second apparatus 204 (e.g., an AP) are part of a cluster (e.g., a cluster of APs). An optional third apparatus 206 (e.g., a scheduling entity, a central controller, or some other entity) is also shown. The first apparatus 202 serves a fourth apparatus 208 (e.g., a STA). The second apparatus 204 serves a fifth apparatus 210 (e.g., a STA). A different number of apparatuses could be associated with a cluster in other scenarios.

Each of the apparatuses of FIG. 2 includes a respective transceiver 212, 214, 216, 218, or 220 for wireless communication and/or wired communication. The first apparatus 202 includes a transceiver 212 for communicating via a wireless communication medium. The second apparatus 204 includes a transceiver 214 for communicating via the wireless communication medium. The fourth apparatus 208 includes a transceiver 218 for communicating via the wireless communication medium. The fifth apparatus 210 includes a transceiver 220 for communicating via the wireless communication medium. The third apparatus 206 may include a transceiver 216 for communicating via the wireless communication medium. Alternatively, or in addition, communication to and from the third apparatus 206 may be over a wired medium (e.g., a wired backhaul).

The first apparatus 202 and the second apparatus 204 include functionality to schedule distributed MIMO transmissions and to send and receive information used to create the schedule. To this end, the first apparatus 202 includes functionality for distributed MIMO scheduling and signaling control 222 and the second apparatus 204 includes functionality for distributed MIMO scheduling and signaling control 224. For example, the second apparatus 204 (e.g., an AP that is a leader of the cluster, or a group leader) may receive dimension information and station information from the first apparatus 202 (e.g., an AP) to determine how to schedule distributed MIMO transmissions for the cluster. In some implementations, the third apparatus may include functionality for distributed MIMO scheduling 226. For example, the third apparatus 206 may receive dimension information and station information from the first apparatus 202 and the second apparatus 204 to determine how to schedule distributed MIMO transmissions for the cluster. The exchange of this and other scheduling-related information is represented by the communication symbols 236, 238, and 240 in FIG. 2.

Any of the first apparatus 202, the second apparatus 204, and the third apparatus 206 may obtain information from the fourth apparatus 208 and the fifth apparatus 210 to facilitate distributed MIMO scheduling. To this end, the fourth apparatus 208 includes functionality for measurement operations 228 and functionality for providing inputs for the scheduling 232. In addition, the fifth apparatus 210 includes functionality for measurement operations 230 and functionality for providing inputs for the scheduling 234. The exchange of this and other information as well as the scheduled distributed MIMO transmissions between the first apparatus 202, the second apparatus 204, the fourth apparatus 208, and the fifth apparatus 210 are represented by the communication symbols 242 and 244 in FIG. 2.

I. Overview

The disclosure relates in some aspects to over-the-air (OTA) scheduling and communication for a cluster that may have unplanned, unmanaged AP deployments (e.g., a dense apartment building). In such a deployment, there might not be a central controller or wired inter-AP communications. However, legacy APs may exist. The scheduling and communication may be generalized as four steps for operations associated with a DL data transmission and as three steps of operation associated with an UL data transmission.

I-A. DL Steps

Referring initially to the DL, in Step 1, an AP forms or joins a cluster. In some cases, the cluster may remain static for a relatively long period of time (e.g., hours or days). An AP that is not currently in a cluster may discover compatible standalone APs with which to form a cluster, or the AP may discover existing clusters in range that the AP can join. The standalone APs and devices (e.g., APs) of the clusters may broadcast AP information and cluster information on their operating channels. Step 1 is not discussed in detail in the following discussion.

Step 2 involves identifying, for each BSS of the cluster, the STAs that are in the BSS and do not need to be nulled (referred to herein as reuse STAs or InBSS STAs) and the STAs that need to be nulled (referred to herein as non-reuse STAs or OBSS STAs). This STA identification may be conducted repeatedly (e.g., once per second or at other times) to track any changes in path loss (PL).

Each AP selects its InBSS STAs to report measured received signal strength indication (RSSIs) or some other channel quality or signal measure from all APs in the cluster. Based on these measurements, the AP determines, for all of these STAs, the identities of the APs that will need to perform a nulling operation. In other words, each AP determines nulling OBSS AP IDs per STA. Measurements can be based on beacons, null data packet (NDP) sounding, a dedicated measurement sequence, or some other form of signaling.

After the measurement phase, an AP may send the results to a scheduler (e.g., a leader AP such as the head of a cluster) or to all of the APs in the cluster. The scheduler or the APs as a group may then use this information in Step 3 to schedule sounding or in Step 4 for DL COBF transmission (Tx). Alternatively, the AP may send the results to these entities as part of reported candidate STA information in Step 3 and Step 4. These and other aspects of Step 2 for DL are discussed in detail in section IV-A that follows.

Step 3 involves DL COBF sounding scheduling and transmission. These operations may be conducted repeatedly (e.g., once every 20 milliseconds, ms). For scheduling, a leader AP may collect candidate STA information from each AP in the cluster, make a sounding scheduling decision based on this information, and announce the sounding scheduling decision. The decision may include the identifiers (IDs) of participating APs (AP IDs), the NDP order or configuration, the IDs of STAs that are to measure each AP's NDP, and the STAs' beamforming report (BFRP) configurations.

In some cases, the scheduling decision may simply be based on the results from Step 2. For example, the scheduling decision might only schedule certain STAs (e.g., those STAs requiring nulling by at least one AP) to measure an NDP.

Once the sounding is scheduled, the sounding transmission is performed. Participating APs execute the sounding sequence based on the sounding decision. These and other aspects of Step 3 for DL are discussed in detail in section V that follows.

Step 4 involves DL COBF data transmission scheduling and transmission. These operations may be conducted repeatedly (e.g., once every 4 ms). For scheduling, the channel access winning AP may collect candidate STA information from each AP in the cluster, make a DL data transmission scheduling decision based on this information, and announce the DL data transmission scheduling decision. The decision may include, for example, the IDs of the scheduled STAs, the stream number (#) per STA (the number of streams per station), the IDs of the nulling OBSS APs per STA, the DL COBF transmission duration and bandwidth (BW), and the UL acknowledgement (ACK) resources per STA. The decision may use the results from Step 2 to ensure that, if needed, a STA is nulled by the appropriate OBSS APs and to ensure that the scheduled STA reports its BFRP to all of its nulling APs in Step 3.

Once the DL COBF data transmission is scheduled, the DL COBF data transmission is performed. Participating APs execute the DL data transmission based on the transmission scheduling decision. These and other aspects of Step 4 for DL are discussed in detail in section VI that follows.

I-B. UL Steps

Referring now to the UL, Step 1 here is the same as Step 1 discussed above for the DL.

As in Step 2 for DL, Step 2 for the UL involves identifying, for each BSS of the cluster, the reuse STAs and non-reuse STAs. Again, this STA identification may be conducted repeatedly (e.g., once per second or at other times) to track any changes in path loss (PL). The manner in which the STAs are identified is slightly different for UL, however.

For UL, each AP estimates the UL RSSI (or some other channel quality or signal measure) that each of its InBSS STAs causes at each AP in the cluster. The AP then determines the IDs of the OBSS APs that will need to null this STA in the UL. This STA identification can be combined with that for the DL (e.g., Step 2 for the DL).

After the measurement phase, an AP may send the results to a scheduler (e.g., a leader AP such as the head of a cluster) or to all of the APs in the cluster. The scheduler or the APs as a group may then use this information in Step 3 to schedule a UL COBF transmission. Alternatively, the AP may send the results to these entities as part of reported candidate STA information in Step 3. These and other aspects of Step 2 for UL are discussed in detail in section IV-B that follows.

Step 3 involves UL COBF data transmission scheduling and transmission (e.g., once every 4 ms or at other times). For scheduling, the channel access winning AP may collect candidate STA information from each AP in the cluster, make an UL data transmission scheduling decision based on this information, and announce the UL data transmission scheduling decision. The decision may include, for example, the IDs of the scheduled STAs, the stream number (#) per STA, the IDs of the nulling OBSS APs per STA, the UL COBF transmission duration and bandwidth, and the DL ACK resources per AP. The decision may use the results from Step 2 to ensure that, if needed, a STA is nulled by the appropriate OBSS APs in the UL.

The scheduling decision may also include the resource allocation for each AP's trigger frame (TF). An AP's TF will trigger the AP's STAs to conduct an UL COBF transmission.

Once the UL COBF data transmission is scheduled, the UL COBF data transmission is performed. Participating APs execute the data transmission based on the UL transmission scheduling decision. These and other aspects of Step 3 for UL are discussed in detail in section VII that follows.

The above steps for distributed MIMO scheduling and transmission in accordance with the teachings herein will now be described in more detail with reference to FIGS. 3-44. For purposes of explanation, FIGS. 3-42 illustrate various concepts in the context of a coordinated beamforming (COBF) architecture. As discussed in conjunction with FIGS. 43 and 44, for example, the teachings herein are applicable to other types of distributed MIMO (e.g., Joint MIMO, etc.).

II. DL COBF Scheduling Example

Figure 3:
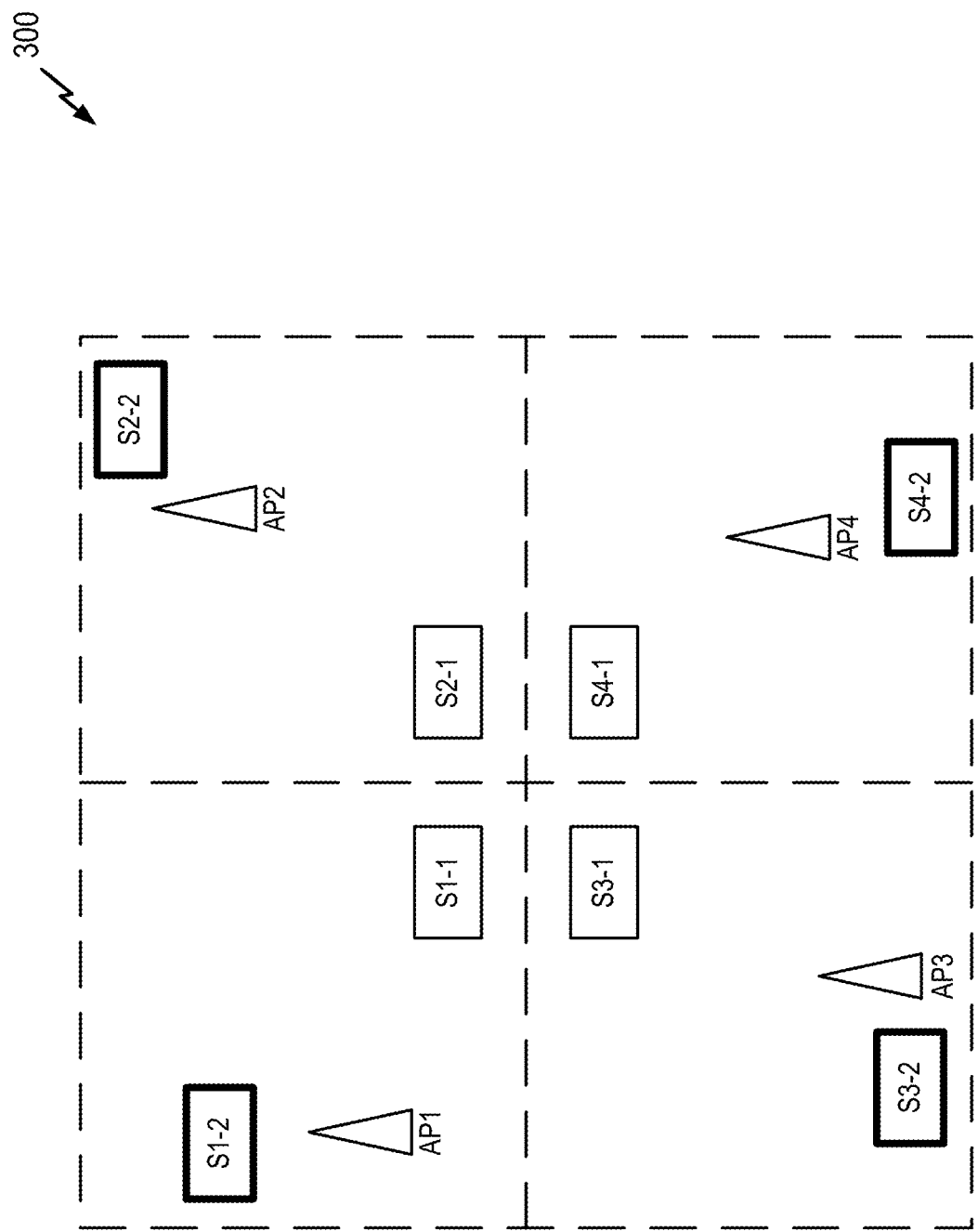
FIG. 3 illustrates an example of a cluster of access points in accordance with some aspects of the disclosure.
Figure 4:
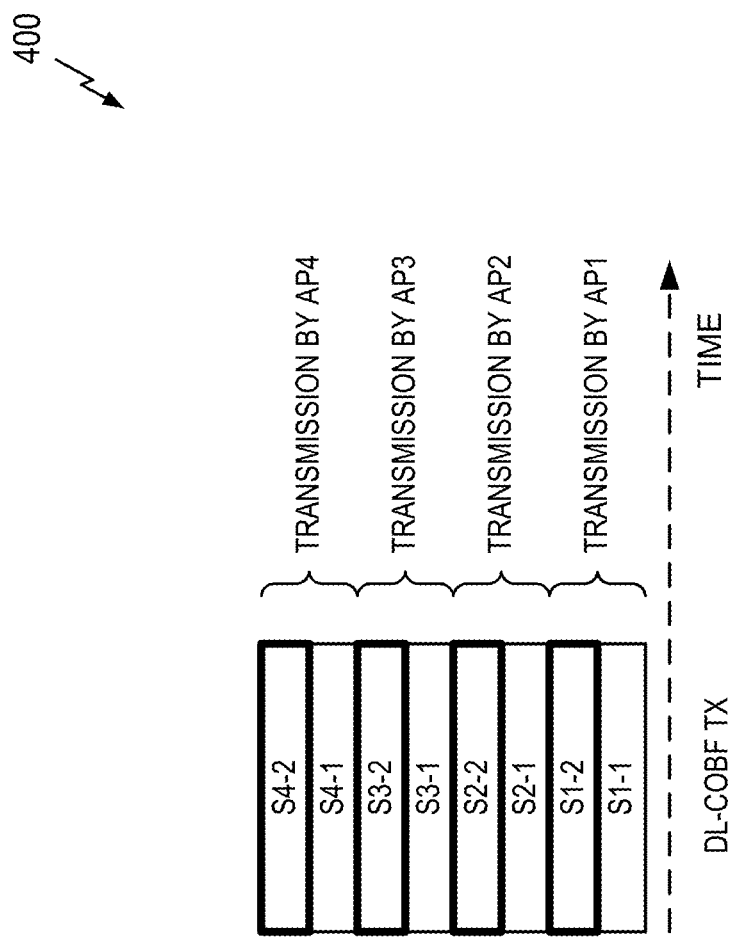
FIG. 4 illustrates an example of a downlink schedule in accordance with some aspects of the disclosure.

FIG. 3 illustrates an example wireless communication system 300 where four APs (AP1-AP4) form a group for COBF transmission. In this example, each AP has two STAs in its basic service set (BSS). A first AP AP1, serves STAs S1-1 and S1-2, a second AP AP2 serves STAs S2-1 and S2-2, a third AP AP3 serves STAs S3-1 and S3-2, and a fourth AP AP4 serves STAs S4-1 and S4-2. Each AP has at least five antennas (i.e., five dimensions). Each STA has single antenna. Other configurations could be used in other scenarios.

In some aspects, there may be two categories of STAs. A STA of the first category doesn't require nulling by its serving AP and may be referred to as an InBSS STA (or IBSS STA). A STA of the second category requires nulling by at least one AP other than its serving AP and may be referred to as an out-of-BSS STA (OBSS STA).

InBSS STAs (the boxes with thicker lines in FIG. 3) have a sufficient signal and interference to noise ratio (SINR) to be served simultaneously without being nulled by any overlapping BSS (OBSS) AP in the beamforming group. The InBSS STAs in FIG. 3 are designated STAs S1-2, S2-2, S3-2, and S4-2.

OBSS STA (the boxes with the thinner lines in FIG. 3) are those STAs where an OBSS AP transmission may significantly degrade the SINR of the STA. In accordance with the teachings here, the OBSS STAs may be nulled by at least one OBSS AP. The OBSS STAs in FIG. 3 are designated STAs S1-1, S2-1, S3-1, and S4-1.

In the example of FIG. 3, one STA (the box with thinner lines) in each BSS is relatively close to three OBSS APs and, hence, may require nulling from these OBSS APs. For example, STA S1-1 may require nulling from the second AP AP2, the third AP AP3, and the fourth AP AP4. The other STA (the boxes with thicker lines) in the BSS is relatively far from the three OBSS APs and, hence, might not require nulling from these OBSS APs. For example, the STA S1-2 might not needed nulling signals from the second AP AP2, the third AP AP3, and the fourth AP AP4.

In accordance with the teachings herein, in a given coordinated beamforming transmission time slot, an AP may serve at least one InBSS STA and/or at least one OBSS STA. See, for example, the downlink coordinated beamforming (DL-COBF) schedule 400 of FIG. 4 which shows DL COBF transmissions by the first AP AP1, the second AP AP2, the third AP AP3, and the fourth AP AP4. Each AP uses X dimensions to serve its X selected IBSS STAs (X=1 in the example of FIG. 3). Each AP uses its remaining Y dimensions to serve or null Y selected OBSS STAs (Y=1 in the example of FIG. 3).

In the DL COBF scheduling of FIG. 3 where each AP has five dimensions, each AP may use two dimensions to serve its two STAs, while using the remaining three dimensions to form three nulls for three OBSS STAs requiring nulling. For example, the first AP AP1 may serve STAs S1-1 and S1-2 in its BSS, and form three nulls for three OBSS STAs that require nulling: STA S2-1, S3-1, S4-1.

III. UL Coordinated Beamforming

Figure 5:
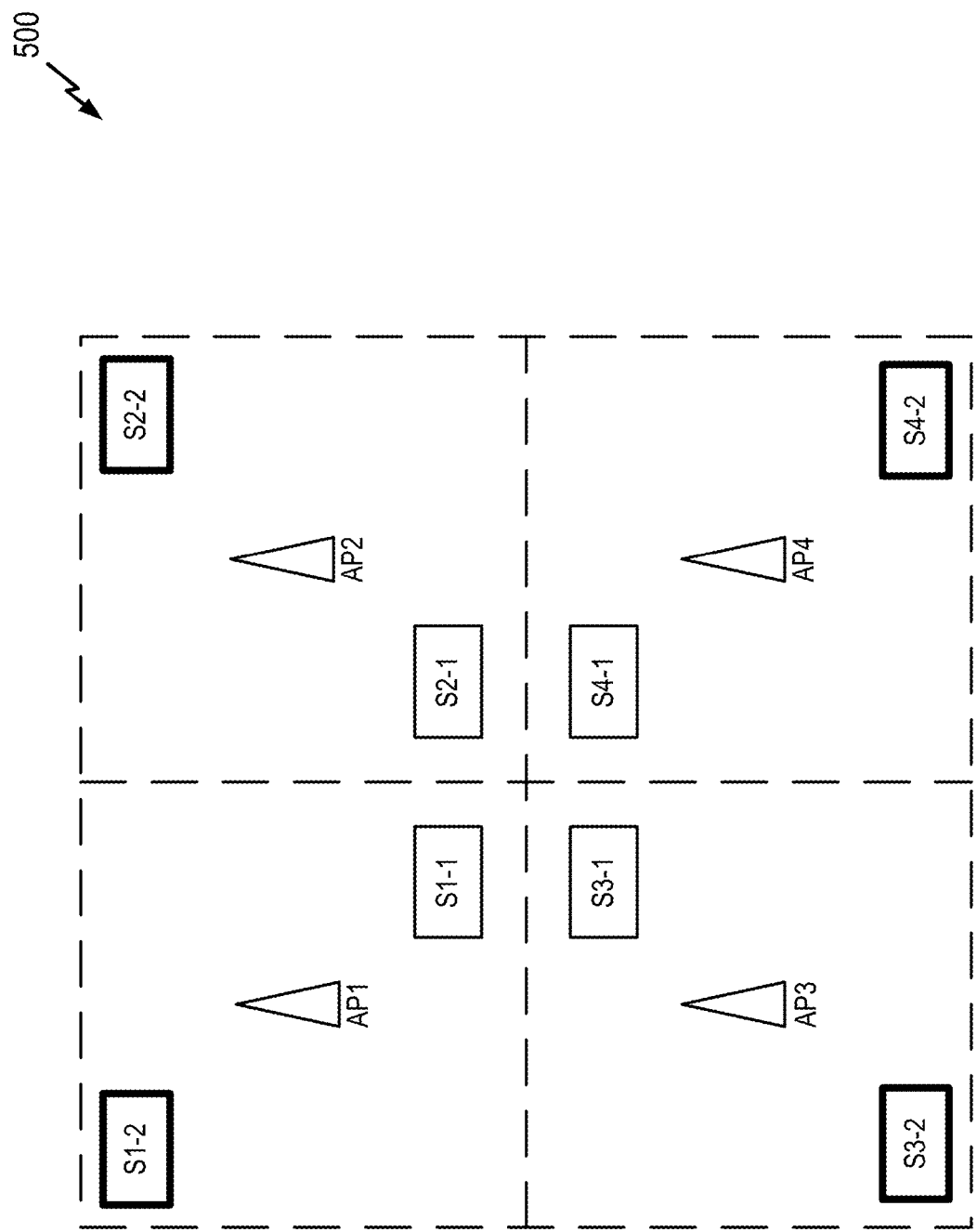
FIG. 5 illustrates another example of a cluster of access points in accordance with some aspects of the disclosure.
Figure 6:
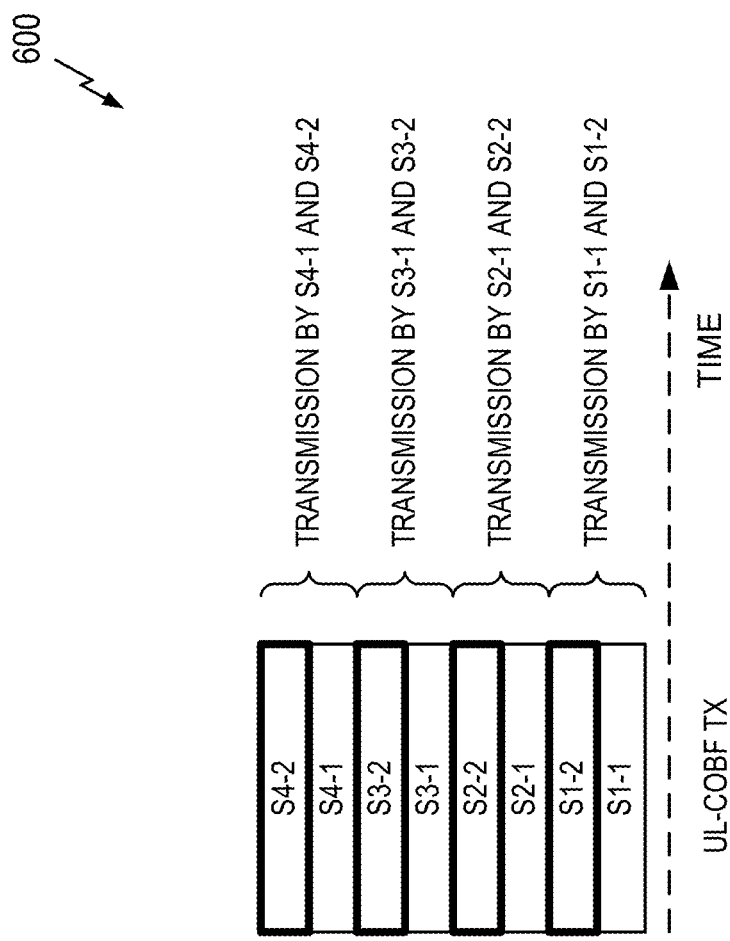
FIG. 6 illustrates an example of an uplink schedule in accordance with some aspects of the disclosure.

An UL COBF scheduling example will be discussed with reference to the wireless communication system 500 of FIG. 5. As in the example of FIG. 3, each AP (AP1, AP2, AP3, and AP4) in FIG. 5 has at least five antennas (five dimensions) and uses two dimensions to simultaneously receive from its two InBSS STAs in the UL. See, for example, the UL-COBF schedule 600 of FIG. 6 which shows UL COBF transmissions by the STAs S1-1, S1-2, S2-1, S2-2, S3-1, S3-2, S4-1, and S4-2.

Each AP may use its remaining three dimensions to null three interfering OBSS STAs in the UL (e.g., OBSS STAs that interfere with reception at the AP). For example, a first AP AP1 may simultaneously receive from STAs S1-1 and S1-2 in its BSS, and null three interfering OBSS STAs in the UL (e.g., STAs S2-1, S3-1, S4-1). In some aspects, COBF communication in accordance with the teachings herein may realize a four-times gain in resource usage as compared to a scheme that uses conventional time-division multiplexing (TDM) among four APs.

IV. Identifying APs and STAs

The disclosure relates in some aspects to addressing the issues that follow with respect to identifying APs and STAs to be included in a scheduling decision.

Various criterion could be used to determine DL and UL nulling OBSS APs per STA. The disclosure relates in some aspects to using estimated DL and UL RSSI or SINR per STA to determine the STAs required DL and UL nulling OBSS APs.

Various sequence formats could be used to measure DL and UL RSSI per AP. The disclosure relates in some aspects to measuring DL and UL RSSI per AP based on beacons, a multi-BSS sounding sequence, a new dedicated sequence, a STA's UL signals, or a combination thereof.

Various entities could make the above determination. In addition, various OTA messages could be used to this end. The disclosure relates in some aspects to having the determination made by a STA, its associated AP, or a 3rd party node (e.g., a cluster leader AP or a central controller). Required OTA messages can be sent by a STA in an IEEE 802.11 high efficiency (HE) control field of any frame, in frame body of a dedicated frame, or in some other manner.

IV-A. Criterion to Determine DL Nulling OBSS APs Per STA

In some aspects, a criterion to determine nulling OBSS APs may include determining DL nulling OBSS APs per STA based on estimated DL RSSI or SINR with the following options.

A first option uses RSSI per OBSS AP. The m-th OBSS AP should null the STA if its caused RSSI at the STA is above a threshold (e.g., −92 dBm). Here, RSSI is measured from the m-th OBSS AP without nulling.

A second option uses SINR with a single AP's interference. The m-th OBSS AP should null the STA if: 1) the STA's SINR (see Equation 1 below) drops at least X dB (e.g., 3 dB); and/or 2) the SINR drops below Y dB (e.g., 20 dB).

$$SINR_m = S/(I_m + N) \quad \text{EQUATION 1}$$

Here, S is the estimated RSSI from the serving AP without nulling, $I_m$ is the estimated RSSI from the m-th OBSS AP without or with nulling, and N is noise power.

A third option uses the worst SINR with all of the APs' interference. For example, the worst case may be that all potentially scheduled APs are transmitting in a DL COBF transmission with full power. The APs could be all of the APs in same DL COBF cluster.

The above worst case SINR can be used to determine nulling OBSS APs as set forth in Equation 2.

$$SINR_A = S \left/ \left( \sum_{m=1}^{M} I_m + N \right) \right. \quad \text{EQUATION 2}$$

In Equation 2, $I_m$ is the estimated RSSI from the m-th OBSS AP with or without nulling. The parameters S and N may have same meaning as in the second option.

The set of nulling OBSS APs is the smallest set to null the STA such that: 1) the worst case $SINR_A$ drops less than X dB (e.g., 3 dB); or/and 2) the dropped value is still above Y dB (e.g., 20 dB).

Residual interference with nulling can be estimated by subtracting the original interference by a certain offset (e.g., 30 dB). The residual interference may be signaled by the network or obtained in some other way.

IV-B. Criterion to Determine UL Nulling OBSSAPs Per STA

The UL nulling OBSS APs per STA or, equivalently, the UL nulled OBSS STAs per AP can be determined based on the estimated UL RSSI or SINR with the following options.

A first option uses RSSI per STA. The AP should null the m-th OBSS STA if the STA-caused RSSI at an AP is above a threshold (e.g., −92 dBm). Here, RSSI is measured at the AP without nulling.

A second option uses SINR with a single STA's interference. The AP should null the m-th OBSS STA if: 1) the served STA's SINR at the AP (see Equation 3 below) drops at least X dB (e.g., 3 dB); and/or 2) the SINR drops below Y dB (e.g., 20 dB).

$$SINR_m = S/(I_m + N) \quad \text{EQUATION 3}$$

Here, S can be the lowest or average RSSI of all served STAs at the AP without nulling, $I_m$ is the RSSI from the m-th OBSS STA at the AP without or with nulling, and N is noise power.

A third option uses the worst SINR with all of the STAs' interference. For example, the worst case may be that all potentially scheduled OBSS STAs are transmitting in an UL COBF transmission. The above worst case SINR can be used to determine the nulled OBSS STAs at the AP as set forth in Equation 4.

$$SINR_A = S \bigg/ \left( \sum_{m=1}^{M} I_m + N \right) \quad \text{EQUATION 4}$$

In Equation 4, $I_m$ is the estimated RSSI of m-th OBSS STA at the AP with or without nulling. The parameters S and N may have same meaning as in the second option. The set of nulled OBSS STAs is the smallest set to be nulled such that: 1) the worst case $SINR_A$ drops less than X dB (e.g., 3 dB); or/and 2) the dropped value is still above Y dB (e.g., 20 dB).

IV-C. Methods to Identify DL and UL Nulling OBSS APs per STA

The disclosure relates in some aspects to identifying the DL and UL nulling APs per STA. In some aspects, this may involve one or more of obtaining inputs for identifying the nulling APs, identifying the nulling APs based on DL signaling, or identifying the nulling APs based on UL signaling.

IV-C.1. Inputs for Nulling AP Identification

As described in above, an input for identify nulling APs may include RSSI. Identifying DL nulling APs per STA may be based on all of the APs' DL RSSI at each STA. Identifying UL nulling APs per STA may be based on at least the STA's UL RSSI to all APs. Depending on the particular criterion used, this identification may also be based on the UL RSSI of served STAs per AP.

Therefore, a DL and UL COBF scheduler may determine the DL and UL RSSI between all APs and potentially scheduled STAs. Alternatively, the scheduler may determine the identified DL and UL nulling APs per STA directly. RSSI inputs or identification results can be provided by each AP.

Several options for a scheduler to get RSSI inputs or identification results per STA will now be described. Initially, options based on DL signaling will be treated, followed by options based on UL signaling.

IV-C.2. DL Signal Based Identification

DL signal based identification may include the three steps that follow.

In a first step, APs in a cluster send DL measurement signals. The STAs in the cluster measure the DL RSSI per AP based on the received signals.

In a second step, each STA reports its RSSI inputs and/or identification results to its associated AP. The results may include the STA's DL and UL nulling AP IDs. Inputs may include the STA's DL and UL RSSI per AP.

UL RSSI can be calculated based on DL RSSI as follows: UL RSSI=STA transmit power−(AP transmit power−DL RSSI). The AP can indicate its transmit power in the AP's DL measurement signal.

In a third step, the scheduler collects the STAs' inputs and/or results with the options that follow.

In a first option (Option 1), the APs exchange their InBSS STAs' inputs and/or results after receiving their STA reports. In this way, every AP can determine all of the STAs' inputs and/or results when acting as scheduler. This exchange can be triggered by the leader AP.

In a second option (Option 2), before each scheduling, each AP sends the inputs and/or results of its candidate STAs to the scheduler. Each AP may send these inputs and/or results together with other information.

Three DL Signal Based Identification Methods will now be described. The first method is a beacon-based method, the second method is a sounding-based method, and the third method is a dedicated sequence-based method.

IV-C.2.a. Method 1: Beacon Based Method

Figure 7:
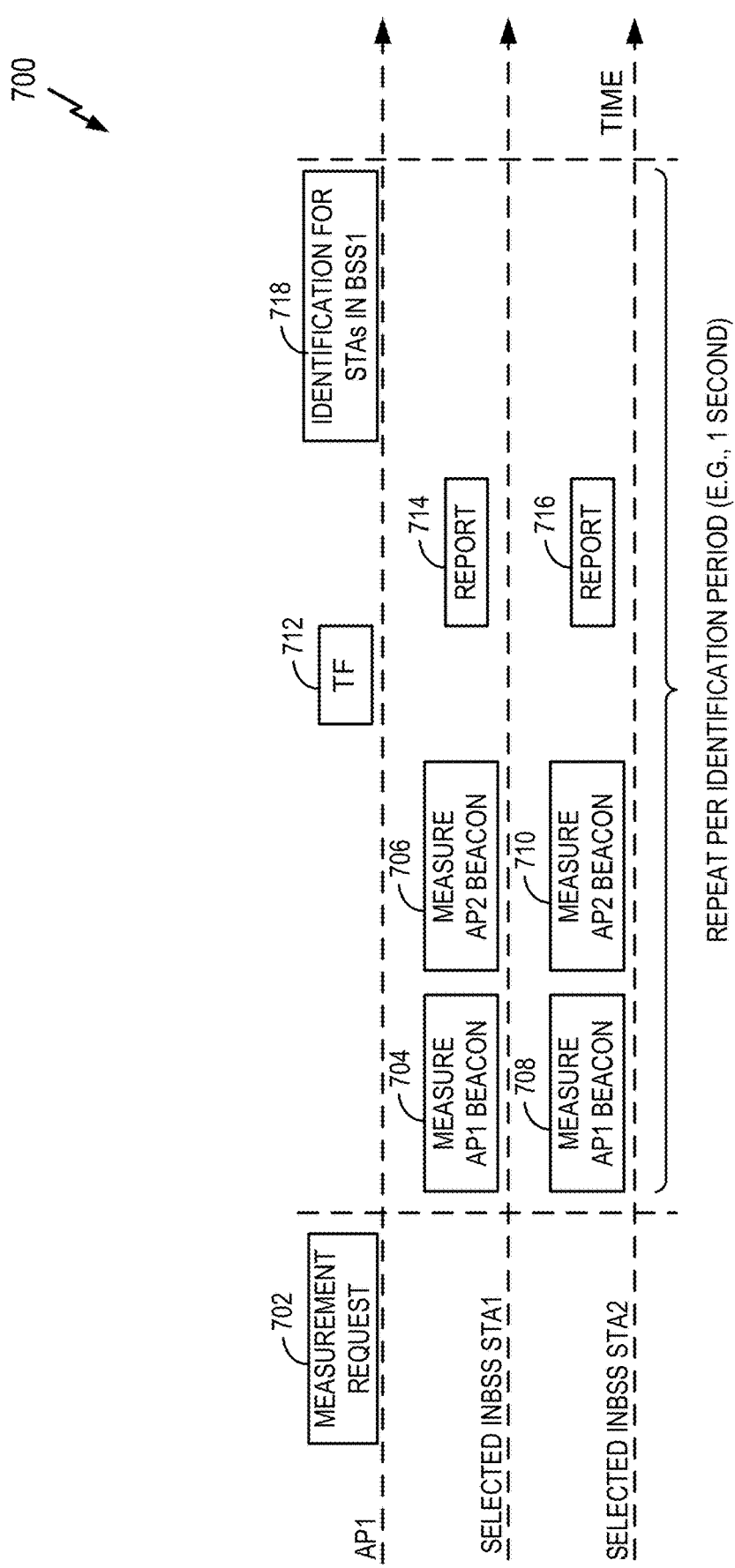
FIG. 7 illustrates an example of downlink signal measurement signaling that uses beacons in accordance with some aspects of the disclosure.

FIG. 7 illustrates an example of signaling 700 where an AP's beacon may be used as a DL measurement signal. Each AP may broadcast the offset between its transmit power for the beacon and the DL COBF transmission. The offset could be added to the measured beacon RSSI. The corrected DL RSSI may then be used for DL nulling AP identification. This method employs the following steps.

In a first step, each AP sends a measurement request 702 to request a set of InBSS STAs to periodically measure the APs' beacon RSSI (e.g., once per second per AP). To reduce the complexity of FIG. 7, only one AP (AP1) is shown). The selected InBSS STAs (e.g., STA1 and STA2) may be those with DL and/or UL traffic. The AP may indicate the STA's measurement period and target beacon transmission time (TBTT) offset per measured AP in a request.

In the example of FIG. 7, STA1 measures AP's beacon 704 and measures AP2's beacon 706. In addition, STA2 measures AP1's beacon 708 and measures AP2's beacon 710.

In a second step, each STA reports to its associated AP the identification results and/or the RSSI inputs to determine the above results (e.g., after receiving the AP's trigger frame 712). In the example of FIG. 7, STA1 sends a report 714 and STA2 sends a report 716. The identification results may include the STA's DL nulling AP IDs and UL nulling AP IDs. The RSSI inputs may include the STA's DL RSSI per AP and UL RSSI per AP.

In a third step, the DL and UL COBF scheduler collects the STAs' inputs and/or results with the following two options.

In a first option (Option 1), the APs exchange their InBSS STAs' inputs and/or results after receiving their respective STA reports. For example, AP1 may send the information 718 indicated in FIG. 7. In this way, every AP knows all of the STAs' inputs and/or results when acting as the scheduler. The exchange can be triggered by a trigger frame sent by the leader AP.

In a second option (Option 2), before each scheduling, each AP sends the inputs and/or results of its candidate STAs to the scheduler. For example, AP1 may send the information 718 indicated in FIG. 7. Each AP may send these inputs and/or results together with other information.

IV-C.2.b. Method 2: Sounding Based Method

In a sounding-based method, a STA may measure the DL channel response per AP in a multi-BSS sounding procedure. Here, the procedure is reused to determine the STA's nulling AP IDs.

In a first step, in a multi-BSS sounding procedure, a set of STAs across BSSs is selected to measure every AP's NDP and send the corresponding BFRP to the AP. Selected STAs may be those with DL and/or UL traffic in the cluster. Selected STAs may be announced in every AP's NDPA or in a single aggregated NDPA. See the multi-BSS sounding sequence examples in section V.

In a second step, an AP computes each InBSS STA's DL RSSI per AP and UL RSSI per AP based on the STA's BFRP. The AP may know the AP and STA transmit power to determine the RSSI. The AP further decides each InBSS STA's identification results.

The third step is the same as in Method 1

IV-C.2.c. Method 3: Dedicated Sequence Based Method

Figure 8:
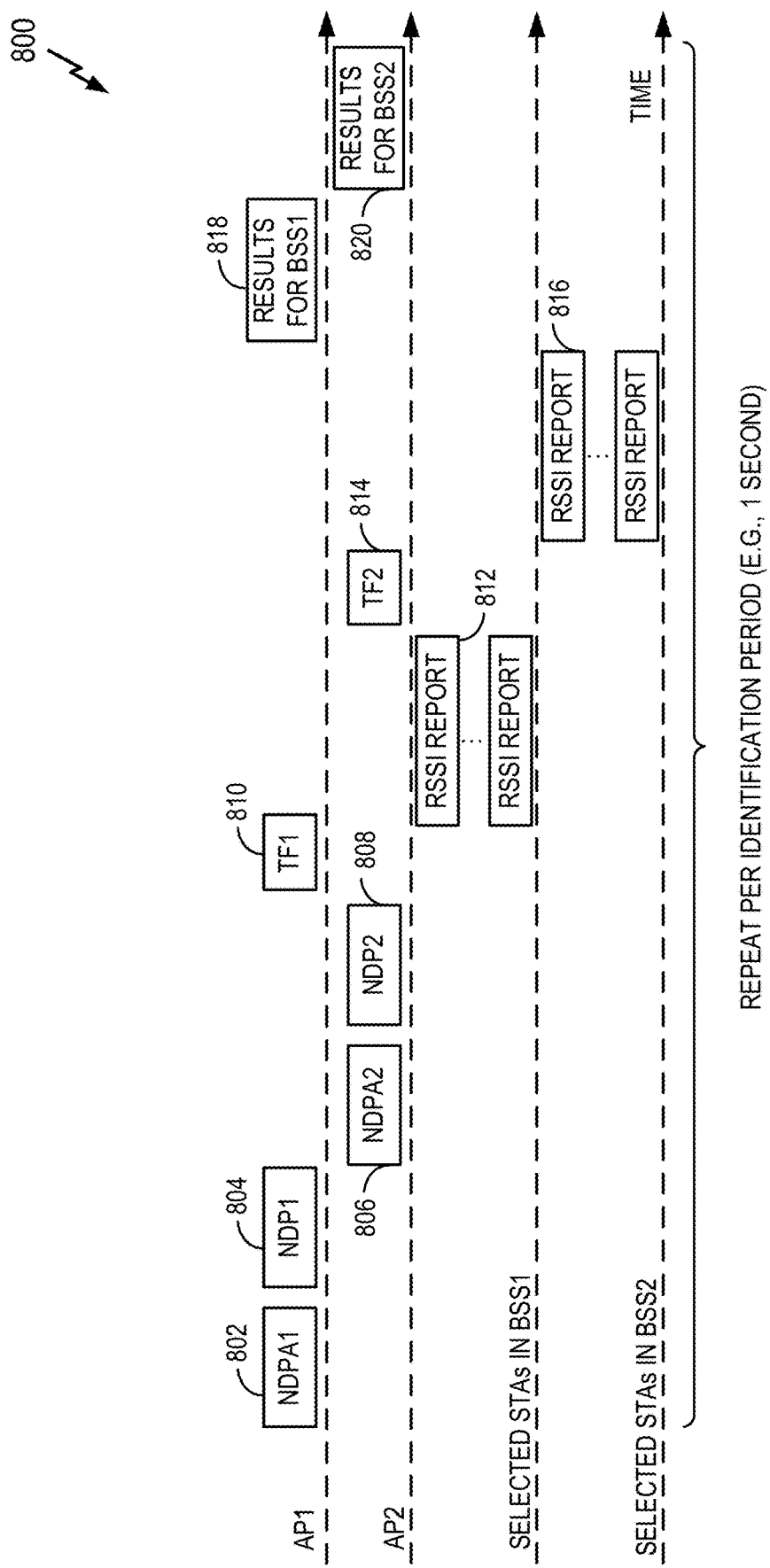
FIG. 8 illustrates an example of downlink signal measurement signaling that uses a dedicated sequence in accordance with some aspects of the disclosure.

FIG. 8 illustrates an example of signaling 800 where a dedicated sequence can be used as a DL measurement signal. The DL measurement signal could be a new sequence, a simplified sounding sequence (e.g., where the STA only reports RSSIs from multiple APs), or some other type of signal. The following sequence is an example for the case of two APs (AP1 and AP2).

In a first step, in every measurement period (e.g., repeated once per second), both APs send an NDP announcement (NDPA) and an NDP sequentially. In FIG. 8, AP1 sends an NDPA 802 and an NDP 804, while AP2 sends an NDPA 806 and an NDP 808. Each AP specifies in the NDPA the InBSS STAs that are to measure the RSSIs of both NDPs. The selected InBSS STAs may be those with DL traffic and/or UL traffic.

In a second step, both APs send a TF to collect measured DL RSSI and UL RSSI from their STAs. In FIG. 8, AP1 sends TF1 810 and receives RSSI reports 812 from the STAs in BSS1, while AP2 sends TF2 814 and receives RSSI reports 816 from the STAs in BSS2. Each AP further determines DL nulling AP IDs per STA and UL nulling AP IDs per STA.

The third step is the same as in Method 1. In FIG. 8, AP1 sends results 818, while AP2 sends results 820.

IV-C.3. UL Signal Based Identification

UL signal based identification may include the following steps.

In a first step, STAs in a cluster send UL measurement signals. Each AP measures UL RSSI between it and every STA based on the received signals.

Each AP may also derive DL RSSI between it and every STA based on UL RSSI. This derivation may use the following formula: DL RSSI=AP transmit power−(STA transmit power−UL RSSI). A STA can indicate its transmit power in the STA's UL measurement signal.

In a second step, the APs exchange their DL RSSI for every STA and UL RSSI for every STA. In this way, each AP will know all of the APs' DL RSSI per STA and UL RSSI per STA. Based on the above RSSI inputs, every AP knows all of the STAs' identification results when acting as scheduler.

IV-C-3.a. Options for UL Signal:

In a first option (Option 1) for UL signaling, each AP sends a block ACK request (BAR) to solicit a block ACK (BA) from each selected InBSS STA. BAR/BA can be sent in other frame types (e.g., RTS/CTS, TF/Response, etc.). The TF can indicate the response type (e.g., BSR, BQR, BA, CTS, NDP, etc.). A cluster leader AP may send a TF to poll each AP in cluster to initiate the BAR/BA sequence. This process is performed repeatedly (e.g., every second).

Figure 9:
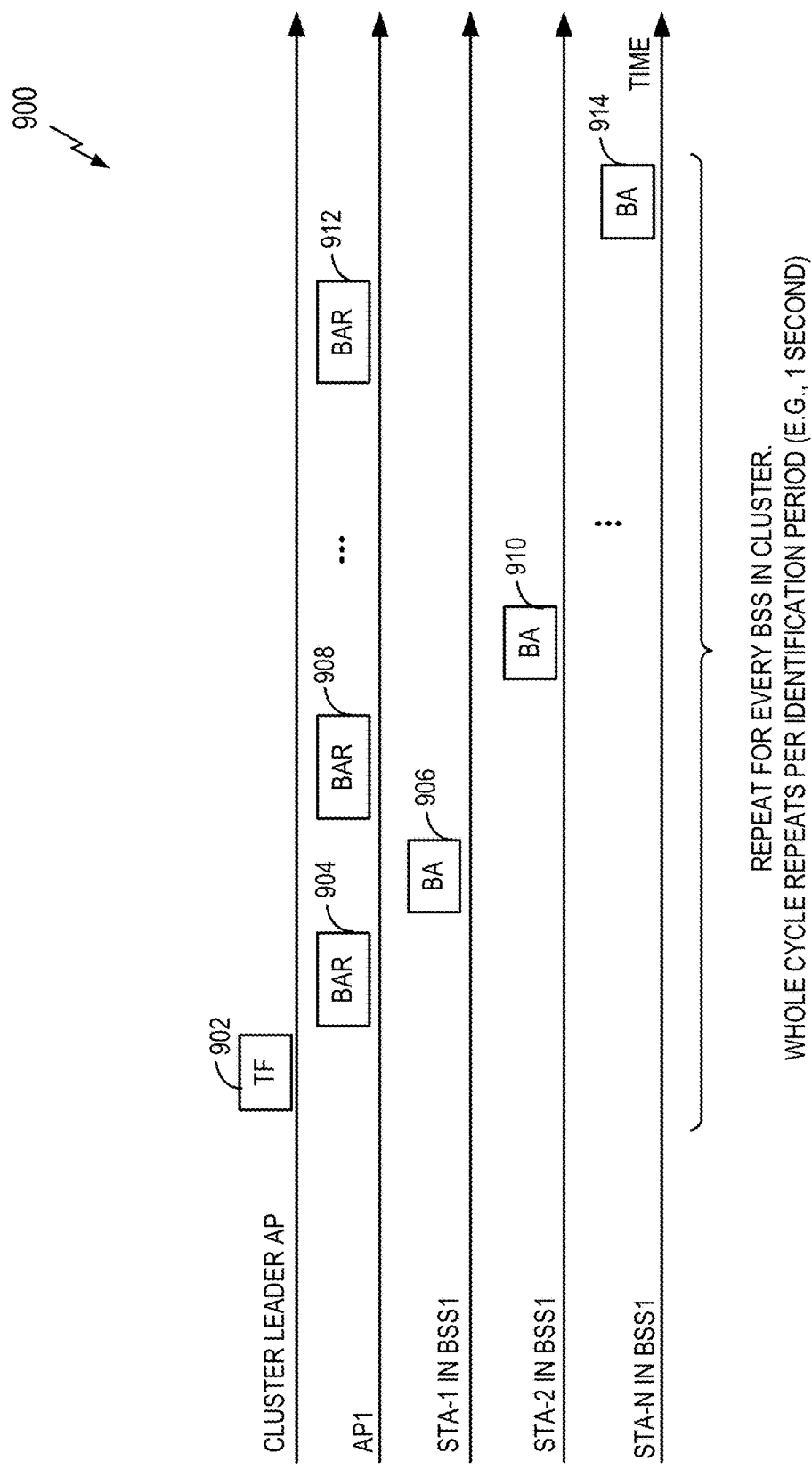
FIG. 9 illustrates an example of uplink signal measurement signaling that uses block acknowledgements in accordance with some aspects of the disclosure.

FIG. 9 illustrates an example of signaling 900 for Option 1 for one BSS (BSS1). Initially, a cluster leader AP sends a TF 902. AP1 sends a BAR 904 to STA-1 and STA-1 sends a BA 906 in response. AP1 sends a BAR 908 to STA-2 and STA-2 sends a BA 910 in response. This process continues for all N STAs in the BSS. Thus, eventually, AP1 sends a BAR 912 to STA-N and STA-N sends a BA 914 in response.

In a second option (Option 2) for UL signaling, each AP sends a TF to solicit responses from multiple InBSS STAs. A TF can indicate a response type (e.g., BSR, BQR, BA, CTS, NDP, etc.). A TF can allocate resources per STA (e.g., different sub-bands, time slots, spatial streams).

Figure 10:
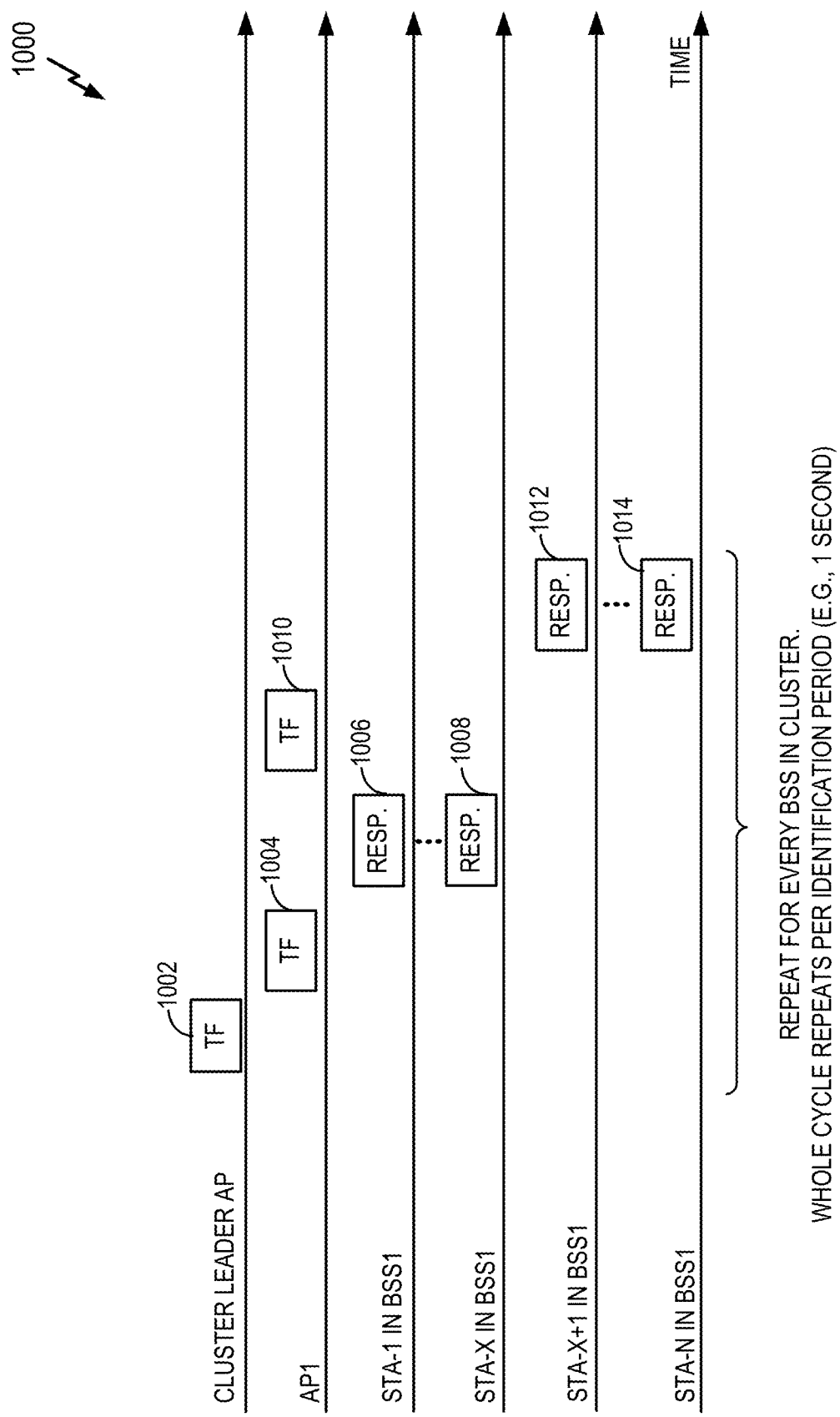
FIG. 10 illustrates an example of uplink signal measurement signaling that uses trigger frames in accordance with some aspects of the disclosure.

FIG. 10 illustrates an example of signaling 1000 for Option 2 for one BSS (BSS1). Initially, a cluster leader AP sends a TF 1002. AP1 sends a TF 1004 to a first set of STAs (STA-1-STA-X). Each of these STAs sends a response as represented by response 1006 to response 1008. This process continues for all N STAs in the BSS. In the example of FIG. 10, AP1 sends a TF 1010 to a second set of STAs (STA-X+1-STA-N). Each of these STAs sends a response as represented by response 1012 to response 1014.

IV-D. Options for Nulling AP Identifier and Required Signaling

Various entities could be used to identify a nulling AP. The following describes options where the identifier is a STA, an AP, or a 3rd Party Node.

IV-D-1. STA is the Identifier

In a first option, a STA determines the nulling APs per STA. For example, a STA may identify its nulling APs based on the STA's measured DL RSSI for all APs and UL RSSI for all APs.

In this case, the STA sends its DL and UL nulling AP IDs to the STA's associated AP, which may then forward this information to a potential DL and UL COBF scheduler (e.g., other APs). The STA can report the list in the HE control field of any frame, in the frame body of a dedicated frame, or in some other manner. The report may have different reporting types including, for example, polled by an AP, periodic reporting, or event triggered reporting (e.g., report only when the list changes).

An AP may send the following information to aid the STA's decision: RSSI, SINR threshold, report type, or any combination thereof.

Two potential correction factors follow. An offset between AP total transmit power for the beacon and for the DL COBF transmission may be used if the DL RSSI is estimated from a beacon. An offset to estimate residual interference after nulling from original interference (e.g., how much to subtract) could also be used.

IV-D-2. AP is the Identifier

In a second option, the nulling APs per STA is determined by a AP associated with the STA. Here, the STA sends back inputs (e.g., DL RSSI and UL RSSI) for all APs. The AP determines the STA's DL nulling AP list and UL nulling AP list, and may forward it to a potential DL and UL COBF scheduler (e.g., other APs).

The following signaling may be used. A STA can send back the above estimates in the HE control field of any frame, in a frame body of a dedicated frame, or in some other manner. Estimates may have different reporting types including, for example, polled by AP, periodic, or event triggered (e.g., report only if any estimate changes).

IV-D-3. $3^{rd}$ Party Node is the Identifier

In a third option, a third party node (not a STA or its associated AP) determines the nulling APs per STA. A 3rd party node can be a leader AP in COBF cluster, a central controller connected to all APs via backhaul, or another type of node. A STA sends to its associated AP the estimated RSSI inputs, which then forwards this information to the 3rd party node. The 3rd party node then decides the DL nulling APs per STA and UL nulling APs per STA. If the 3rd party node is not the scheduler, the 3rd party node forwards the decision to the DL and UL COBF scheduler. The signaling may be similar to option 2.

V. Input Collection to Schedule Sounding for DL Coordinated Beamforming Transmission To null OBSS STAs in a DL COBF transmission, an AP first determines the DL channel information for the STAs. The channel may be estimated by performing a sounding procedure. Two examples of Multi-BSS Sounding Sequences for DL COBF follow.

Figure 11:
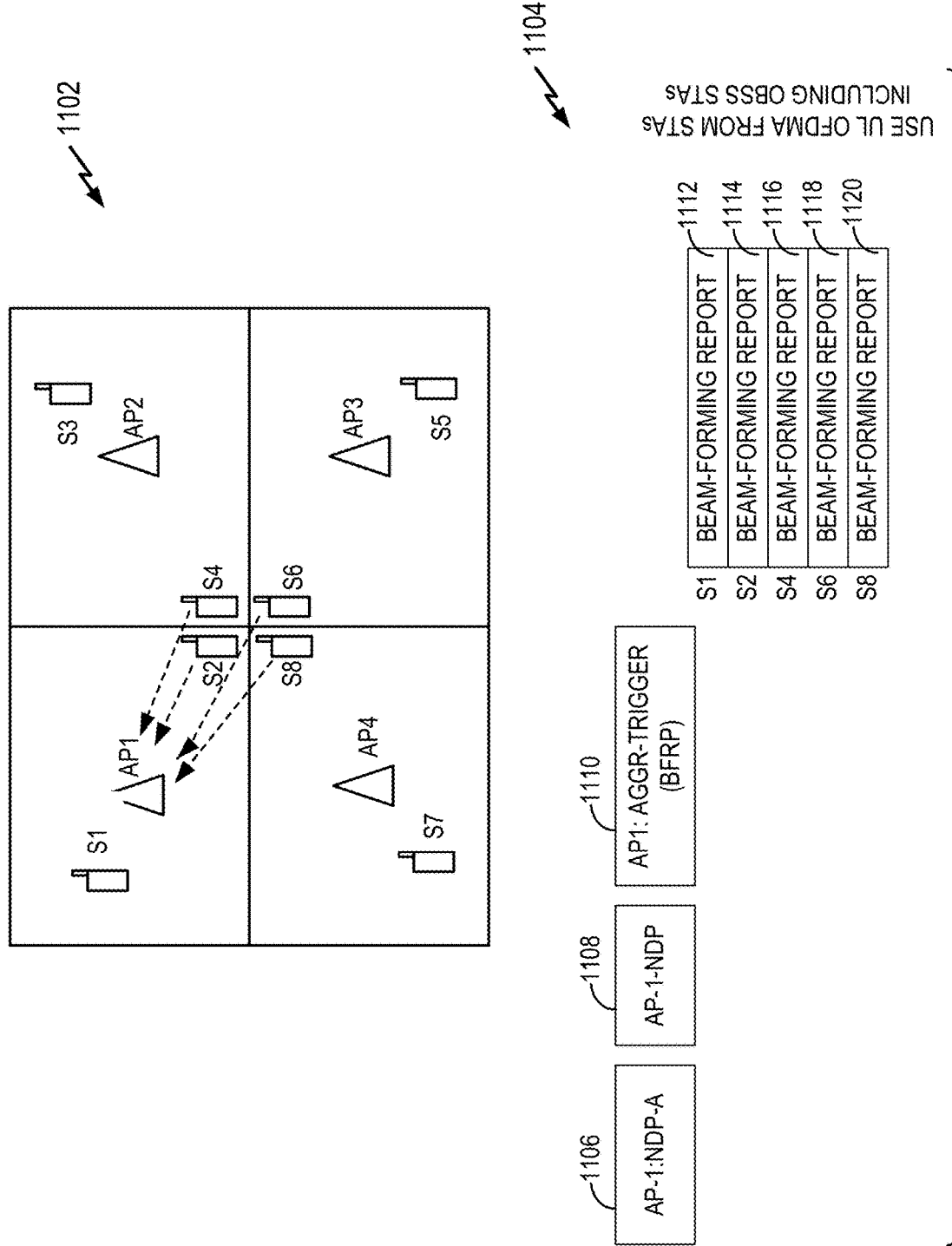
FIG. 11 illustrates an example of downlink coordinated beamforming sounding where access points independently send null data packet announcements in accordance with some aspects of the disclosure.

Referring to the wireless communication system 1102 and the signaling 1104 of FIG. 11, in a first DL COBF sounding example, each AP sends an NDPA 1106, an NDP 1108, and a TF 1110 (e.g., an aggregated trigger) to ask InBSS STAs and OBSS STAs requiring nulling from the AP to measure NDP and send a BFRP. In the example of FIG. 11, STA S sends a report 1112, STA S2 sends a report 1114, STA S4 sends a report 1116, STA S6 sends a report 1118, and STA S8 sends a report 1120. This sequence is performed for each BSS. Each AP sends NDP-A, followed by NDP as in the baseline case, except as follows: 1) an AP is able to sound OBSS STAs (e.g., using UL OFDMA from STAs); 2) STAs will monitor NDPAs, NDPs, and Triggers sent from an OBSS AP; and 3) a STA sends a beamforming report information to an OBSS AP.

Figure 12:
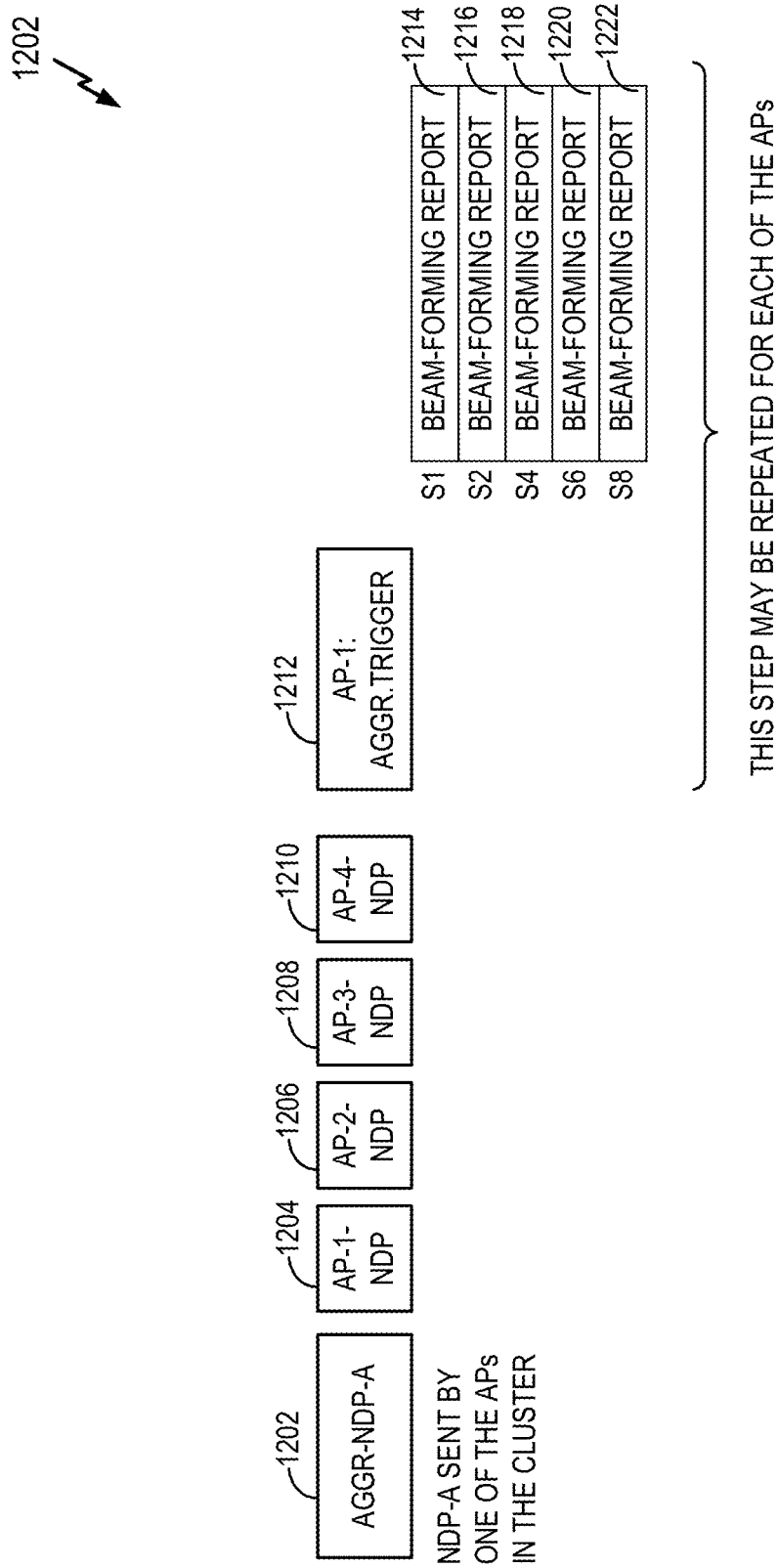
FIG. 12 illustrates an example of downlink coordinated beamforming sounding where a primary access point sends a null data packet announcement for all of the access points in accordance with some aspects of the disclosure.

FIG. 12 illustrates wireless communication signaling 1202 of a second DL COBF sounding example (e.g., which may be used by the wireless communication system 1102). Here, the primary AP sends an NDPA, while each AP in the cluster sends an NDP and TF to ask InBSS STAs and OBSS STAs requiring nulling from the AP to measure its NDP and send a BFRP. In FIG. 12, the primary AP sends an NDP-A 1202 (e.g., an aggregated NDPA), followed by an NDP 1204 from AP-1, an NDP 1206 from AP-2, an NDP 1208 from AP-3, and an NDP 1210 from AP-4. Each AP sends a TF to poll InBSS STAs and OBSS STAs requiring nulling from the AP to send BFRP. FIG. 12 show this step for AP1. Here, AP1 sends a TF 1212 (e.g., an aggregated trigger) and, in response, STA S1 sends a report 1214, STA S2 sends a report 1216, STA S4 sends a report 1218, STA S6 sends a report 1220, and STA S8 sends a report 1222.

A sounding scheduler may decide: 1) which InBSS STAs and OBSS STAs should measure an AP's NDP; 2) the STA's BFRP configurations; and 3) each AP's NDP configurations (e.g., BW, maximum number of streams, etc.). A scheduler can be any node (e.g., an AP participating in DL COBF transmission or leading a DL COBF cluster, a central controller connected to all APs via a backhaul, or some other node).

The disclosure relates in some aspects to techniques for a scheduler to signal the scheduling decision to each participating AP, as well as the contents of the decision (the schedule). This enables each AP to announce the decision in its NDPA if needed, configure its NDP accordingly, and trigger corresponding STAs to send a BFRP.

In some aspects, a node signals a scheduling decision in a frame at the beginning of sounding (e.g., in a "multi-BSS sounding scheduling" frame, or in an aggregated NDPA). The scheduling decision may include participating AP IDs and their NDP order, the IDs of STAs required to measure each AP's NDP, their BFRP configuration, and the AP's NDP configuration. The frame sender can be the scheduler. Otherwise, the scheduler will pass the scheduling decision to the frame sender.

The disclosure relates in some aspects to the acquisition of certain information to make the above decision, as well as techniques for the scheduler to collect this information. In some cases, it may be beneficial to determine the smallest set of STAs to measure and report (e.g., because the BFRP size may be large for a large number of STAs, BWs) or streams).

In some aspects, a scheduler may collect sounding candidate STA information per BSS with the following methods.

A first method involves an OTA explicit inquiry. Prior to sounding scheduling, the scheduler explicitly inquires each AP.

A second method involves OTA autonomous advertisement. Each AP autonomously advertises its input in transmitted frames.

A third method involves a mix of method 1 and 2. For example, a scheduler might inquire only when it has not received an advertisement.

A further method uses a wired backhaul. Here, a scheduler may collect sounding scheduling information from all APs via a wired backhaul.

V-A. Signaling of DL COBF Sounding Scheduling Decision

The following operations may be used to signal a sounding scheduling decision.

V-A-1. Contents of the Sounding Decision

A scheduler may generate the following decision information for sounding scheduling. Other examples are possible.

The decision may include the IDs of the AP participating in the sounding. Also, the order to send NDPs may be specified.

For each of the above APs, the decision may include the IDs of STAs required to measure the AP's NDP, the BFRP configurations per measuring STA, and the AP's NDP configurations.

The IDs of STAs required to measure the AP's NDP may include the AP's InBSS STAs, and the AP's OBSS STAs requiring nulling from the AP. The AP will later trigger them to report BFRP.

The BFRP configurations per measuring STA may include, for example, tone grouping number and codebook size.

The AP's NDP configurations may include, for example, NDP bandwidth and the maximum number of sounding streams.

The above decision may be signaled to each participating AP. In this way, each AP may announce the decision in its NDPA if needed, configure its NDP accordingly, and trigger corresponding STAs to send a BFRP.

V-A-2. Case 1: Each AP sends its own NDPA in the sounding sequence (Seq. Example 1)

Figure 13:
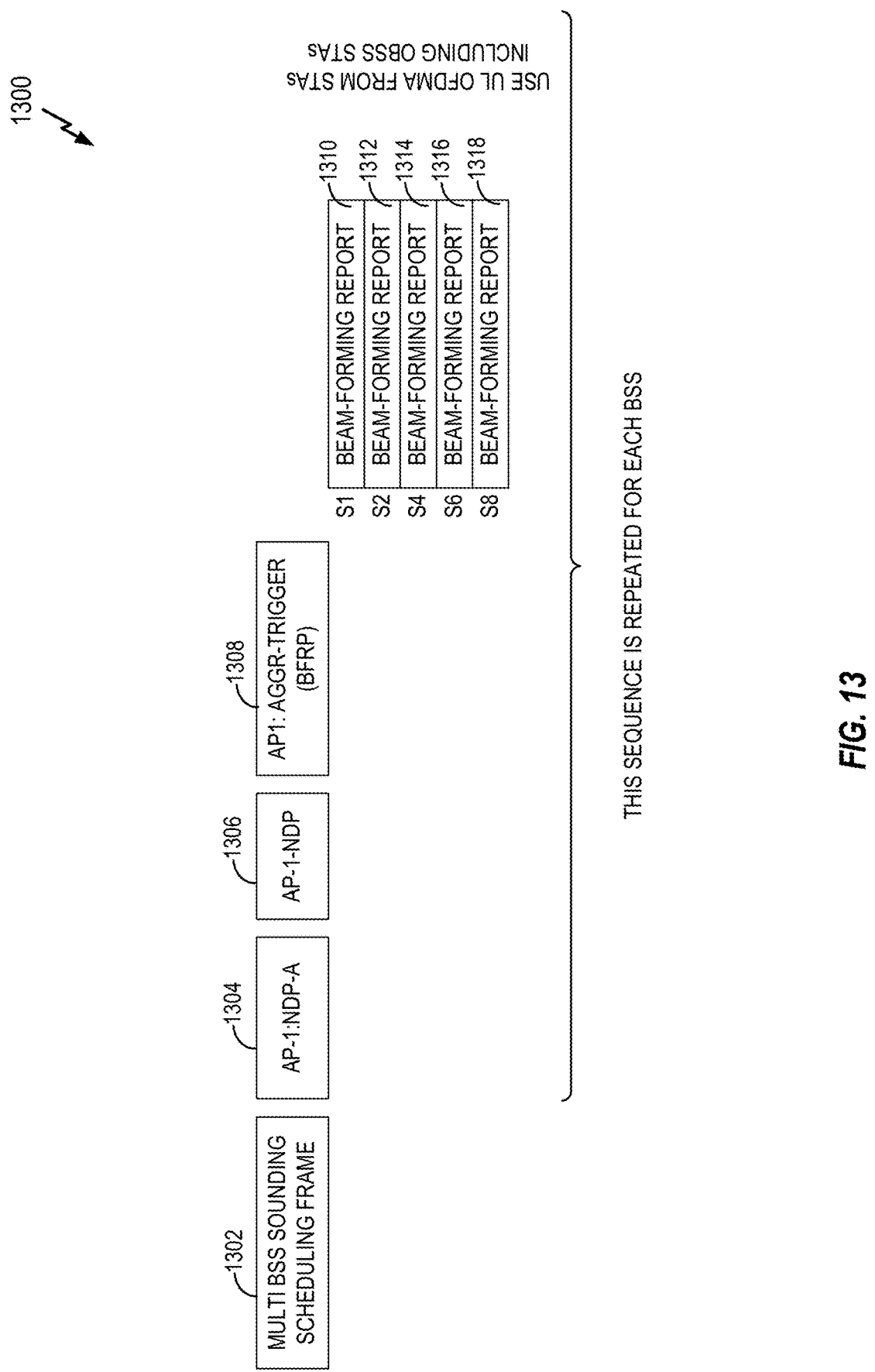
FIG. 13 illustrates an example of a multiple basic service set sounding scheduling frame in accordance with some aspects of the disclosure.

Referring to the signaling 1300 of FIG. 13, a scheduling decision can be sent in a "multi-BSS sounding scheduling" frame 1302 at the beginning of a sounding sequence. Each AP then sends an NDPA, an NDP, and a TF to as its STAs for BFRPs. Each AP can know its NDP transmission order and fill its NDPA with the related decision (e.g., IDs of STAs requiring to measure the AP's NDP, and BFRP configurations per measuring STA).

FIG. 13 illustrates the per BSS sequence for one BSS. AP1 sends an NDPA 1304, an NDP 1306, and a TF 1308 (e.g., an aggregated trigger). In response, STA S sends a report 1310, STA S2 sends a report 1312, STA S4 sends a report 1314, STA S6 sends a report 1316, and STA S8 sends a report 1318.

The scheduling frame sender can be the node initiating the sounding sequence. The scheduler may pass the decision to the scheduling frame sender if the scheduler is not the sender. The scheduling frame can be merged into AP1's NDPA if the two senders are the same.

V-A-3. Case 2: One AP Sends a Single Aggregated NDPA (Seq. Example 2)

Figure 14:
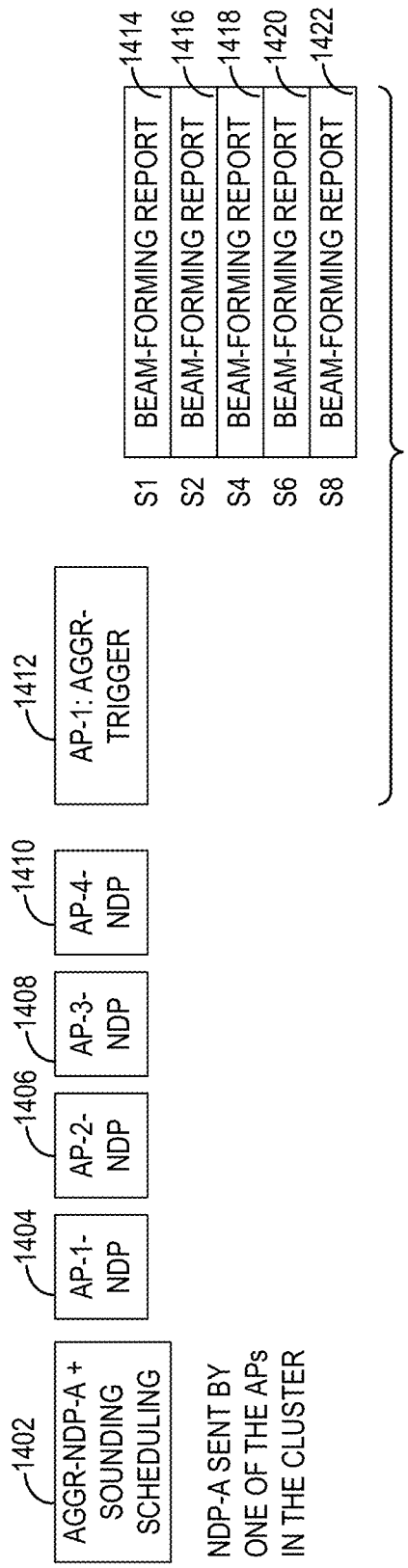
FIG. 14 illustrates an example of an aggregated null data packet announcement in accordance with some aspects of the disclosure.

Referring to the signaling 1400 of FIG. 14, a scheduling decision can be sent in an aggregated NDPA at the beginning of a sounding sequence. All participating APs and STAs will take actions based on the decision. The scheduler may pass the decision to the aggregated NDPA sender if the scheduler is not the sender. Alternatively, the scheduling decision can be sent in a separate frame before the aggregated NDPA.

In FIG. 14, one AP sends an NDP-A 1402 (e.g., an aggregated NDPA with a sounding schedule), followed by an NDP 1404 from AP-1, an NDP 1406 from AP-2, an NDP 1408 from AP-3, and an NDP 1410 from AP-4. Each AP sends a TF to request STAs to send BFRP. FIG. 14 show this step for AP1. Here, AP1 sends a TF 1412 (e.g., an aggregated trigger) and, in response, STA S1 sends a report 1414, STA S2 sends a report 1416, STA S4 sends a report 1418, STA S6 sends a report 1420, and STA S8 sends a report 1422.

V-A-4. Case 3: One AP sends Sounding Trimer and Scheduling Frame to Initiate UL Sounding Signal per BSS Referring to the signaling 1500 FIG. 15, a scheduling decision can be sent in a sounding trigger and scheduling frame at the beginning of an UL sounding, per BSS. The AP of the scheduled BSS (e.g., AP1 in the example of FIG. 15) will send individual NDP TFs to trigger scheduled InBSS STAs to send NDPs, which will be measured by all APs. Each AP will have channel state information from all sounded STAs across BSSs at the end of this process. The sounding sequence may be simplified by sending a single aggregated sounding TF and scheduling frame for all BSSs at the beginning, and/or each scheduled AP only sends a single NDP TF at the beginning.

Figure 15:
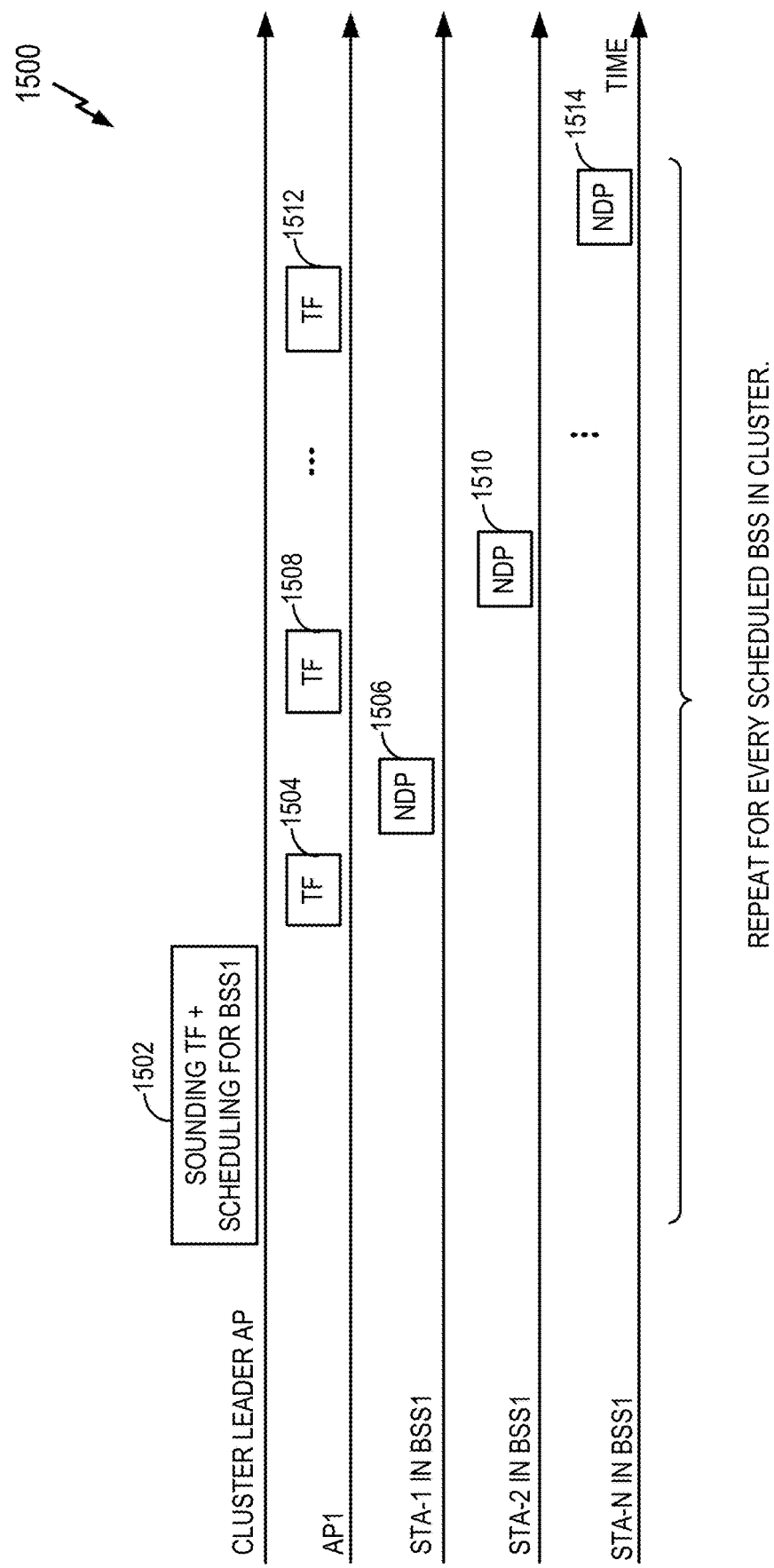
FIG. 15 illustrates an example of sending a scheduling decision in a sounding trigger and scheduling frame at the beginning of an uplink sounding per basis service set in accordance with some aspects of the disclosure.

In the example of FIG. 15, a cluster leader AP sends a sounding trigger and scheduling frame for BSS1 1502. AP1 of BSS1 sends a TF 1504 to trigger STA-1 to send an NDP 1506. AP1 sends a TF 1508 to trigger STA-2 to send an NDP 1510. This is repeated for all N STAs in BSS1. Thus, eventually, AP1 sends a TF 1512 to trigger STA-N to send an NDP 1514.

V-B. Input Collection for DL COBF Sounding Scheduling

The following input collection operations may be used for sounding scheduling. The particular sounding scheduling inputs used may depend on scheduling criterion, for example, as listed below.

A first criterion (Criterion 1) involves sounding all STAs in a cluster. All STAs in any BSS of the cluster will measure every AP's NDP and send BFRP to the AP.

A second criterion (Criterion 2) involves STAs with DL data. The above STAs that have DL data (e.g., STAs that are scheduled to receive DL data) will measure every AP's NDP and send a BFRP to the AP.

A third criterion (Criterion 3) involves STAs with DL data that require nulling. The above STAs that also require nulling from an AP will measure the AP's NDP and send a BFRP to the AP.

V-A-1. Inputs for Sounding Scheduling

Depending on the applicable criterion, a scheduler may acquire the following information to make decision.

In some aspects, the inputs may include the STA IDs per BSS that are potentially DL COBF receivers. These STAs will support DL COBF reception and typically would have DL data (e.g., scheduled). They can be identified by their associated AP or by the STAs themselves. There is no need to check a "Have DL data" parameter if Criterion 1 above is used.

The inputs may also include, for each of the above STAs, the OBSS AP IDs if nulling is required from those APs (e.g., to determine which OBSS STAs should measure each AP's NDP). This input is not needed if Criterion 1 or 2 is used. Instead of receiving explicit "nulling AP IDs," previously measured DL channel information from all APs to STA can be used as an input for the scheduler to decide "nulling AP IDs".

The inputs may also include, for each of the above STAs, capability information for DL COBF sounding (e.g., to determine a STA's report configuration and an AP's NDP configuration). The capability information may include supported tone grouping sizes in the report (e.g., Ng=16), supported codebook sizes (quantization granularity) in the report, and the maximum number of sounding streams per supported NDP BW (to determine an AP's NDP configuration, e.g., BW and the maximum number of sounding streams).

A sounding scheduler may collect the previously described input information using the following methods.

V-B-2. Method 1: OTA Explicit Inquiry

Figure 16:
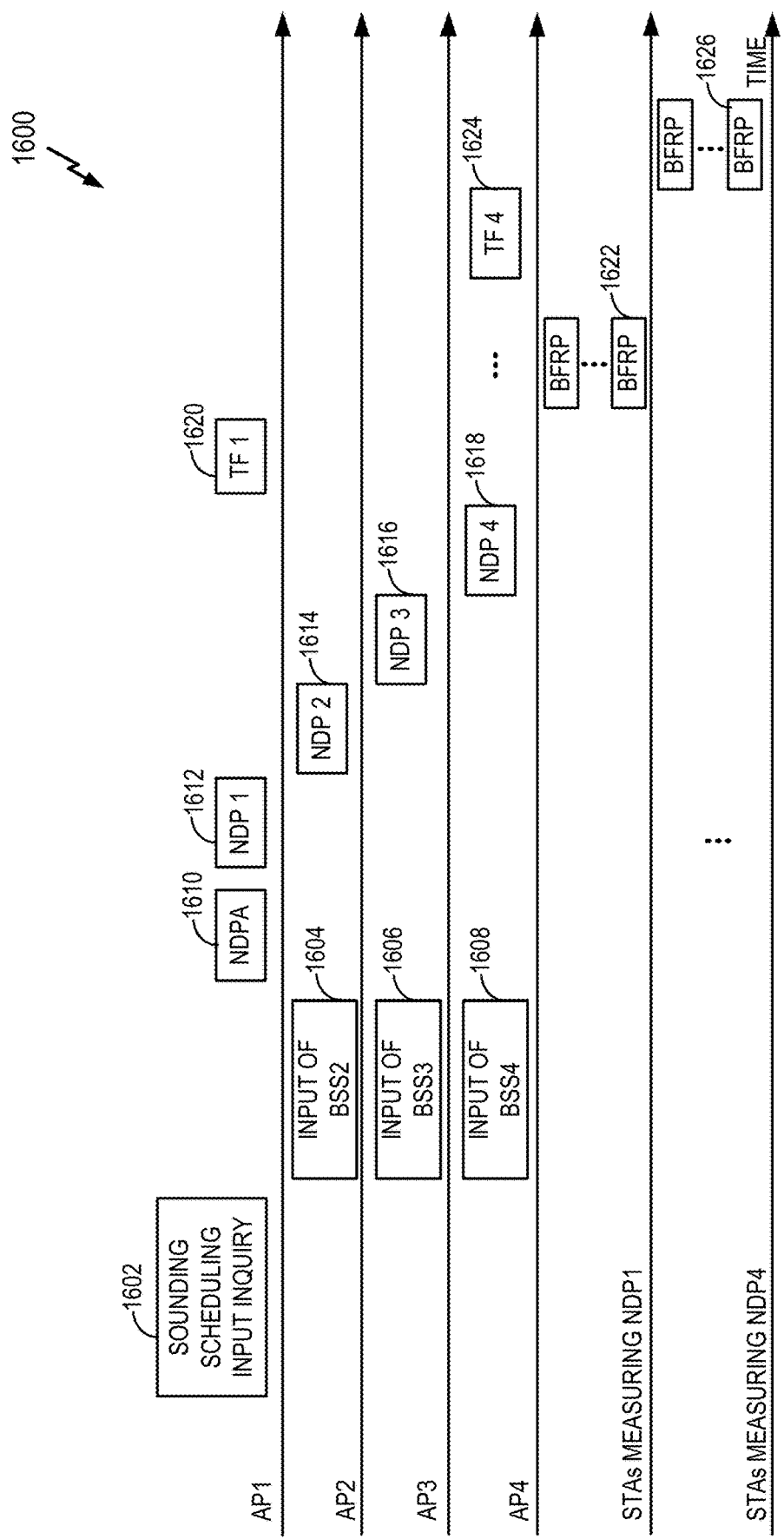
FIG. 16 illustrates an example of sending an inquiry frame to solicit input from participating access points in accordance with some aspects of the disclosure.

FIG. 16 illustrates signaling 1600 for a first method. Prior to sounding scheduling, the scheduler (AP1 in this example) sends an inquiry frame 1602 to solicit input from participating APs (AP2, AP3, and AP4 in this example). The inquiry frame 1602 also indicates the resource (e.g., different sub-bands, spatial streams, time slots) per AP response.

Each inquired AP responds with the input of its BSS (as listed before). In FIG. 16, AP2 responds with the input of BSS2 1604, AP3 responds with the input of BSS3 1606, and AP4 responds with the input of BSS4 1608. The scheduler reports the scheduling decision to the NDPA sender (also AP1 in the example), which initiates sounding sequence (e.g., as discussed above). For example, AP1 may send an aggregated NDPA 1610, after which AP1 sends DNP1 1612, AP2 sends DNP2 1614, AP3 sends DNP3 1616, and AP4 sends DNP4 1618. AP1 sends a TF 1620 and the STAs measuring NDP 1 send their BFRPs 1622. This is performed for all NDPs (e.g., AP4 sends a TF 1624 and the STAs measuring NDP 4 send their BFRPs 1626, etc.).

Figure 17:
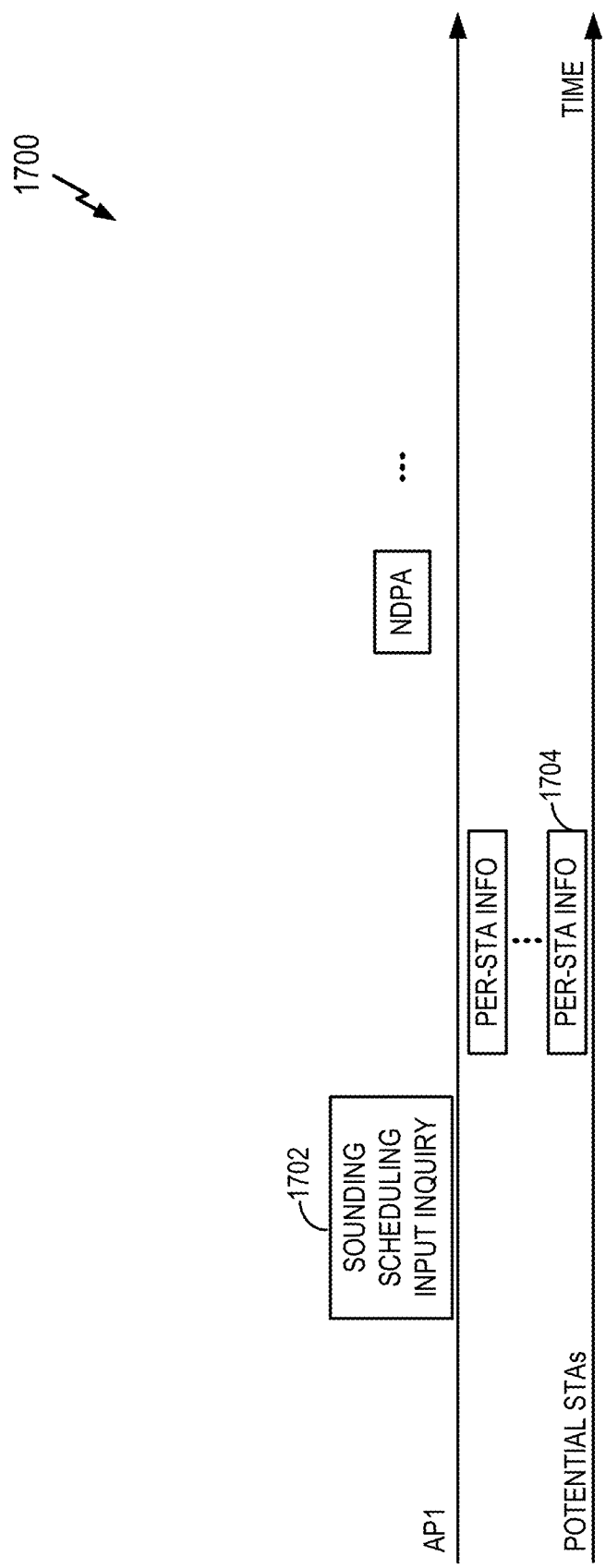
FIG. 17 illustrates an example of a scheduler polling potential stations in participating basic service sets for per-station information in accordance with some aspects of the disclosure.

In an alternate implementation depicted by the signaling 1700 of FIG. 17, instead of inquiring each AP for the potential STAs that are DL COBF receivers, the scheduler (AP1 in this example) may poll potential STAs in participating BSSs for their per-STA information. For example, AP1 may send an inquiry 1702 for sounding scheduling input in an UL OFDMA random access trigger frame. Potential STAs may then respond with their per-STA information 1704 (an ID, OBSS AP IDs for nulling, and sounding capability) via a random access procedure (e.g., similar to IEEE 802.11ax).

V-B-3. Method 2: OTA Autonomous Advertisement

Figure 18:
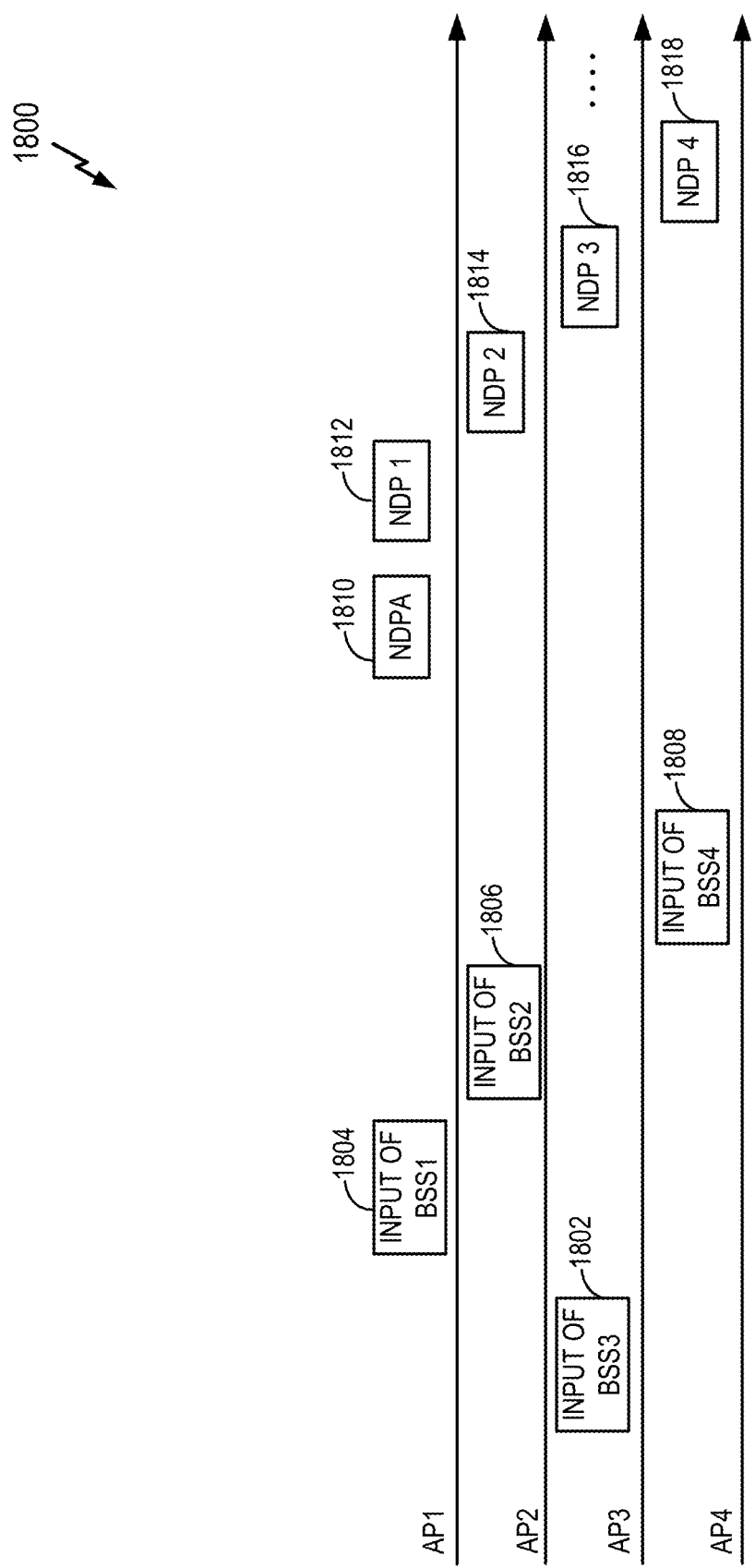
FIG. 18 illustrates an example of access points advertising the inputs of its basis service set in transmitted frames in accordance with some aspects of the disclosure.

Referring to the signaling 1800 of FIG. 18, each AP may advertise the inputs of its BSS in transmitted frames. For example, this information may be sent in a PHY preamble, such as in new fields in SIG-A, SIG-B, or a new SIG-C. As another example, this information may be sent in a MAC header, such as in a new HE control field. In a DL MU PPDU, a new HE control field can be multicast to other APs in the same cluster on a dedicated resource unit (with RA as the cluster ID). As yet another example, the information could be sent in new information element (IE), sent in a management/action frame body, such as beacons.

The scheduler (AP1 in the example of FIG. 18) decides the scheduling based on the latest advertisement per participating AP. The scheduler then reports the scheduling decision to the NDPA sender (also AP1 in the example).

An AP may signal in a PHY preamble that the frame carries candidate STA information. In this way, OBSS APs will not drop the frame for reuse.

In FIG. 18, AP3 sends the input of BSS3 1802, AP1 sends the input of BSS1 1804, AP2 sends the input of BSS2 1806, and AP4 sends the input of BSS4 1808. AP1 may then send an aggregated NDPA 1680, after which AP1 sends DNP1 1812, AP2 sends DNP2 1814, AP3 sends DNP3 1816, and AP4 sends DNP4 1818.

Figure 19:
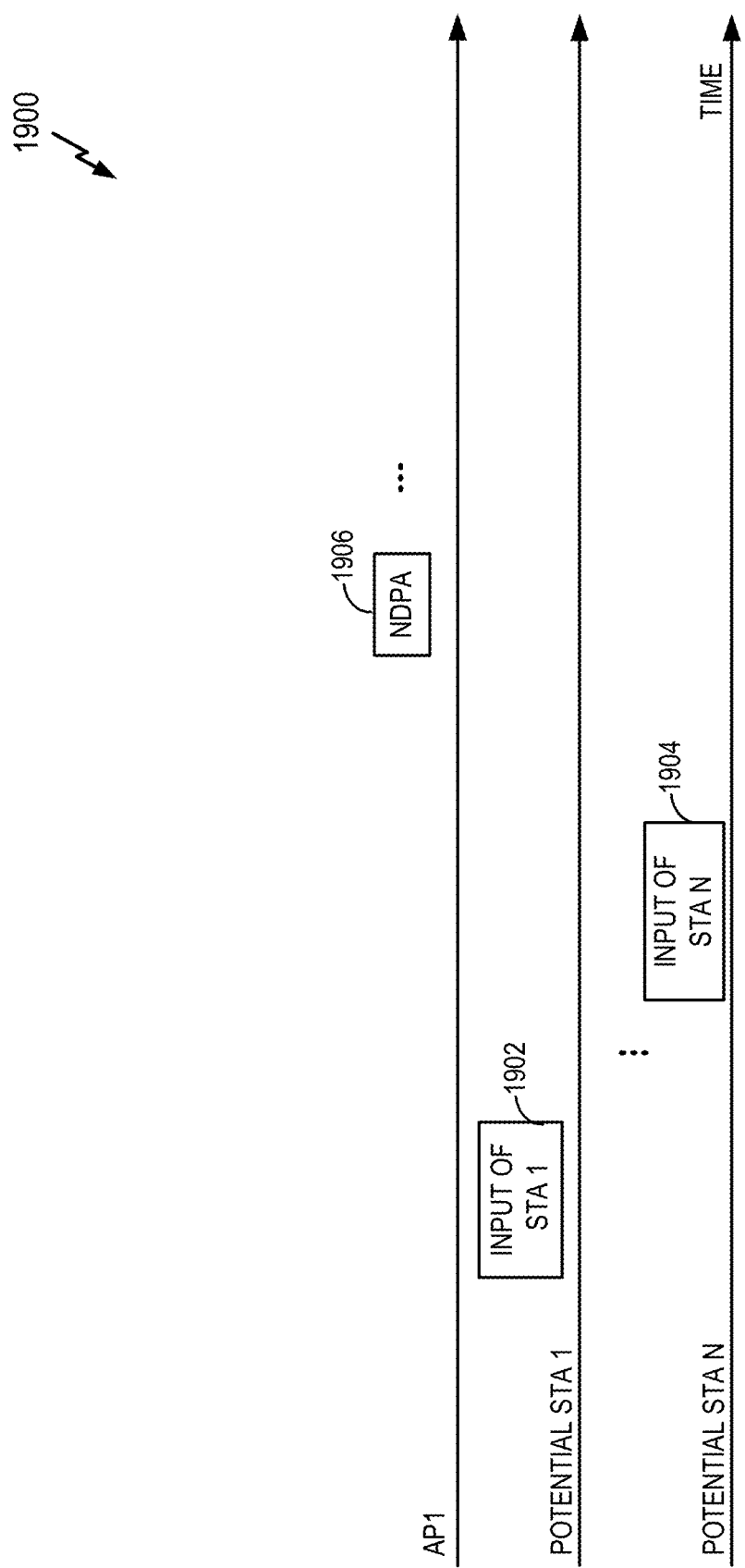
FIG. 19 illustrates an example of stations advertising their per-station information in transmitted frames in accordance with some aspects of the disclosure.

In an alternate implementation depicted by the signaling 1900 of FIG. 19, STAs that are potential DL COBF receivers can advertise their per-STA information in transmitted frames 1902-1904. Information locations in the frame can be similar to the above AP advertisement scenario. A scheduler (AP1 in this example) decides scheduling based on latest advertisement from advertising STAs, and reports its scheduling decision to the sends of the NDPA 1906 (also AP1 in the example).

V-B-4. Method 3: Mix of Methods 1 and 2

A scheduler may inquire of participating APs only when the scheduler has not received its advertisement recently (e.g., in the last 50 ms). This potentially saves inquiry overhead.

V-B-5. Method 4: Wired Backhaul Based

A scheduler may collect sounding scheduling input from all participating APs via a wired backhaul. These APs can be in the same DL COBF cluster.

V-B-6. Dedicated Resource for Scheduling

In OTA Methods 1-3, scheduling-related information may be sent over dedicated resources different from the DL COBF transmission resources (e.g., in different time slots, frequency channels, and/or spatial streams). Scheduling-related information may include explicit inquiry and response frames for potential sounded STA information, autonomous advertisement frames for potential sounded STA information, and frames carrying a DL COBF sounding scheduling decision. For example, when a scheduler is not the NDPA sender, the scheduler can send a decision to the NDPA sender via those frames.

As a specific example, advertisement frames can be sent in periodic time windows on a common management channel (e.g., a channel in a 900 MHz band or a 2.4 GHz band).

V-B-7. Limit on Reported Number of STAs

To save overhead, there may be limit on the reported or advertised number of candidate STAs to be in-sounding in Methods 1-4. In Method 1, the limit can be specified by the inquiring AP in an inquiry frame. In Method 2, the limit can be specified by the cluster leader AP. In Method 4, the limit can be specified by a central controller.

The limit can include the total reported/advertised number of candidate STAs per AP. The limit could also include the total maximum number of supported streams of reported/advertised candidate STA #per AP. The above metrics can be for the total candidate STAs, the total candidate STAs requiring nulling, or the total candidate STAs not requiring nulling.

VI. DL Coordinated Beamforming Transmission Scheduling Signaling and Input Collection A scheduling decision may be made by one node in some scenarios (e.g., an AP participating in a DL COBF transmission or leading a DL COBF cluster, or a central controller connected to all the APs via a backhaul). The scheduler ensures that each participating AP has sufficient dimensions to serve the selected InBSS STAs and null the selected OBSS STAs requiring nulling.

The disclosure relates in some aspects to techniques for the scheduler to signal the decision to each participating AP, and the contents of the decision. In this way, each AP knows which InBSS STAs to serve and which OBSS STAs to null in the DL COBF transmission.

A node may signal a scheduling decision in a frame before a DL COBF transmission (e.g., a trigger frame to trigger a DL COBF transmission). A scheduling decision may include each scheduled STA ID, the corresponding number of streams, the OBSS AP IDs if nulling is needed, and the resources for the UL ACK. The frame sending node can be the scheduler. Otherwise, the scheduler will pass the scheduling decision to the frame sending node.

The disclosure relates in some aspects to techniques for determining which inputs to use for the above scheduling, and how the scheduler can collect them. Here, the scheduler determines which DL COBF capable STAs per BSS have DL data (e.g., scheduled) and their urgency at that moment.

A scheduler may collect inputs about candidate STAs per BSS using the following four methods.

A first method (Method 1) involves an OTA explicit inquiry. The scheduler explicitly queries each AP for the inputs for the AP's BSS prior to COBF transmission.

A second method (Method 2) involves an OTA autonomous advertisement. The scheduler knows the inputs from a previous advertisement per AP.

A third method (Method 3) is a mix of Method 1 and Method 2. The scheduler inquires only when it is not receiving advertisements.

A fourth method (Method 4) uses a wired backhaul. The scheduler collects inputs from all APs via a wired backhaul.

VI-A. Signaling of DL COBF Scheduling Decision

The following operations may be used to signal a DL COBF scheduling decision.

VI-A-1. Frame for Sending a DL COBF Scheduling Decision

Figure 20:
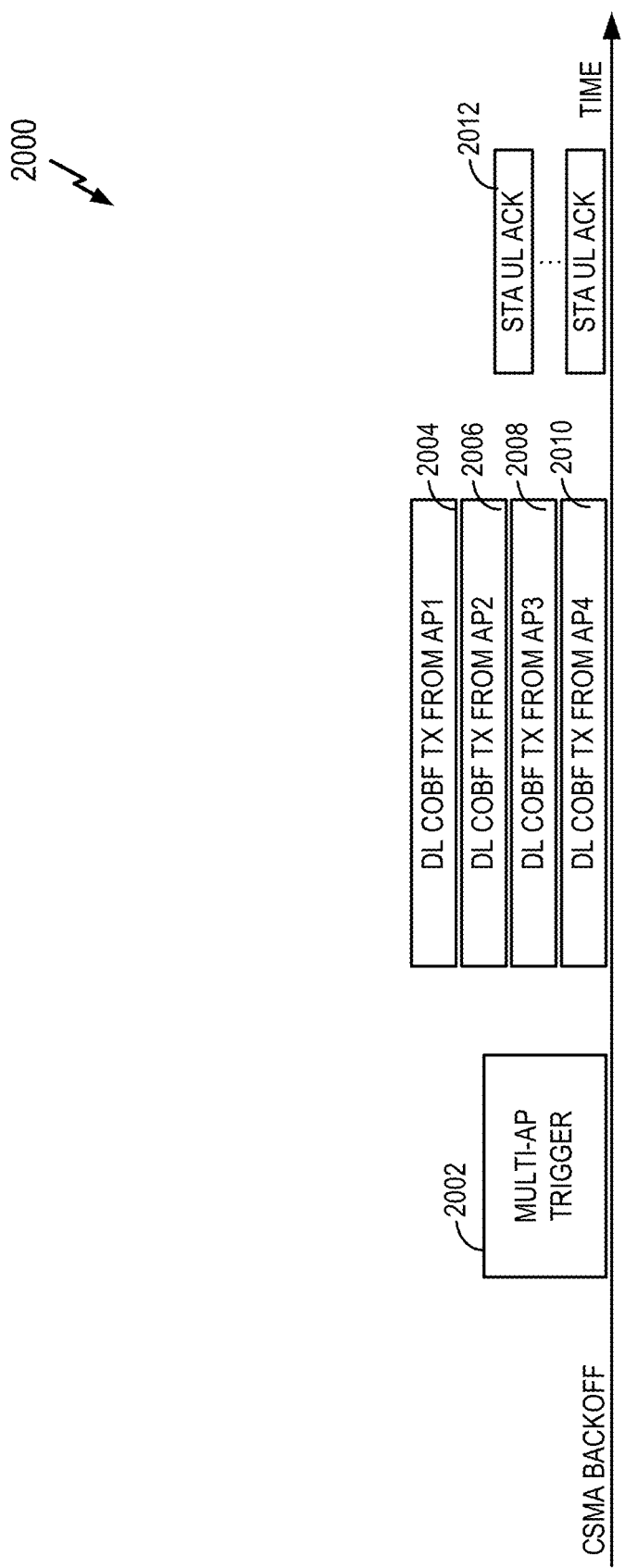
FIG. 20 illustrates an example of sending a multiple access point trigger to initiate a downlink coordinated beamforming transmission in accordance with some aspects of the disclosure.

Referring to the signaling 2000 of FIG. 20, a cluster leader AP or any AP can send a "Multi-AP trigger" to initiate a DL COBF transmission. In the example of FIG. 20, an AP sends a "Multi-AP trigger" 2002 that triggers a DL COBF transmission 2004 from AP1, a DL COBF transmission 2006 from AP2, a DL COBF transmission 2008 from AP3, and a DL COBF transmission 2010 from AP4. STAs in the cluster respond to these DL COBF transmissions with UL ACKs 2012.

The scheduling decision can be sent in a trigger frame if the scheduler is also the node sending the trigger. Otherwise, the scheduler may pass the scheduling decision to the triggering node.

Alternatively, the scheduling decision can be sent in a separate frame before or after the trigger frame. The scheduler may pass the scheduling decision to the frame sender in this case.

VI-A-2. Scheduling Signaling for a Sequence of DL COBF Transmission

Figure 21:
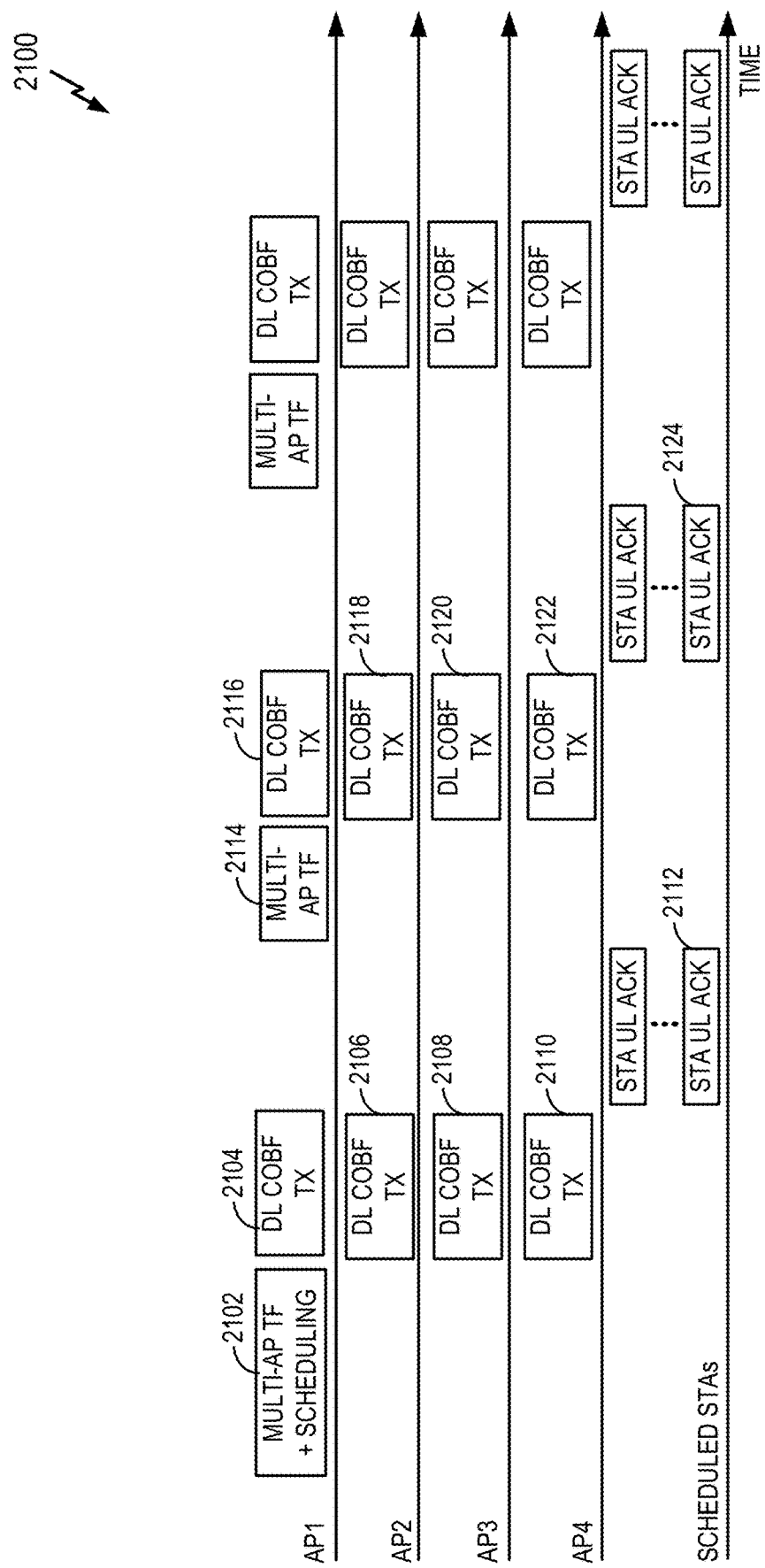
FIG. 21 illustrates an example of signaling where an initiating node holds a long transmission opportunity for a sequence of downlink coordinated beamforming transmissions in accordance with some aspects of the disclosure.

Referring to the signaling 2100 of FIG. 21, an initiating node may hold a long TXOP for a sequence of DL COBF transmissions. The scheduling decision per transmission can be signaled in the following options. In a first option, decisions for all transmission are signaled in a master frame (e.g., the 1st multi-AP TF). In a second option, the decision per transmission is signaled in multi-AP TF prior to the DL COBF transmission. In addition, the 1st TF may indicate the STA IDs potentially scheduled in following transmissions.

FIG. 21 illustrates an example of the first option where a master frame 2102 (e.g., a multi-AP TF with scheduling for all transmissions) triggers a DL COBF transmission 2104 from AP1, a DL COBF transmission 2106 from AP2, a DL COBF transmission 2108 from AP3, and a DL COBF transmission 2110 from AP4. Scheduled STAs in the cluster respond to these DL COBF transmissions with UL ACKs 2112.

FIG. 21 also illustrates an example of the second option where a trigger frame 2114 (e.g., a multi-AP TF with scheduling for the next transmission) triggers a DL COBF transmission 2116 from AP1, a DL COBF transmission 2118 from AP2, a DL COBF transmission 2120 from AP3, and a DL COBF transmission 2122 from AP4. Scheduled STAs in the cluster respond to these DL COBF transmissions with UL ACKs 2124.

Figure 22:
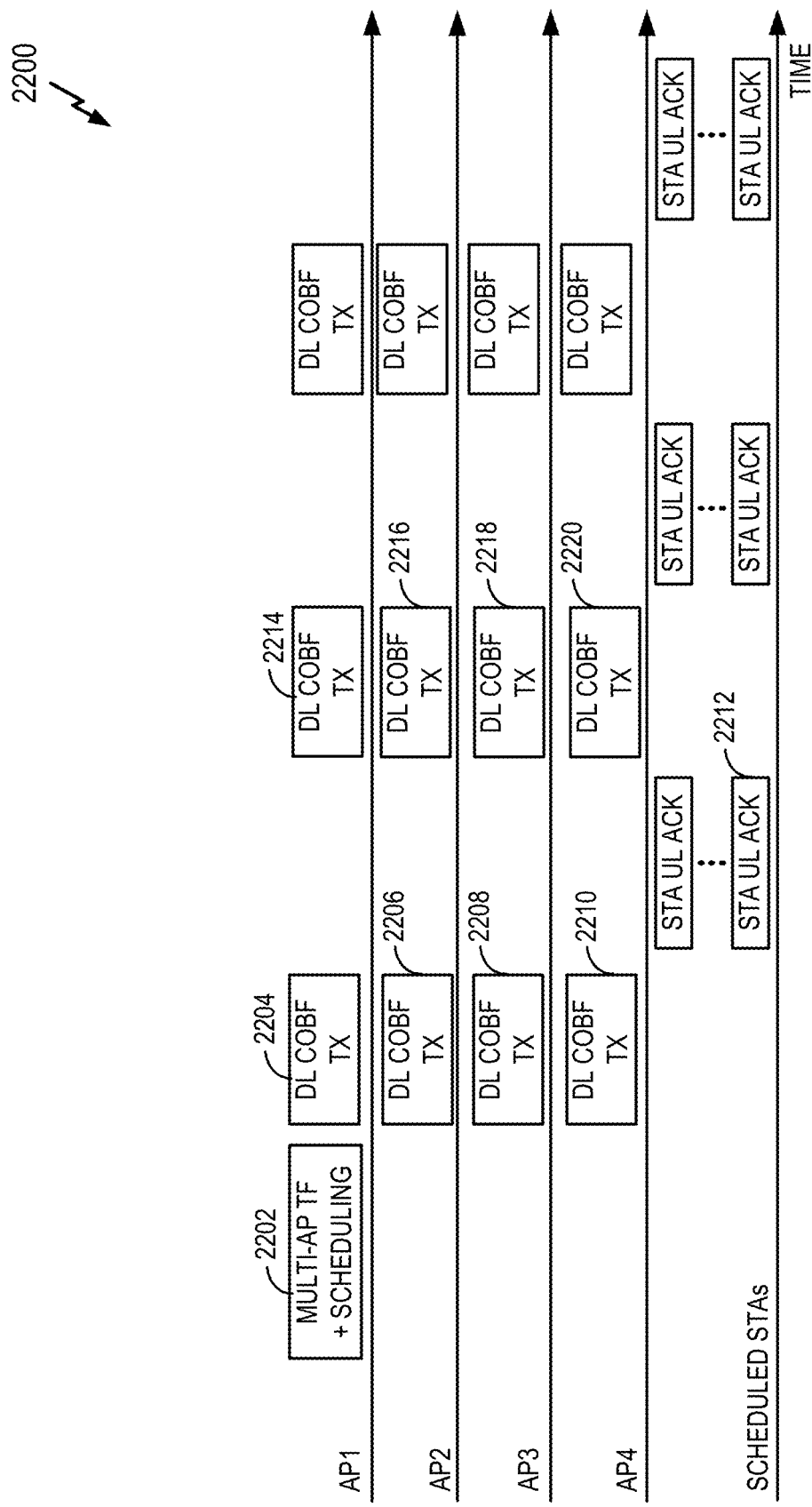
FIG. 22 illustrates an example of signaling where subsequent multiple access point trigger frames are ignored in accordance with some aspects of the disclosure.

Referring to the signaling 2200 of FIG. 22, in a scenario with multiple DL COBF transmissions per TXOP, the sequence may be simplified by ignoring the following multi-AP TFs. Alternatively, or in addition, the STA UL ACK may be replaced by a delayed ACK (e.g., that is solicited by the AP at a later time).

In FIG. 22, a master frame 2202 (e.g., a multi-AP TF with scheduling for all transmissions) triggers a DL COBF transmission 2204 from AP, a DL COBF transmission 2206 from AP2, a DL COBF transmission 2208 from AP3, and a DL COBF transmission 2210 from AP4. Scheduled STAs in the cluster respond to these DL COBF transmissions with UL ACKs 2212. The master frame 2202 also triggers a DL COBF transmission 2214 from AP1, a DL COBF transmission 2216 from AP2, a DL COBF transmission 2218 from AP3, a DL COBF transmission 2220 from AP4, and so on.

VI-A-3. Contents of the DL COBF Scheduling Decision

A scheduling decision may include scheduling information for data transmission and scheduling information for UL ACK transmission.

Scheduling information for data transmission may include scheduled STA IDs per BSS. In addition, this information may include, for each of the above STAs, a start stream index, the number of streams, the modulation and coding scheme (MCS), and the OBSS AP IDs if nulling is required from them. Or equivalently, the information may include the OBSS APs not required for nulling, e.g., in a cluster. The information could also include the total duration and bandwidth of the DL COBF transmission.

Scheduling information for UL ACK transmission may include, for each scheduled STA, the STA ID and ACK resource information (e.g., start stream index, number of streams, time slot, sub-band, and MCS).

VI-A-4. AP/STA Actions After Receiving Decision

After receiving a scheduling decision, each AP participating in a DL COBF transmission may take the following action. The AP may perform a DL COBF transmission for scheduled InBSS STAs while forming nulls to OBSS STAs requiring nulling from the AP. The AP may also pass UL ACK scheduling information to each scheduled InBSS STA via a DL COBF transmission. For example, this information may be sent in an HE control field in a data frame or a separate trigger frame addressed to each scheduled STA (e.g., an NDP short frame).

After receiving a DL COBF transmission, each STA may send an UL ACK based on the indicated UL ACK scheduling information.

VI-B. Input Collection for DL COBF Scheduling

The following input collection operations may be used for DL COBF scheduling. As described before, the scheduler collects candidate STA information per BSS to scheduled STAs across BSSs for each DL COBF transmission.

VI-B-1. Method 1: OTA Explicit Inquiry

Figure 23:
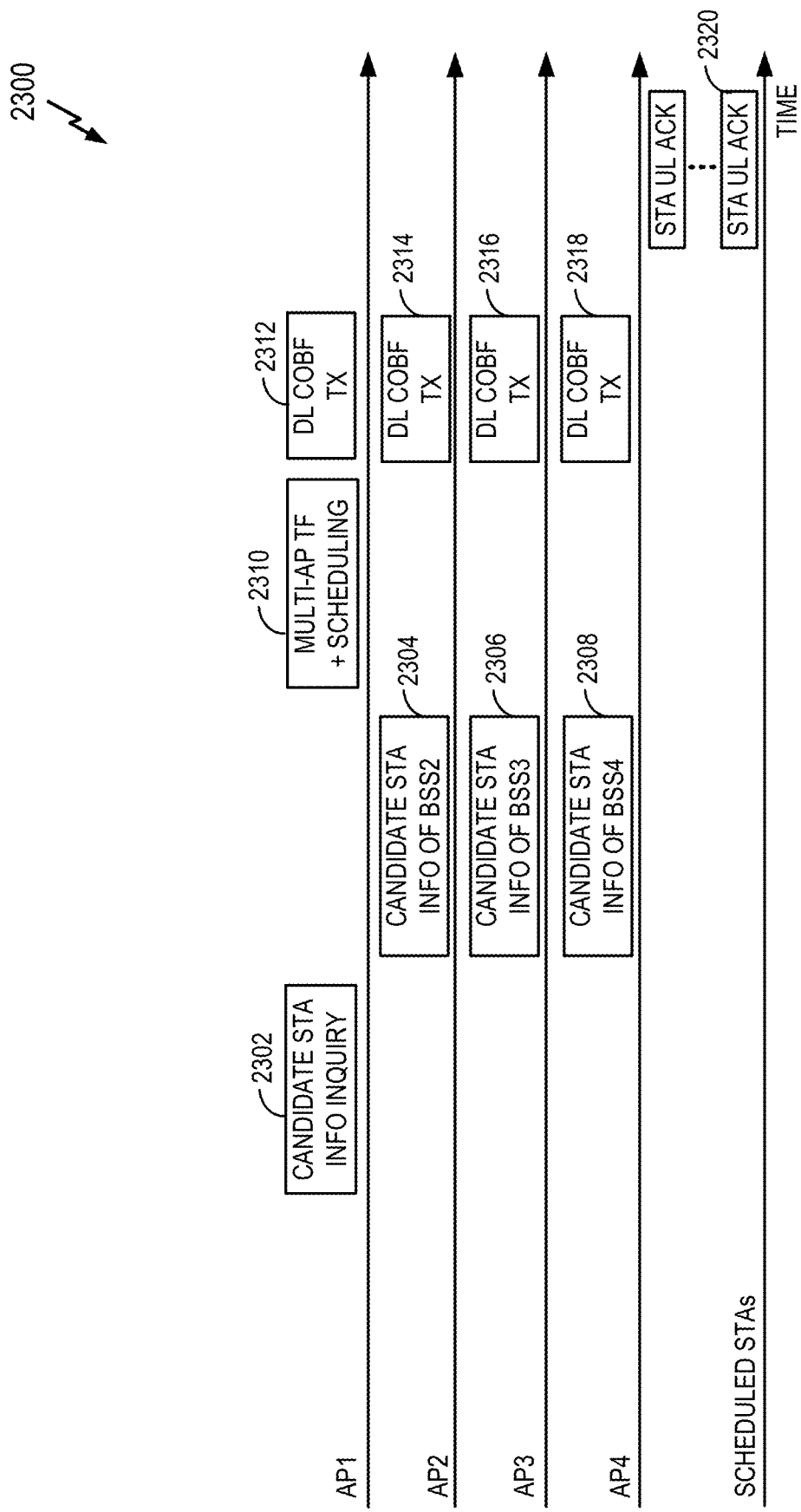
FIG. 23 illustrates an example of downlink coordinated beamforming scheduling involving sending an inquiry frame to solicit candidate station information from a set of access points in accordance with some aspects of the disclosure.

Referring to the signaling 2300 of FIG. 23, after obtaining a transmission opportunity (TXOP), a scheduler (AP1 in the example of FIG. 23) sends an inquiry frame 2302 to solicit candidate STA information from a set of APs. The inquiry frame also indicates the resources per AP response, e.g., different sub-bands, spatial streams, time slots, etc.

Each AP responds with candidate STA information of its BSS. In FIG. 23, AP2 responds with the candidate STA information of BSS2 2304, AP3 responds with the candidate STA information of BSS3 2306, and AP4 responds with the candidate STA information of BSS4 2308.

The scheduler sends a TF 2310 with the scheduling decision based on collected inputs. AP1 sends DL COBF transmission 2312, AP2 sends DL COBF transmission 2314, AP3 sends DL COBF transmission 2316, and AP4 sends DL COBF transmission 2318. The scheduled STAs send their UL ACKs 2320.

VI-B-2. Method 2: OTA Autonomous Advertisement.

Figure 24:
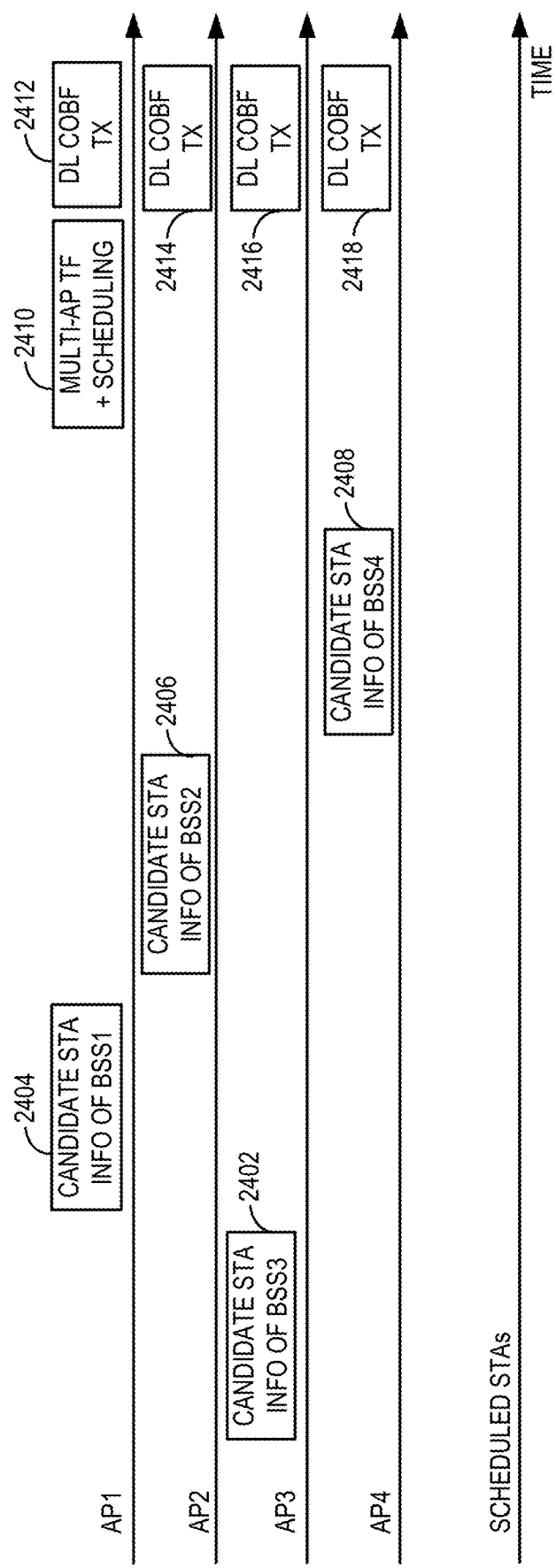
FIG. 24 illustrates an example of downlink coordinated beamforming scheduling where each access point advertises candidate station information in the access point's transmitted frames in accordance with some aspects of the disclosure.

Referring to the signaling 2400 of FIG. 24, each AP advertises candidate STA information in its transmitted frames (the AP may signal in a PHY preamble that the frame carries candidate STA information, so the OBSS APs will not drop the frame for reuse). For example, the information may be advertised in a PHY preamble, such as in new fields in SIG-A, SIG-B, or a new SIG-C. The information may be advertised in a MAC header, such as a new HE control field, e.g., in an AP's TF. In a DL MU PPDU, a new HE control field can be multicast to other APs in the same cluster on a dedicated resource unit, with RA as the cluster ID. The information could also be sent in a new IE, or sent in a management/action frame body, such as beacons.

In FIG. 24, AP3 sends the candidate STA information of BSS3 2402, AP1 sends the candidate STA information of BSS1 2404, AP2 sends the candidate STA information of BSS2 2406, and AP4 sends the candidate STA information of BSS4 2408.

After obtaining a TXOP, the scheduler (AP1 in the example of FIG. 24) determines the scheduling based on the latest advertisement per AP, and sends out a TF 2410. AP1 sends DL COBF transmission 2412, AP2 sends DL COBF transmission 2414, AP3 sends DL COBF transmission 2416, and AP4 sends DL COBF transmission 2418.

VI-B-3. Method 3: OTA Autonomous Advertisement at Predefined Times

Figure 25:
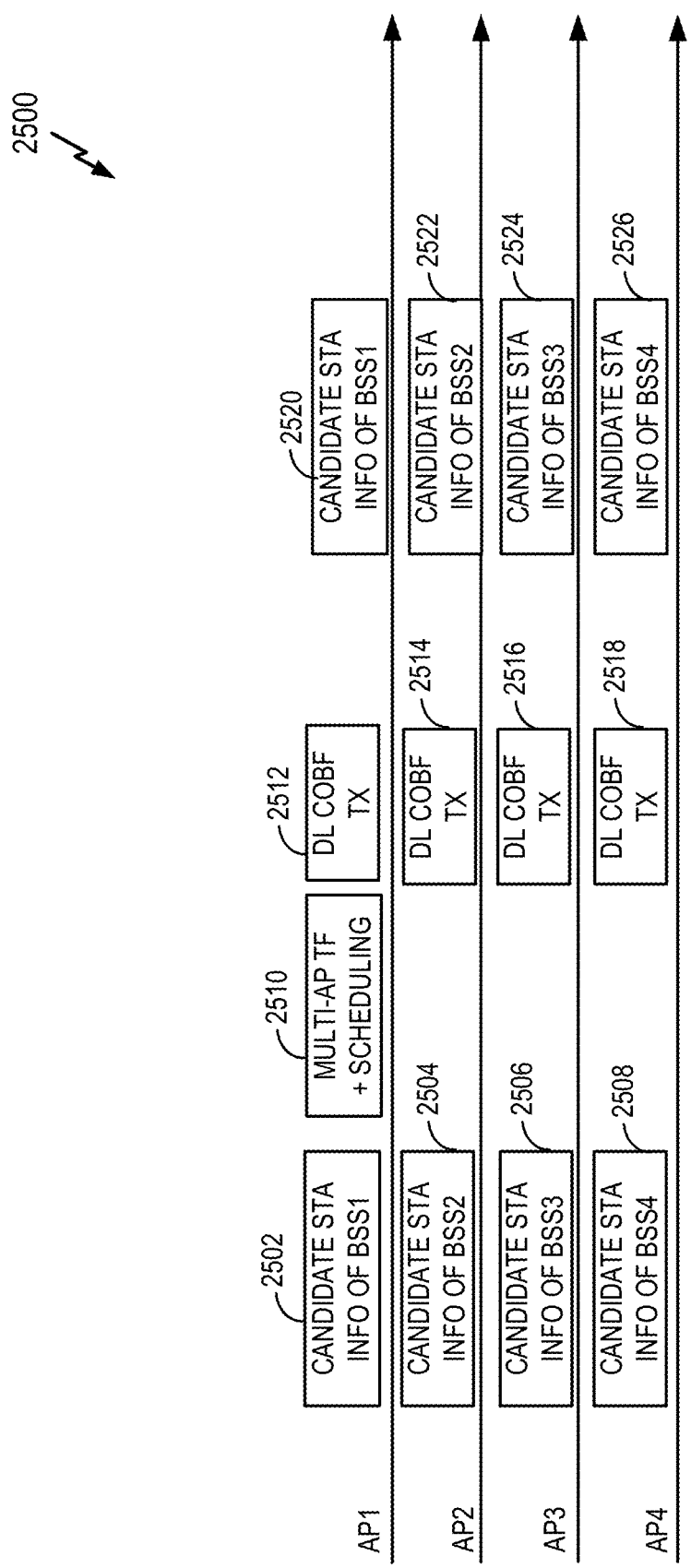
FIG. 25 illustrates an example of downlink coordinated beamforming scheduling where each access point advertises candidate station information during defined time periods in accordance with some aspects of the disclosure.

Method 3 is similar to Method 2, however, there are defined time periods where APs can publish this information as shown, for example, in FIG. 25. The scheduling AP will be listening during the 'advertisement' periods to gather information from other APs. The schedule may be advertised by the scheduler towards the end of each advertisement time period. In some systems, the schedule will hold true until the next advertisement time period.

In FIG. 25, AP1 sends the candidate STA information of BSS1 2502, AP2 sends the candidate STA information of BSS2 2504, AP3 sends the candidate STA information of BSS3 2506, and AP4 sends the candidate STA information of BSS4 2508 during a first time period. AP1 sends out a TF 2510, after which AP1 sends DL COBF transmission 2512, AP2 sends DL COBF transmission 2514, AP3 sends DL COBF transmission 2516, and AP4 sends DL COBF transmission 2518. Subsequently, AP1 sends the candidate STA information of BSS1 2520, AP2 sends the candidate STA information of BSS2 2522, AP3 sends the candidate STA information of BSS3 2524, and AP4 sends the candidate STA information of BSS4 2526 during a second time period.

VI-B-4. Method 3: Mix of Method 1 and 2

The scheduler inquires the AP only when the scheduler has not received its advertisement recently, e.g., in the last 50 ms. This may save inquiry overhead.

VI-B-5. Method 4: Wired backhaul based

The scheduler collects candidate STA information from all of the APs via a wired backhaul. These APs can be in same DL COBF cluster.

VI-B-6. Dedicated Resource for Scheduling Related Information

In OTA Methods 1-3, the scheduling related information may be sent over dedicated resources that are different from the DL COBF transmission resources (e.g., different time slots, frequency channels, and/or spatial streams). The scheduling related information may include explicit inquiry and response frames for candidate user information, autonomous advertisement frames for candidate user information, frames carrying DL COBF transmission scheduling decision, and frames triggering multi-AP DL COBF transmission. The information could be sent in a channel different from the DL COBF transmission.

As a specific example, advertisement frames can be sent in periodic time windows on a common management channel, e.g., a channel in 900 MHz or 2.4 GHz band.

VI-B-7. Contents of Candidate STA Information

The candidate STA information sent by AP may contain, for example, STA information for data transmission and STA information for UL ACK transmission.

The STA information for data transmission may include candidate STA IDs in the AP's BSS. Typically, these STAs would support DL COBF Rx and have DL data at this moment. The information may also include, for each candidate STA, DL COBF receive capability (e.g., max stream #per supported BW, support partial BW or not), required DL data resources (e.g., transmission duration for a reference BW and stream #, or amount of buffered data+MCS), OBSS AP IDs if nulling is required from them (considered APs could be those in same cluster), scheduling priority metrics (e.g., highest access category, longest waiting time, latency requirement, proportional fair metric (ratio of instant rate to average rate), of buffered DL data), and inputs to check the DL RSSI difference (as specified below).

The STA information for an UL ACK transmission may include, for each candidate STA, UL ACK transmission capability, required UL ACK resources (similar to the above for the DL COBF data transmission), and MCS.

VI-B-8. Inputs for DL RSSI Difference Check

The following check ensures that participating APs across BSSs can mutually satisfy maximum a tolerable RSSI difference requirement at their scheduled STAs. For every participating STA, each OBSS AP's RSSI at a STA (without nulling) should be less than or equal to the maximum tolerable RSSI at the STA. Alternatively, the condition "each OBSS AP's" may be replaced by "the sum of the OBSS APs'."

The above check may use the following inputs per candidate STA.

A first input (Input 1) is the maximum tolerable RSSI at a STA. This is equal to the STA's own AP's RSSI for the STA plus the maximum tolerable RSSI difference. An AP's RSSI for a STA is equal to the AP's allocated transmit power for the STA minus their PL.

A second input (Input 2) is every AP's RSSI at a STA. This RSSI is equal to the AP's total transmit power minus the corresponding PL. Both inputs can be replaced by other similar forms, e.g., variables to compute the inputs.

VI-B-9. Additional Inputs

A scheduler may ensure that DL COBF scheduling meets the following feasibility requirement. For each AP joining the DL COBF transmission, the total dimensions for nulling+its dimensions serving InBSS STAs<=its total available dimensions for DL COBF.

To check the above requirement, the scheduler may determine that total available dimensions for the DL COBF per AP. This information can be acquired via OTA messages. For example, each AP can signal its total dimensions for DL COBF in transmitted frames, e.g., in a new "DL COBF capability" information element (IE) in beacons, or sent together with candidate STA information.

VI-B-10. Limit on Reported Number of STAs

To save overhead, there may be limit on the reported or advertised number of candidate STAs in the just-described Methods 1-4. In Method 1, the limit can be specified by the inquiring AP in an inquiry frame. In Method 2, the limit can be specified by the cluster leader AP. In Method 4, the limit can be specified by a central controller.

The limit can have the following forms: total reported/advertised candidate STA number per AP; and total maximum number of supported streams of reported/advertised candidate STA number per AP. The above metrics can be for the total candidate STAs, the total candidate STAs requiring nulling, or the total candidate STAs not requiring nulling.

VI-B-11. Cascaded Scheduling

Figure 26:
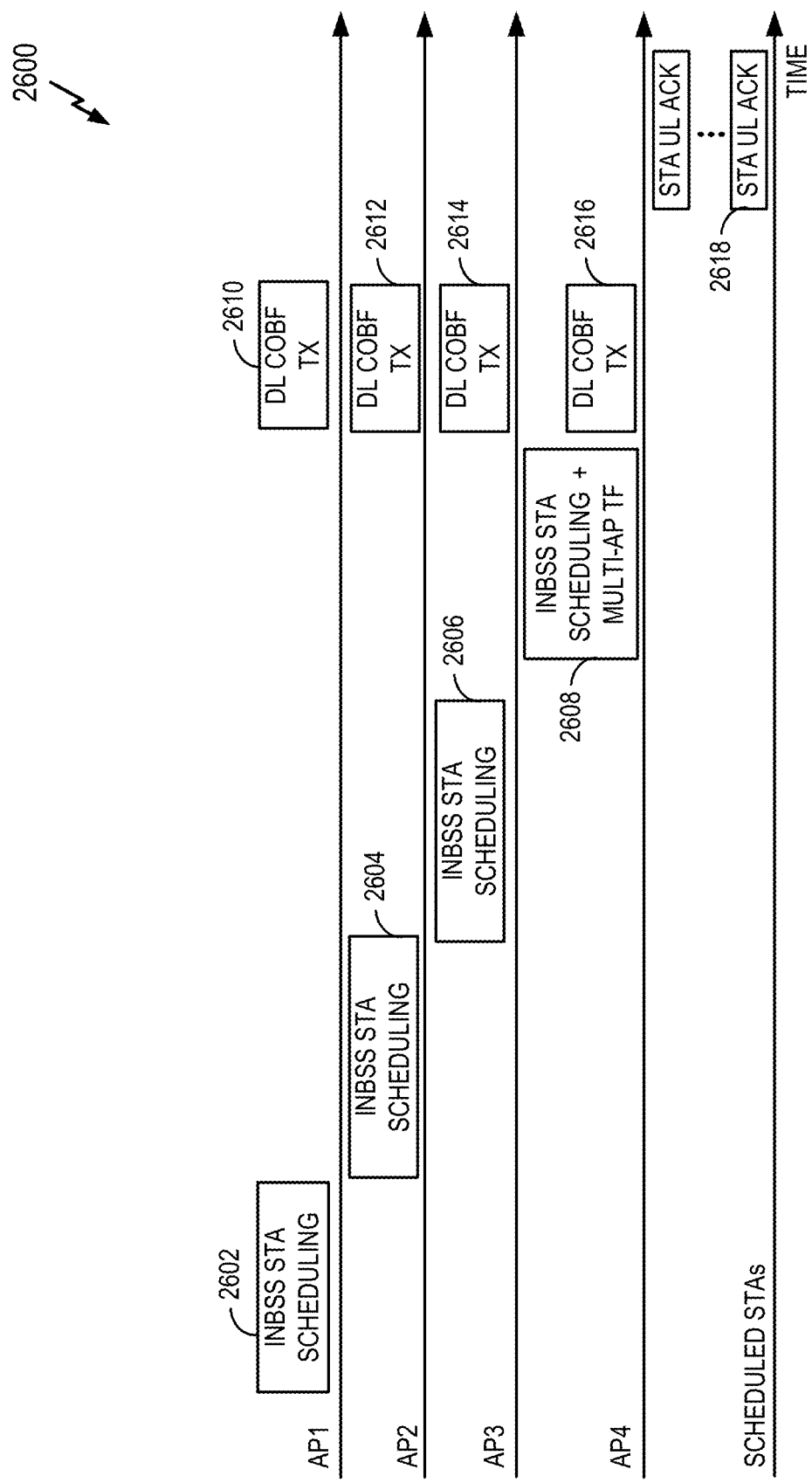
FIG. 26 illustrates an example of downlink coordinated beamforming cascaded scheduling in accordance with some aspects of the disclosure.

An example of cascaded scheduling is shown in the signaling 2600 of FIG. 26. As noted above, the previous methods describe scenarios where one scheduler makes the scheduling decision. In other implementations, the scheduling decision can be made by all APs in a distributed way. After obtaining a TXOP, an initiating node (AP1 in the example of FIG. 26) sends a frame 2602 with a scheduling decision for its own InBSS STAs. The frame indicates the order for the OBSS APs to respond with a decision for their InBSS STAs. The frame also indicates orthogonal partitions of remaining resources among the OBSS APs for both the DL COBF transmission and the UL ACK (e.g., AP2-AP4 use the remaining dimensions 3-4, 5-6, and 7-8 for their InBSS STAs, respectively).

Each AP responds in an assigned order with a scheduling decision for its own InBSS STAs within an assigned resource range. In FIG. 26, AP2 send its scheduling decision 2604, followed by AP3 sending its scheduling decision 2606, followed by AP4 sending its scheduling decision 2608. Thus, each AP knows the other APs' decisions.

The last AP's response (AP4 in this example) also triggers the multi-AP DL COBF transmission. AP1 sends DL COBF transmission 2610, AP2 sends DL COBF transmission 2612, AP3 sends DL COBF transmission 2614, and AP4 sends DL COBF transmission 2616. The scheduled STAs send their UL ACKs 2618.

VII. UL Coordinated Beamforming Receive Scheduling Signaling and Input Collection For the UL, a scheduling decision may be made by one node in some scenarios (e.g., an AP participating in an UL COBF reception or leading an UL COBF cluster, or a central controller connected to all the APs via a backhaul). The scheduling node ensures that each participating AP has sufficient dimensions to serve the selected InBSS STAs and null the selected OBSS STAs requiring nulling in the UL.

The disclosure relates in some aspects to techniques for the scheduling node to signal the decision to each participating AP, and the contents of the decision. In this way, each AP knows which InBSS STAs to serve and which OBSS STAs to null in the UL COBF reception.

A node may signal a scheduling decision in a frame before an UL COBF reception (e.g., a scheduling frame prior to an AP TFs and UL COBF transmission). A scheduling decision may include each scheduled STA ID, the corresponding number of streams, the OBSS AP IDs if nulling is needed, and the resources for the DL ACK per AP. The decision can also include resource allocation per AP's TF to trigger its STA's transmission. The frame sending node can be the scheduling node. Otherwise, the scheduling node may pass the scheduling decision to the frame sending node.

The disclosure relates in some aspects to techniques for determining which inputs to use for the above scheduling, and how the scheduling node can collect them. Here, the scheduling node may determine which UL COBF capable STAs per BSS have UL data and their urgency at that moment.

A scheduling node may collect inputs about candidate STAs per BSS using the following four methods.

A first method (Method 1) involves an OTA explicit inquiry. The scheduling node explicitly queries each AP or individual STAs directly.

A second method (Method 2) involves an OTA autonomous advertisement. The scheduling node knows the inputs from a previous advertisement per AP.

A third method (Method 3) is a mix of Method 1 and Method 2. For example, the scheduling node might inquire only when it is not receiving advertisements.

A fourth method (Method 4) uses a wired backhaul. The scheduling node collects inputs from all APs via a wired backhaul.

VII-A. Signaling of UL COBF Scheduling Decision

The following operations may be used to signal an UL COBF scheduling decision.

VII-A-1. Frame for Sending an UL COBF Scheduling Decision

Figure 27:
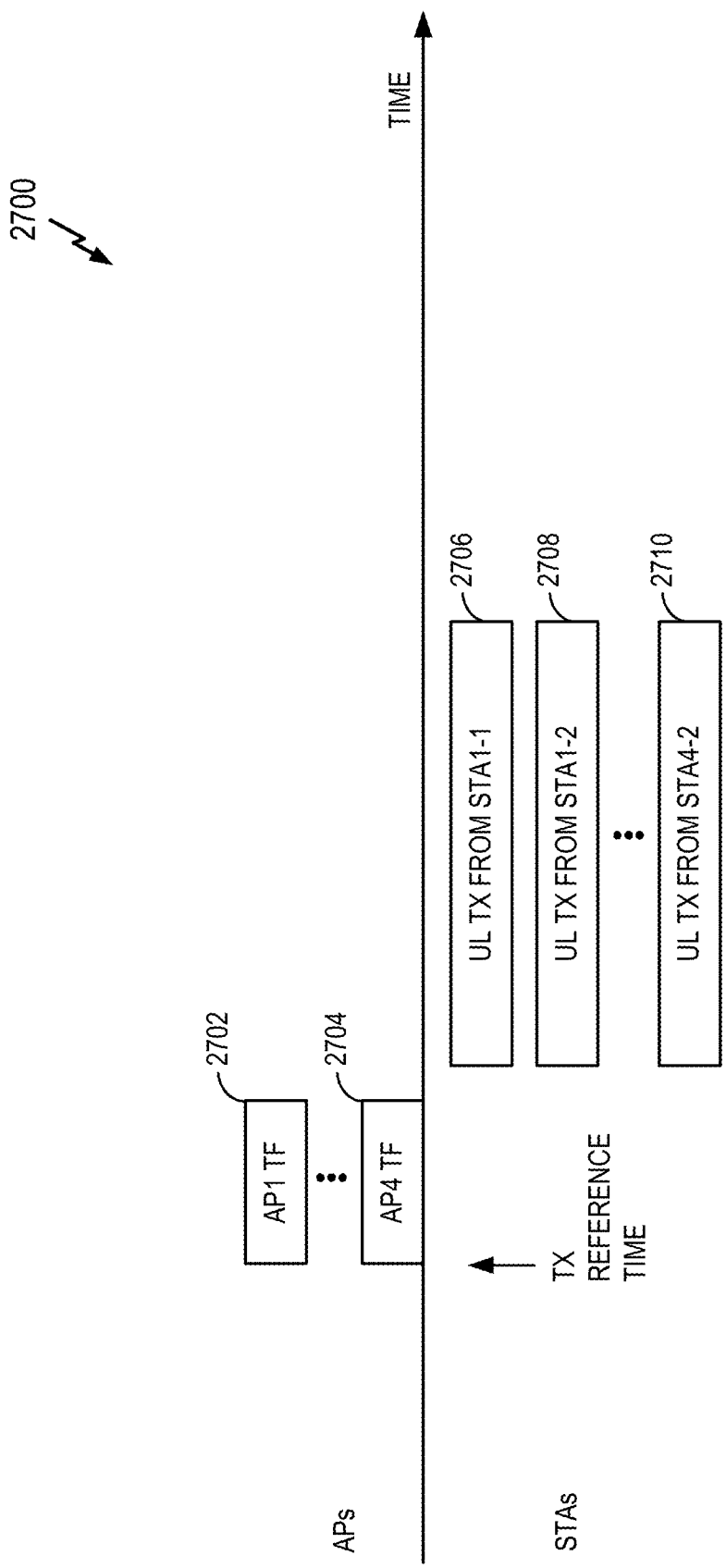
FIG. 27 illustrates an example of signaling where each access point sends an individual trigger frame to trigger an uplink transmission from its station(s) in accordance with some aspects of the disclosure.

Referring to the signaling of FIG. 27, to align an UL transmission from multi-BSS STAs, each AP may send an individual TF to trigger an UL transmission from its STAs at a target time. For example, AP1 to AP4 may each send a TF (represented by TFs 2702 to 2704). The STAs will then send their UL transmissions (represented by an UL transmission 2706 from STA1-1, an UL transmission 2708 from STA1-2, through an UL transmission 2710 from STA4-2) in response to the TFs 2702 to 2704.

A controller may provide a TF transmission reference time. The controller could be an AP or a separate entity.

To avoid interference, individual AP TFs may use orthogonal resources. For example, the TFs may be sent via different time slots, different frequency bands, of different spatial streams.

Figure 28:
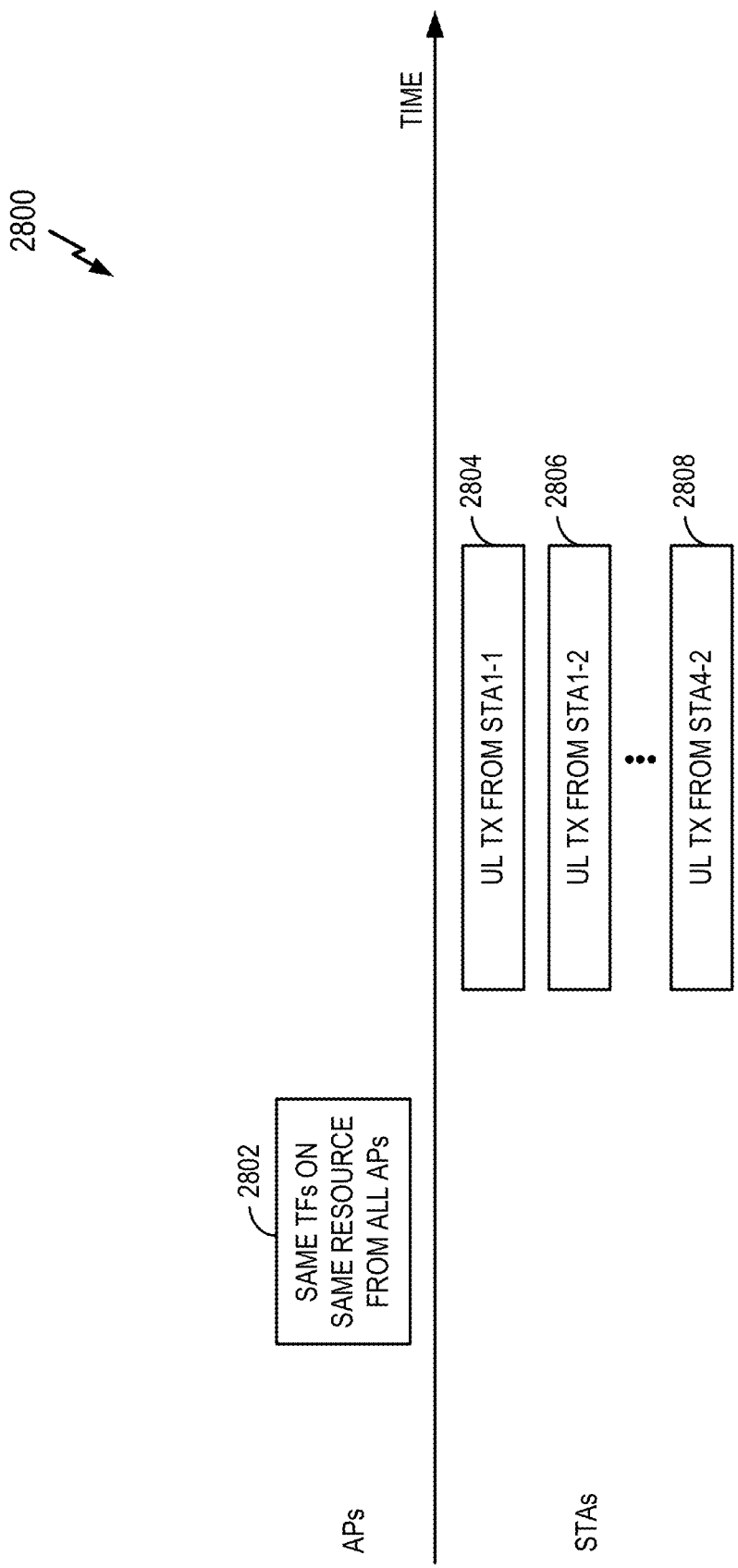
FIG. 28 illustrates an example of signaling where access points send trigger frames on the same resource in accordance with some aspects of the disclosure.

The signaling 2800 of FIG. 28 illustrates an alternative example that used a common resource instead of orthogonal resources for the TFs. In this case, individual AP TFs may use the same resource with identical PHY and MAC formats to send a Multi-BSS UL Trigger Frame 2802. The STAs will then send their UL transmissions (represented by an UL transmission 2804 from STA1-1, an UL transmission 2806 from STA1-2, through an UL transmission 2808 from STA4-2) in response to the TFs 2802. Here, the TFs 2802 carry the same contents and, hence, are essentially the same signal at a STA. This technique may require fewer resources than TFs in different time slots and may be easier to be received by STAs than TFs in difference sub-bands or spatial streams.

A node can send an UL COBF scheduling decision in a scheduling frame before or after individual AP TFs. The node can be a leader AP or any AP in a cluster winning the access (e.g., AP1). The scheduler passes the decision to the scheduling frame sender if the scheduler is not the sender. The scheduling frame may also act as a multi-AP TF for individual AP TFs.

After receiving a scheduling frame, each AP copies the decision at least related to its InBSS STAs to its individual TF. If TFs are sent on the same resource, the APs ensure that the TFs have identical contents, e.g., by copying a decision for all STAs to the TF. The scheduling frame sender may or may not send individual TFs.

Figure 29:
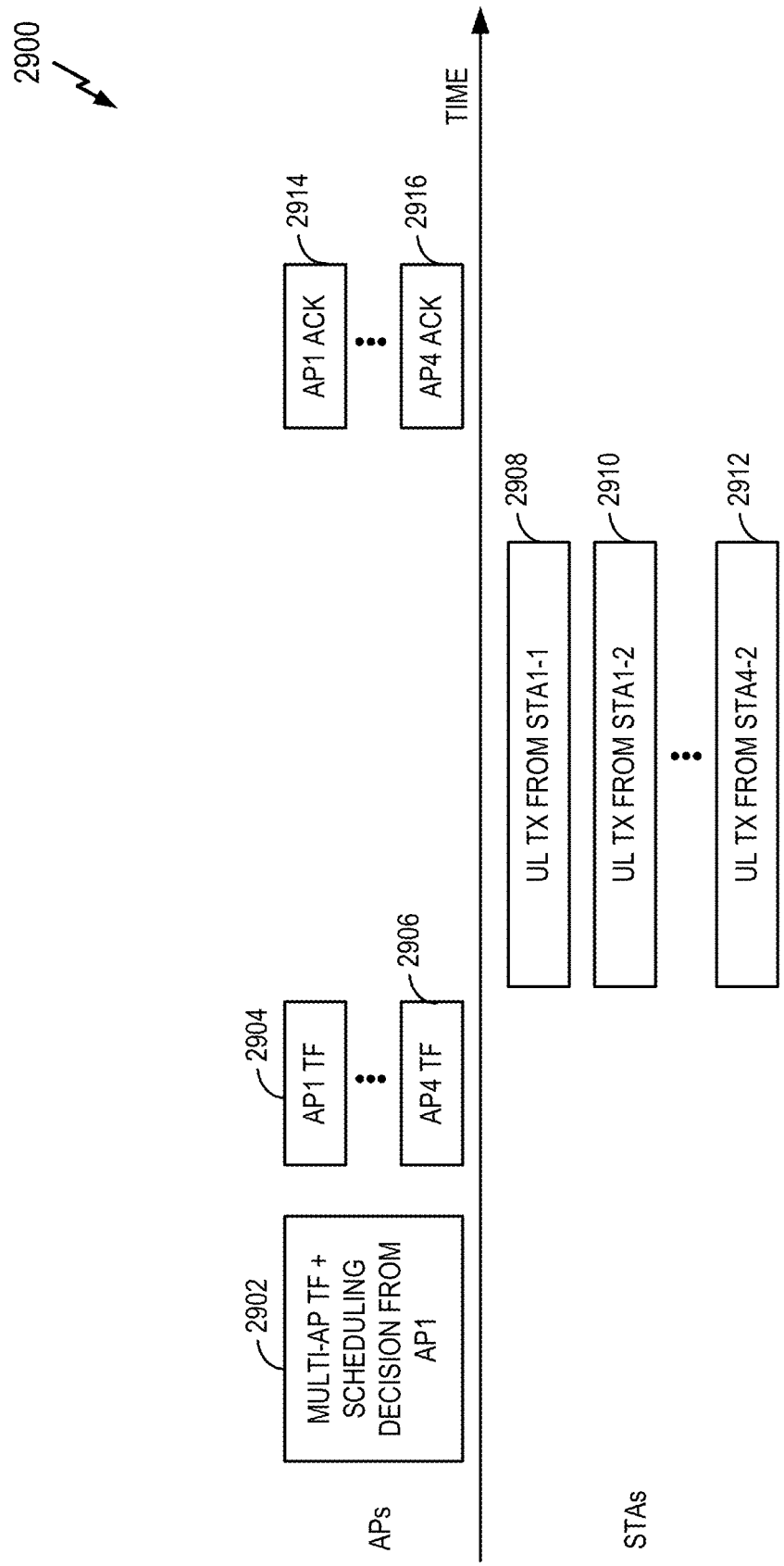
FIG. 29 illustrates an example of sending a scheduling decision in a scheduling frame in accordance with some aspects of the disclosure.

The signaling 2900 of FIG. 29 illustrates an example where AP1 sends a TF with a scheduling decision 2902, after which AP1 through AP4 send their own TFs (represented by TFs 2904 to 2906). The STAs send their UL transmissions (represented by an UL transmission 2908 from STA1-1, an UL transmission 2910 from STA1-2, through an UL transmission 2812 from STA4-2) in response to the TFs. The APs then acknowledge the UL transmissions (represented by an ACK 2914 from AP1 through an ACK 2916 from AP4).

Figure 30:
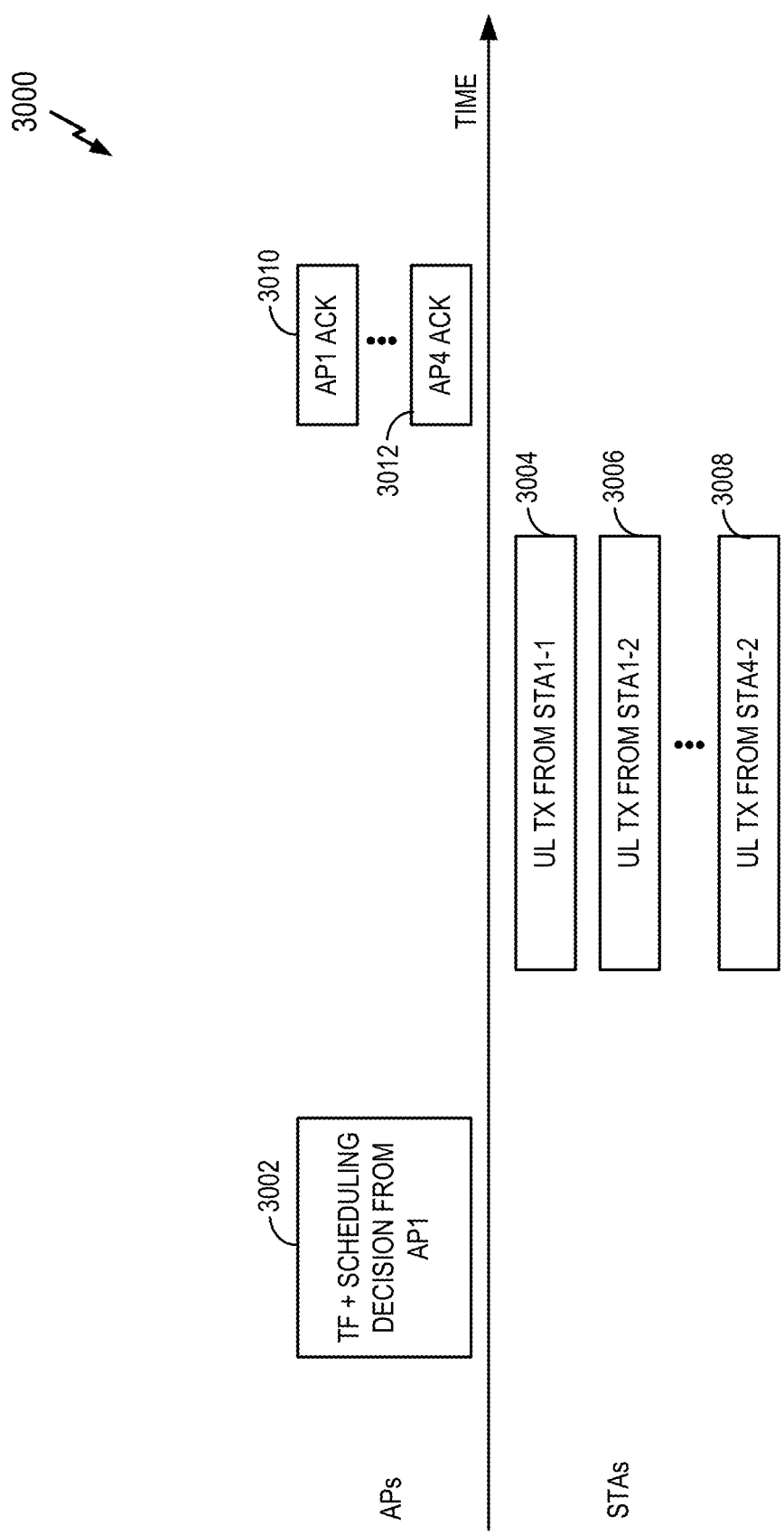
FIG. 30 illustrates an example of signaling where a scheduling frame directly triggers all scheduled stations in accordance with some aspects of the disclosure.

Referring to the signaling 3000 of FIG. 30, individual AP TFs may be avoided if all scheduled STAs are in range of the scheduling frame sender. In this case, the scheduling frame may directly trigger all of the scheduled STAs. An indicator in the scheduling frame can be set to inform the APs to skip the TFs. The scheduling frame sender can identify all of the STAs that are in range based on the scheduling input for them (discussed below), e.g., each STA's nulling AP IDs, DL/UL RSSI or PL to each AP in cluster.

In FIG. 30, AP1 sends a TF with a scheduling decision 3002, after which the STAs send their UL transmissions (represented by an UL transmission 3004 from STA1-1, an UL transmission 3006 from STA1-2, through an UL transmission 3008 from STA4-2) in response to the TF. The APs then acknowledge the UL transmissions (represented by an ACK 3010 from AP1 through an ACK 3012 from AP4).

VII-A-2. Scheduling Signaling for a Sequence of UL COBF Transmission

In some scenarios, an initiating node may hold a long TXOP for a sequence of UL COBF transmissions. A scheduling decision per transmission can be signaled using the following options. In a first option, decisions for all transmissions are signaled in a master frame (e.g., a first multi-AP TF). In a second option, a decision per transmission is signaled in multi-AP TF prior to each UL COBF transmission. In addition, the first multi-AP TF may indicate STA IDs potentially scheduled in following transmissions.

Figure 31:
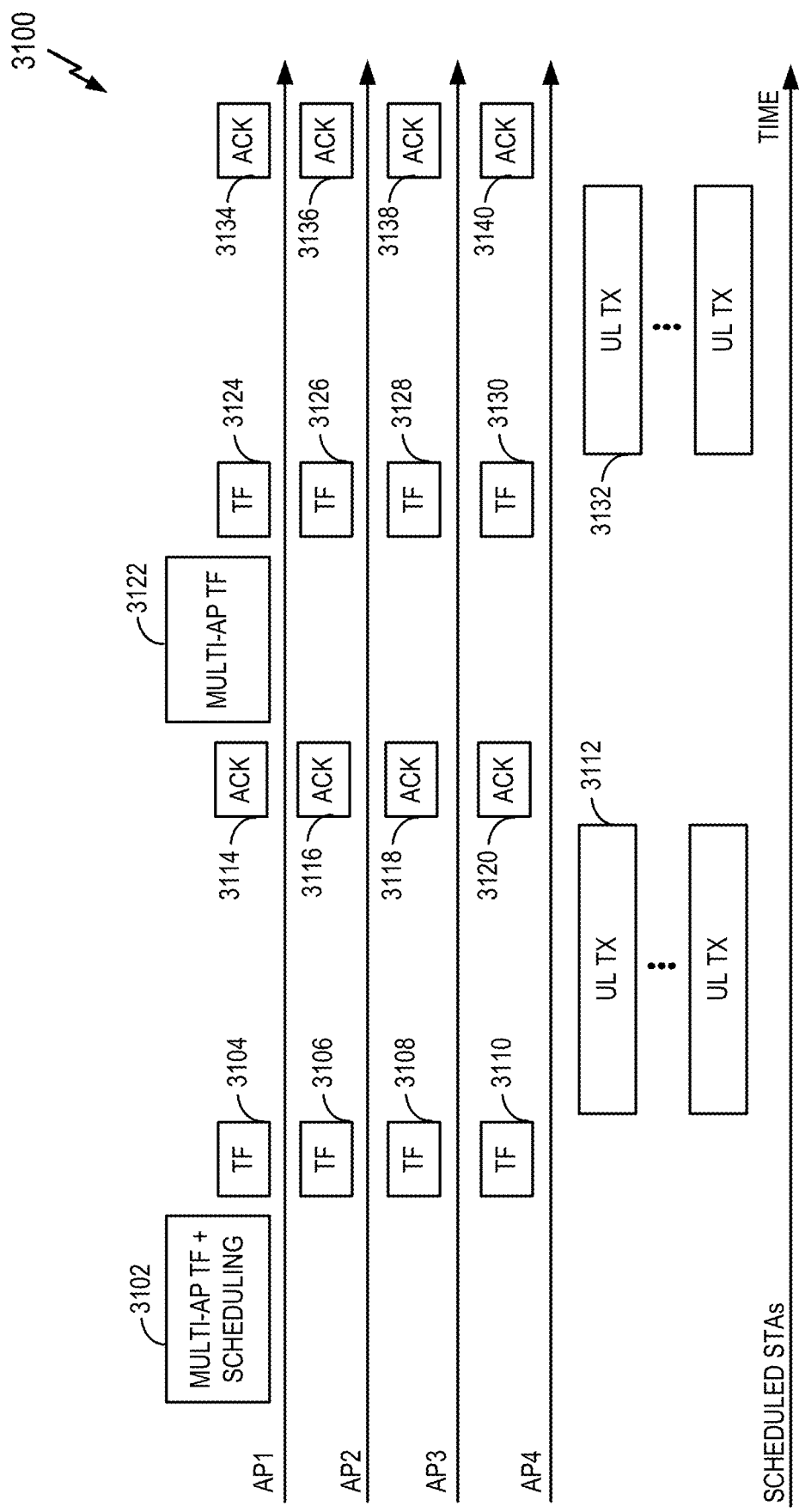
FIG. 31 illustrates an example of signaling where an initiating node holds a long transmission opportunity for a sequence of uplink coordinated beamforming transmissions in accordance with some aspects of the disclosure.

The signaling 3100 of FIG. 31 illustrates an example of the first option where a master frame 3102 (e.g., a multi-AP TF with scheduling for all transmissions) triggers a TF 3104 from AP1, a TF 3106 from AP2, a TF 3108 from AP3, and a TF 3110 from AP4. Scheduled STAs in the cluster respond to these TFs with UL COBF transmissions 3112. The APs then acknowledge the UL transmissions (represented by an ACK 3114 from AP1, an ACK 3116 from AP2, an ACK 3118 from AP3, and an ACK 3120 from AP4).

FIG. 31 also illustrates an example of the second option where a trigger frame 3122 (e.g., a multi-AP TF with scheduling for the next transmission) triggers a TF 3124 from AP1, a TF 3126 from AP2, a TF 3128 from AP3, and a TF 3130 from AP4. Scheduled STAs in the cluster respond to these TFs with UL COBF transmissions 3132. The APs then acknowledge the UL transmissions (represented by an ACK 3134 from AP1, an ACK 3136 from AP2, an ACK 3138 from AP3, and an ACK 3140 from AP4).

In a scenario with multiple UL COBF transmissions per TXOP, the sequence may be simplified by combining each AP's ACK with a TF and ignoring the multi-AP TFs in between. Alternatively, or in addition, the AP's ACK may be replaced by a delayed ACK (that is sent to the STA at a later time).

Figure 32:
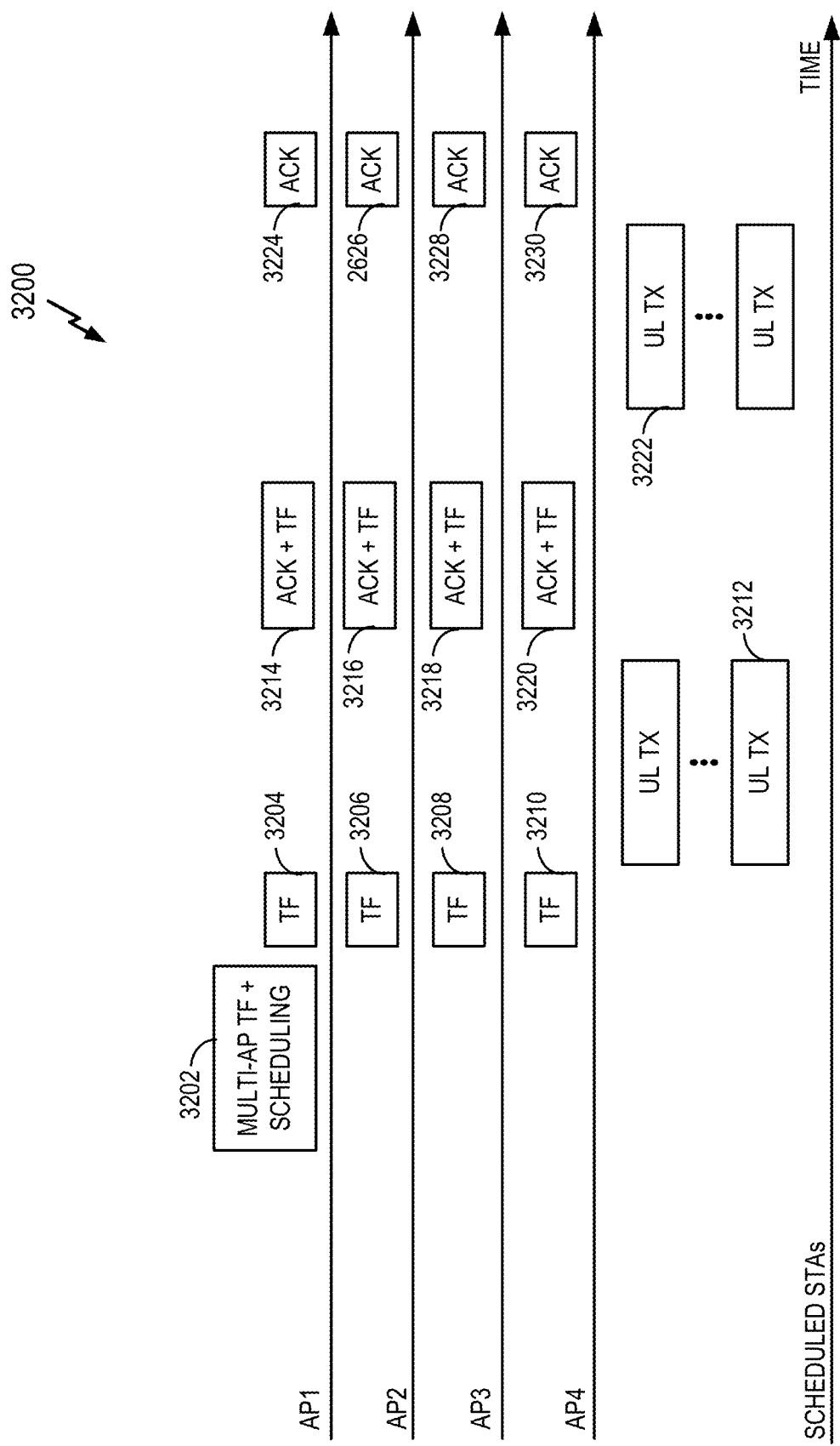
FIG. 32 illustrates an example of signaling where each access point's acknowledgement is combined with a trigger frame in accordance with some aspects of the disclosure.

The signaling 3200 of FIG. 32 illustrates an example of the second option where an ACK is combined with a TF. A master frame 3202 (e.g., a multi-AP TF with scheduling for all transmissions) triggers a TF 3204 from AP, a TF 3206 from AP2, a TF 3208 from AP3, and a TF 3210 from AP4. Scheduled STAs in the cluster respond to these TFs with UL COBF transmissions 3212. The APs then acknowledge the UL transmissions where each acknowledgment includes a TF (represented by an ACK+TF 3214 from AP1, an ACK+TF 3216 from AP2, an ACK+TF 3218 from AP3, and an ACK+TF 3220 from AP4). Scheduled STAs in the cluster respond to these ACK+TFs with UL COBF transmissions 3222. If there are no more UL transmissions, the APs simply acknowledge the last UL transmissions (represented by an ACK 3224 from AP1, an ACK 3226 from AP2, an ACK 3228 from AP3, and an ACK 3230 from AP4).

VII-A-3. Contents of UL COBF Scheduling Decision

The scheduling decision may include, for example, scheduling information for individual AP TFs, scheduling information for UL data transmission, and scheduling information for DL ACK transmission.

The scheduling information for individual AP TFs may include, for each participating AP, the AP ID, and the allocated resource for its TF (e.g., a start stream index, a stream #, a time slot, a sub-band, an MCS, etc.). The scheduling information may also include, for the whole individual AP TF transmission, the total duration and bandwidth.

The scheduling information for UL data transmission may include, for each scheduled STA, the STA ID, the allocated resource for its UL COBF transmission (as listed above), the OBSS AP IDs if UL nulling is required for those APs, the STA's target RSSI at the associated AP or the STA's maximum target RSSI, transmit power, or maximum transmit power (to potentially control over-silencing issue due to multi-BSS transmission). The scheduling information may also include, for the whole UL COBF transmission, the total duration, the bandwidth, the number of long training fields (LTFs), the guard interval (GI), and LTF durations.

The scheduling information for DL ACK transmission may include, for each participating AP, the allocated resource for DL ACK for all its STAs (e.g., a start stream index, a stream #, a time slot, a sub-band, an MCS), or the allocated resources for DL ACK of each of its STAs (e.g., by specifying the DL ACK resource per STA).

VII-B. Input Collection for UL COBF Scheduling

The following candidate STA information, for example, can be sent by a STA's associated AP or by the STA itself to the scheduler as scheduling input: STA information for UL data transmission and STA information for DL ACK transmission.

The STA information for UL data transmission may include the candidate STA ID(s). These STAs should support UL COBF transmission and typically have UL data at this moment. The STA information may include, for each candidate STA, STA_ID, UL COBF transmission capability (e.g., max stream #per supported BW, support for partial BW or not); required UL data resource (e.g., transmission duration for a reference BW and stream #, amount of buffered data, and MCS); OBSS AP IDs if UL nulling is required for those APs; scheduling priority metrics (e.g., highest access category, longest waiting time, latency requirement, proportional fair metric (ratio of instant rate to average rate), of buffered UL data); and inputs to check UL RSSI difference (as specified below).

The STA information for DL ACK transmission may include the candidate STA's required DL ACK resource (similar to above for data transmission), and MCS.

The following check may ensure that scheduled STAs across BSSs can mutually satisfy each other's maximum tolerable RSSI difference requirement. For every participating AP, each STA's caused RSSI to that AP is less than or equal to the maximum tolerable RSSI of every STA of that AP. In an alternative check, the above term "each STA's" may be replaced by "the sum of STAs' excluding the "every STA"." An alternative check may be, for every participating AP, the sum of STAs' caused RSSI to that AP is less than or equal to the maximum tolerable RSSI of that AP.

The above checks may use one or more of the following inputs per candidate STA. A first input is the STA's maximum tolerable RSSI at its own AP. This is equal to the target RSSI for the STA's MCS plus the maximum tolerable RSSI difference. A second input is the STA's caused RSSI to every AP. This can be computed as the STA's target RSSI at its own AP plus the STA's PL to its own AP minus the STA's PL to the considered "every AP." Both inputs can be replaced by other similar forms, e.g., variables to compute them.

The scheduler collects candidate STA information per BSS to scheduled STAs across BSSs for each UL COBF transmission. Several examples of input collection follow.

VII-B-1. Method 1: OTA Explicit Inquiry

Figure 33:
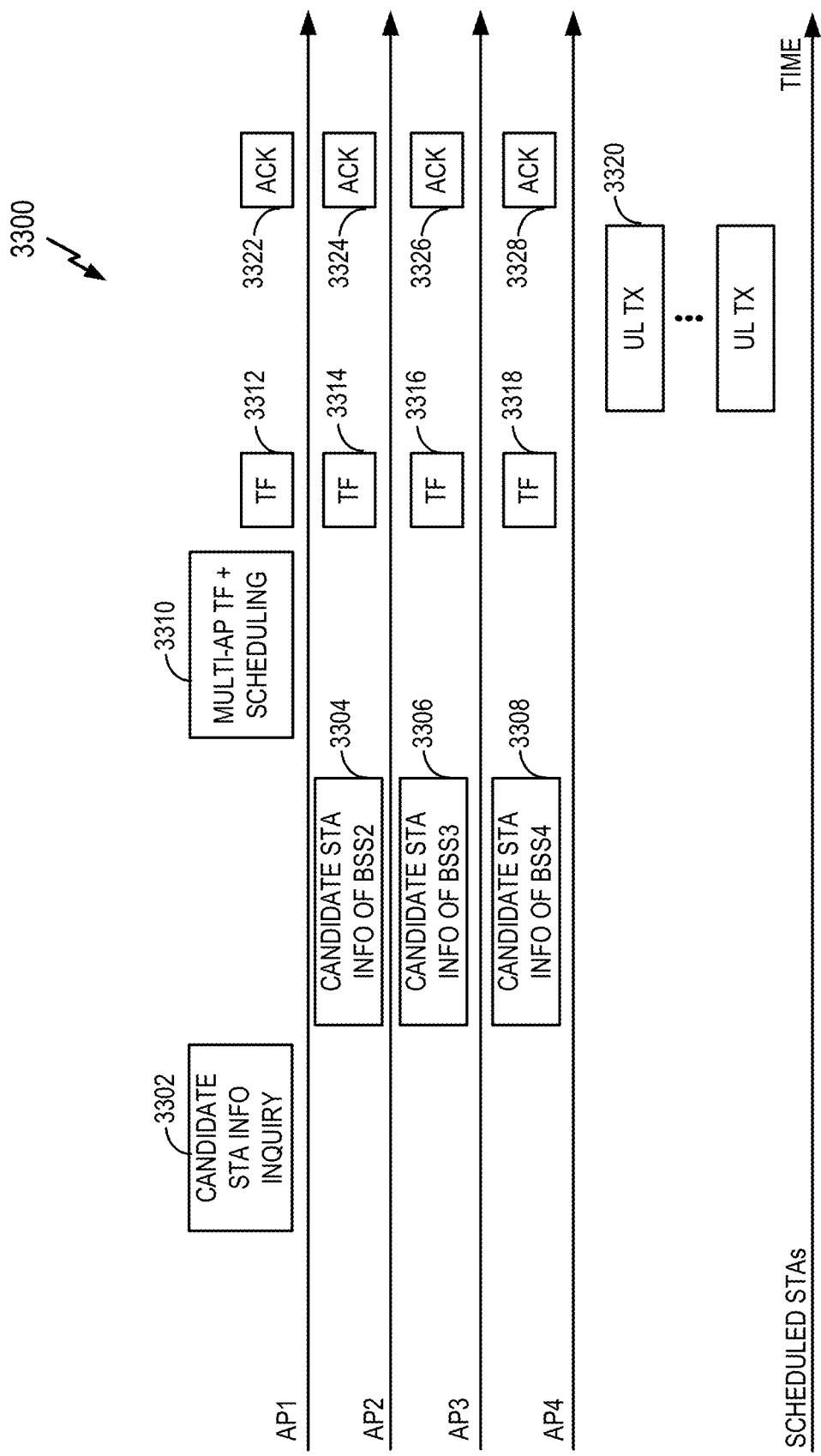
FIG. 33 illustrates an example of uplink coordinated beamforming scheduling involving sending an inquiry frame to solicit candidate station information from a set of access points in accordance with some aspects of the disclosure.

Referring to the signaling 3300 of FIG. 33, after obtaining a TXOP, a scheduler (AP1 in the example of FIG. 33) sends an inquiry frame 3302 to solicit candidate STA information from a set of APs. The inquiry frame also indicates the resource per AP response, e.g., different sub-bands, spatial streams, time slots, etc.

Each AP responds with candidate STA information of its BSS. In FIG. 33, AP2 responds with the candidate STA information of BSS2 3304, AP3 responds with the candidate STA information of BSS3 3306, and AP4 responds with the candidate STA information of BSS4 3308.

The scheduler sends a multi-AP TF with the scheduling decision 3310. AP1 sends a TF 3312, AP2 sends a TF 3314, AP3 sends a TF 3316, and AP4 sends a TF 3318. The scheduled STAs send their UL transmissions 3320. The APs then acknowledge the UL transmissions (represented by an ACK 3322 from AP1, an ACK 3324 from AP2, an ACK 3326 from AP3, and an ACK 3328 from AP4).

Figure 34:
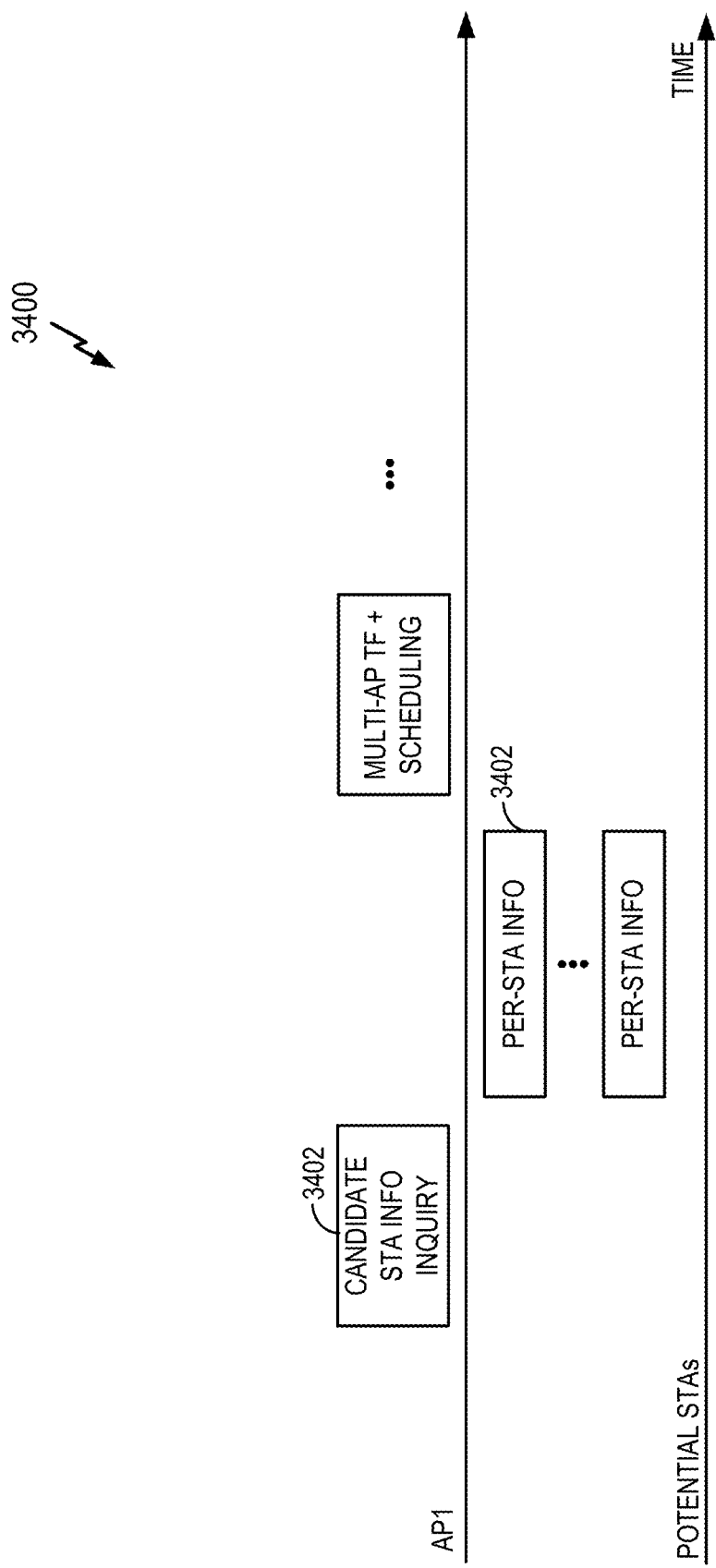
FIG. 34 illustrates an example of a scheduler polling potential stations that are in range of the scheduler for per-station information in accordance with some aspects of the disclosure.

In an alternative approach depicted by the signaling 3400 of FIG. 34, instead of inquiring each AP, a scheduler (AP1 in this example) may poll potential STAs in its range for their per-STA information. For example, the AP1 can send an inquiry 3402 in an UL OFDMA random access TF. Potential STAs respond with their per-STA information 3404 (discussed above) via a random access procedure.

VII-B-2. Method 2: OTA Autonomous Advertisement

Each AP may advertise candidate STA information in its transmitted frames (e.g., an AP may signal in a PHY preamble that the frame carries candidate STA information so that OBSS APs will not drop the frame for reuse). For example, the information may be advertised in a PHY preamble, such as in new fields in SIG-A, SIG-B, or a new SIG-C. The information may be advertised in a MAC header, such as in a new HE control field. In a DL MU PPDU, a new HE control field can be multicast to other APs in the same cluster on a dedicated resource unit, with RA as the cluster ID. The information may be sent in a new IE, or sent in an management/action frame body, such as beacons.

Figure 35:
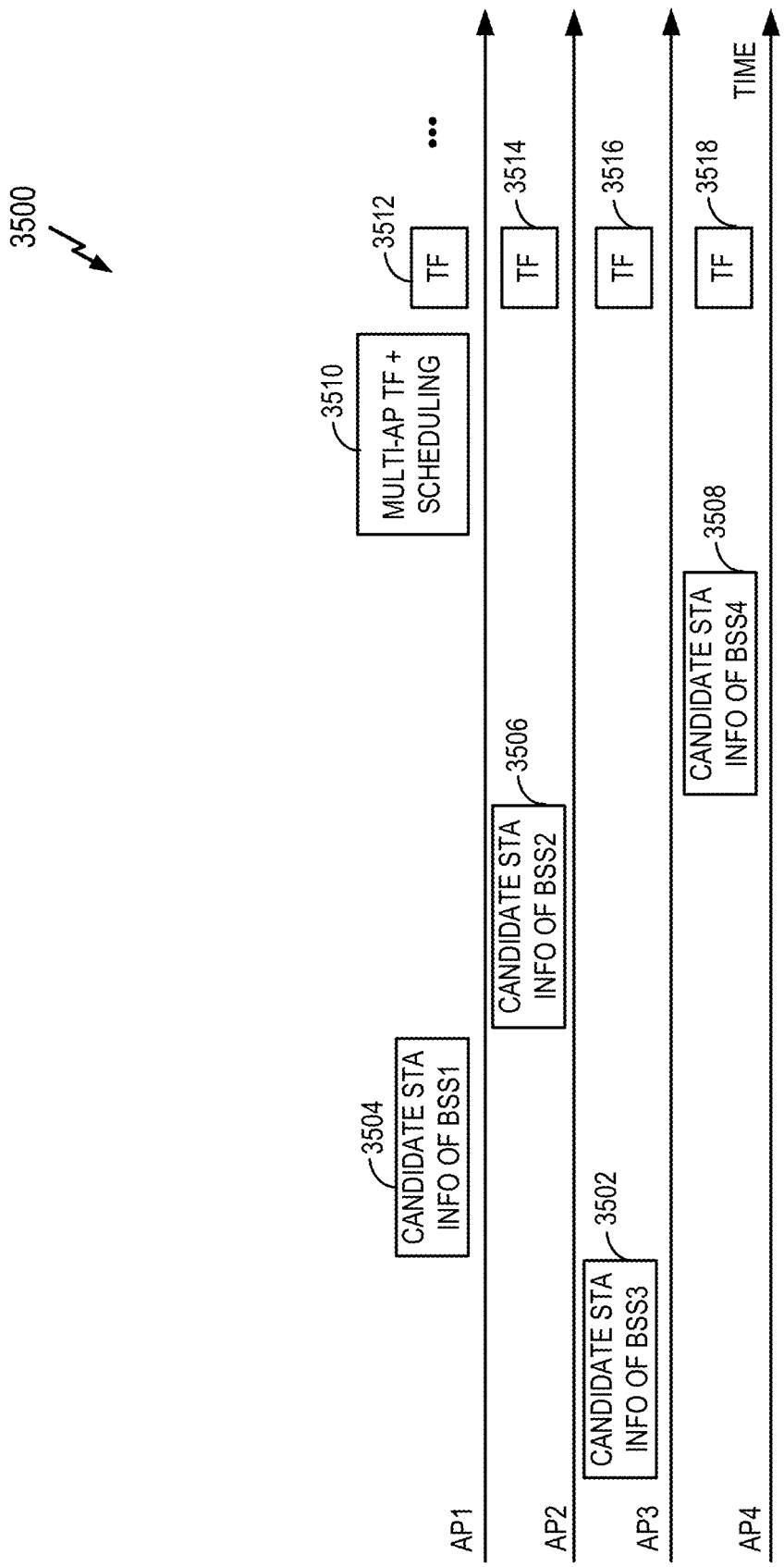
FIG. 35 illustrates an example of uplink coordinated beamforming scheduling where each access point advertises candidate station information in the access point's transmitted frames in accordance with some aspects of the disclosure.

In the signaling 3500 of FIG. 35, AP3 sends the candidate STA information of BSS3 3502, AP1 sends the candidate STA information of BSS1 3504, AP2 sends the candidate STA information of BSS2 3506, and AP4 sends the candidate STA information of BSS4 3508.

After obtaining a TXOP, the scheduler (AP1 in the example of FIG. 35) determines the scheduling based on the latest advertisement per AP, and sends a multi-AP TF 3510. AP1 sends a TF 3512, AP2 sends a TF 3514, AP3 sends a TF 3516, and AP4 sends a TF 3518.

Figure 36:
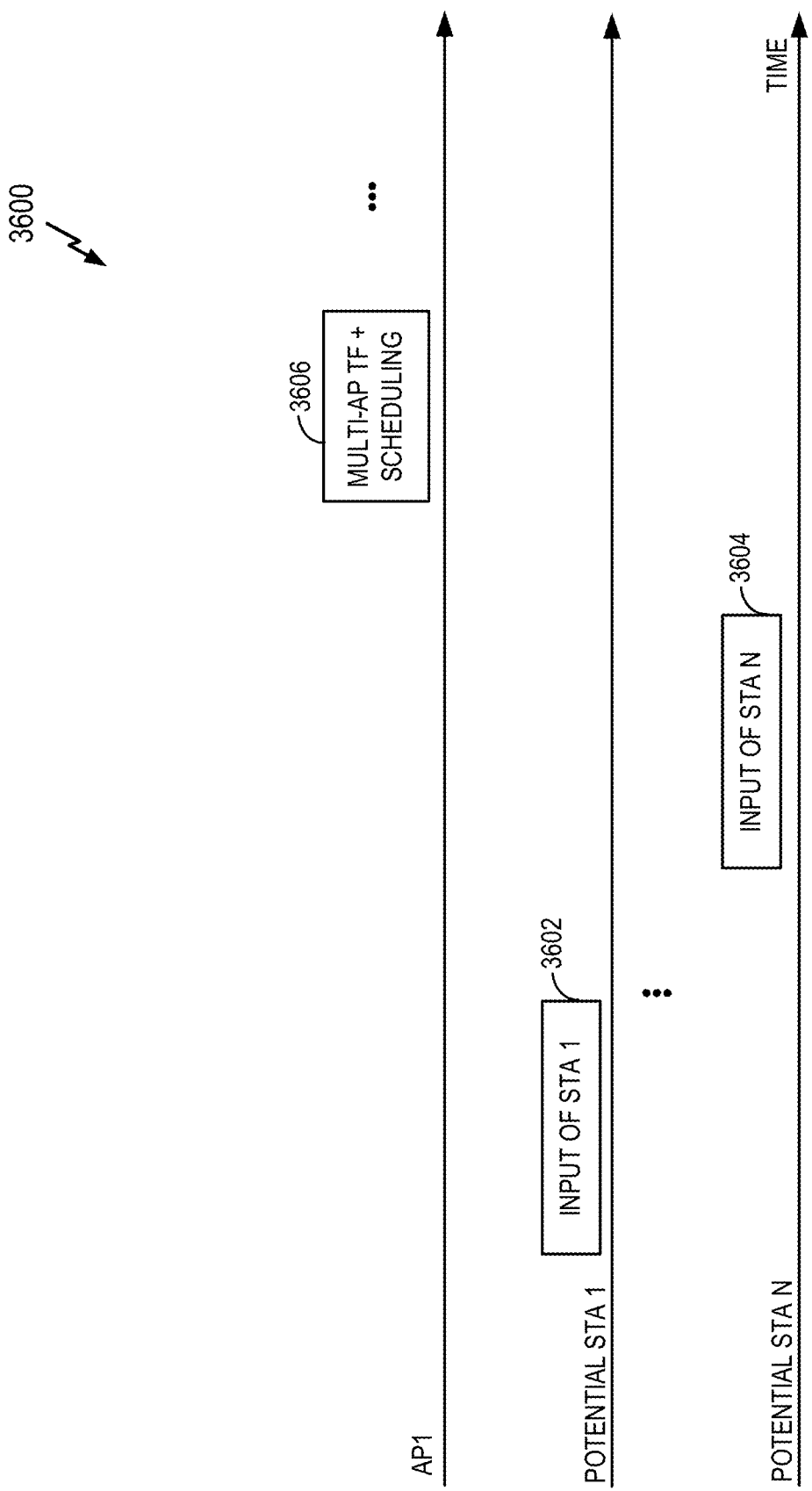
FIG. 36 illustrates an example of uplink coordinated beamforming scheduling where each station advertises its per-station information in the station's transmitted frames in accordance with some aspects of the disclosure.

In an alternate implementation depicted by the signaling 3600 of FIG. 36, STAs potentially in an UL COBF transmission can advertise their per-STA information in transmitted frames 3602-3604. Information location in the frame can have a similar format as the AP advertisement discussed above. The scheduler (AP1 in the example) determines the scheduling based on the latest advertisement from advertising STAs, and sends a multi-AP TF 3606.

VII-B-3. Method 3: Mix of Method 1 and 2

A scheduler can inquire of an AP or STA when the scheduler is not receiving its advertisement recently, e.g., in the last 50 ms. This may save inquiry overhead.

VII-B-4. Method 4: Wired Backhaul Based

A scheduler may collect candidate STA information from all APs via a wired backhaul. These APs can be in the same UL COBF cluster.

VII-C. Reuse of LTF Sequence

As described above, each scheduled STA in an UL COBF transmission may be allocated with certain spatial streams. A scheduler may specify the starting stream index and the number of streams per STA. Each stream index corresponds to an orthogonal LTF sequence in time (e.g., a row in a P matrix) for UL channel estimation. The LTF sequence assignment may have the following options.

In a first option (Option 1), each stream uses a distinct LTF sequence. For example, a total of 6 scheduled streams may need 6 LTF sequences over 6 LTF symbols.

In a second option (Option 2), streams can reuse the same LTF sequence if there are disjoint sets of affected APs. A stream affects an AP if the stream is causing relatively high RSSI at the AP. Such a stream can be identified using the candidate STA information described above (e.g., the STA's caused RSSI to each AP, or the STA's UL nulling AP IDs). The reuse may be due to the affected APs only seeing the LTF from the affecting stream. The reuse may reduce the total number of LTF sequences and hence the number of LTF symbols.

Figure 37:
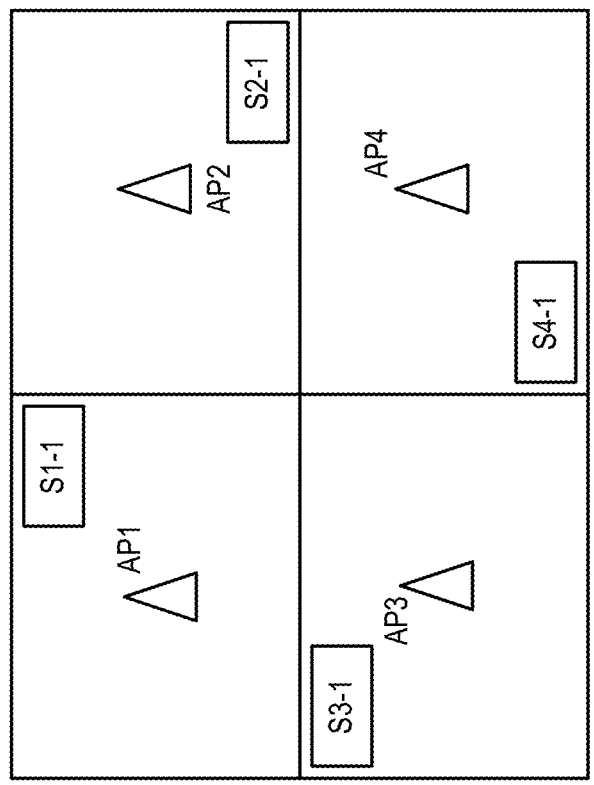
FIG. 37 illustrates another example of a cluster of access points in accordance with some aspects of the disclosure.

An example of LTF Sequence Reuse will be described with reference to the wireless communication system 3700 of FIG. 37. In this example, 4 APs (AP1-AP4) participate in a UL COBF reception. Each AP serves one InBSS STA with a single antenna. For example, a first AP AP1 serves STA S1-1, a second AP AP2 serves STA S2-1, etc. In addition, each STA only "affects" two APs for purposes of this discussion: STA S1-1 affects the first AP AP1 and the second AP AP2, STA S2-1 affects the second AP AP2 and the fourth AP AP4, STA S3-1 affects the first AP AP1 and the third AP AP3, and STA S4-1 affects the third AP AP3 and the fourth AP AP4.

In this case, STAs S1-1 and S4-1 can reuse the same LTF sequence, while STAs S2-1 and S3-1 can reuse the other sequence. The total required number of LTF sequences and, hence, the number of LTF symbols is two. In contrast, four would be required without reuse.

VII-D. Additional Inputs for COBF Scheduling

A scheduling node may ensure that UL COBF scheduling meets the following feasibility requirement. For each AP joining the UL COBF reception, the AP's total dimensions for nulling plus its dimensions serving InBSS STAs is less than or equal to its total available dimensions for UL COBF.

To check the above requirement, a scheduling node may determine the total available dimensions for UL COBF per AP. This information can be acquired via OTA messages. For example, each AP can signal its total dimensions for UL COBF in transmitted frames, e.g., in a new "UL COBF capability" IE in beacons, or sent together with candidate STA information.

VII-E. Limit on reported number of STAs

To save overhead, there may be limit on the reported or advertised number of candidate STAs in just-described Methods 1-4. In Method 1, the limit can be specified by the inquiring AP in an inquiry frame. In Method 2, the limit can be specified by the cluster leader AP. In Method 4, the limit can be specified by a central controller.

The limit can have the following forms. A first limit is the total reported/advertised number of candidate STAs per AP. A second limit is the total maximum number of supported streams of the reported/advertised number of candidate STAs per AP. The above metrics can be for the total candidate STAs, the total candidate STAs requiring nulling, or the total candidate STAs not requiring nulling.

VII-F. Cascaded Scheduling

Figure 38:
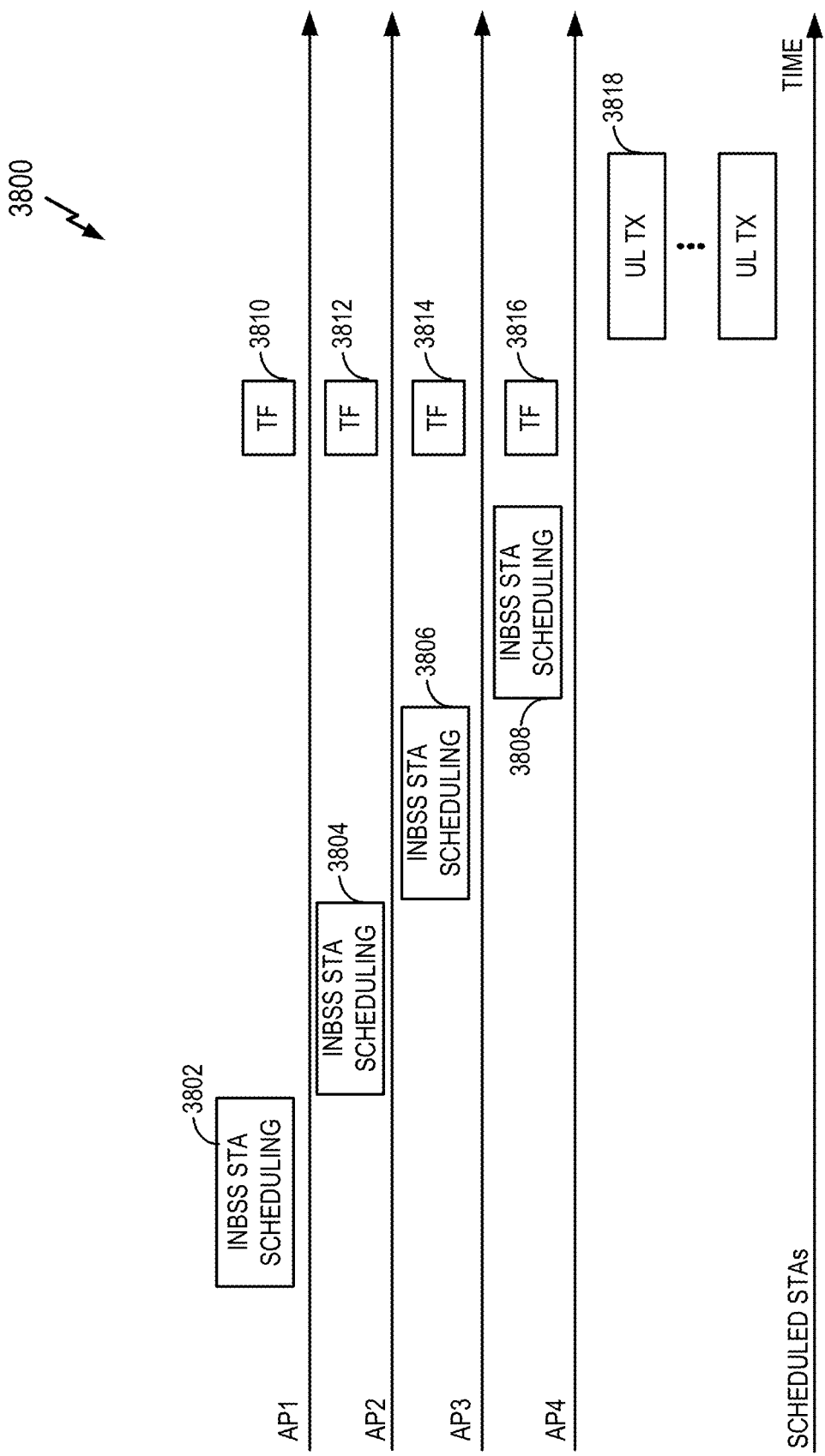
FIG. 38 illustrates an example of uplink coordinated beamforming cascaded scheduling in accordance with some aspects of the disclosure.

An example of cascaded scheduling is shown by the signaling 3800 of FIG. 38. As noted above, the previous methods describe scenarios where one scheduler makes the scheduling decision. In other implementations, the scheduling decision can be made by all APs in a distributed way. After obtaining a TXOP, an initiating node (AP1 in example of FIG. 38) sends a frame 3802 with a scheduling decision for its own InBSS STAs. The frame indicates the order for the OBSS APs to respond with a decision for their InBSS STAs. The frame also indicates orthogonal partitions of remaining resources among the OBSS APs for both the UL COBF transmission and the DL ACK (e.g., AP2-AP4 use the remaining dimensions 3-4, 5-6, 7-8 for their InBSS STAs, respectively).

Each AP responds in an assigned order with a scheduling decision for its own InBSS STAs within an assigned resource range. In FIG. 38, AP2 sends its scheduling decision 3804, followed by AP3 sending its scheduling decision 3806, followed by AP4 sending its scheduling decision 3808. Thus, each AP knows the other APs' decisions.

The last AP's response also triggers the individual AP TFs 3810, 3812, 3814, and 3816 and the UL COBF transmission 3818.

VII-G. DL Multi-BSS Composite Frame Format

The disclosure relates in some aspects to a composite frame format for COBF. Several examples follow.

Figure 39:
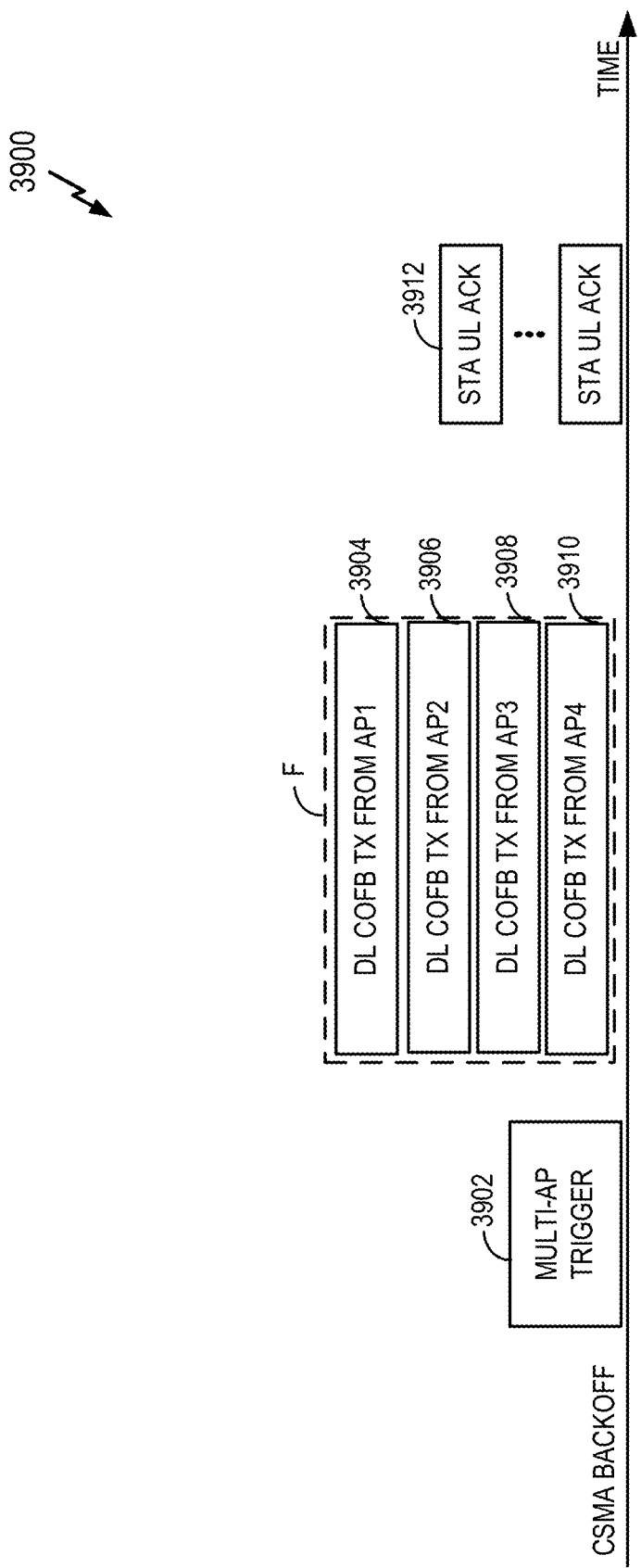
FIG. 39 illustrates an example of a composite downlink coordinated beamforming frame in accordance with some aspects of the disclosure.

As shown in the signaling 3900 of FIG. 39, for a DL COBF transmission, a composite DL COBF frame may be sent from participating APs to their STAs. A multi-AP trigger 3902 is sent after carrier sense multiple access (CSMA) backoff, followed by a composite frame F including a DL COBF transmission 3904 from AP1, a DL COBF transmission 3906 from AP2, a DL COBF transmission 3908 from AP3, and a DL COBF transmission 3910 from AP4. The STAs send UL ACKs 3912 in response to the composite frame F.

Figure 40:
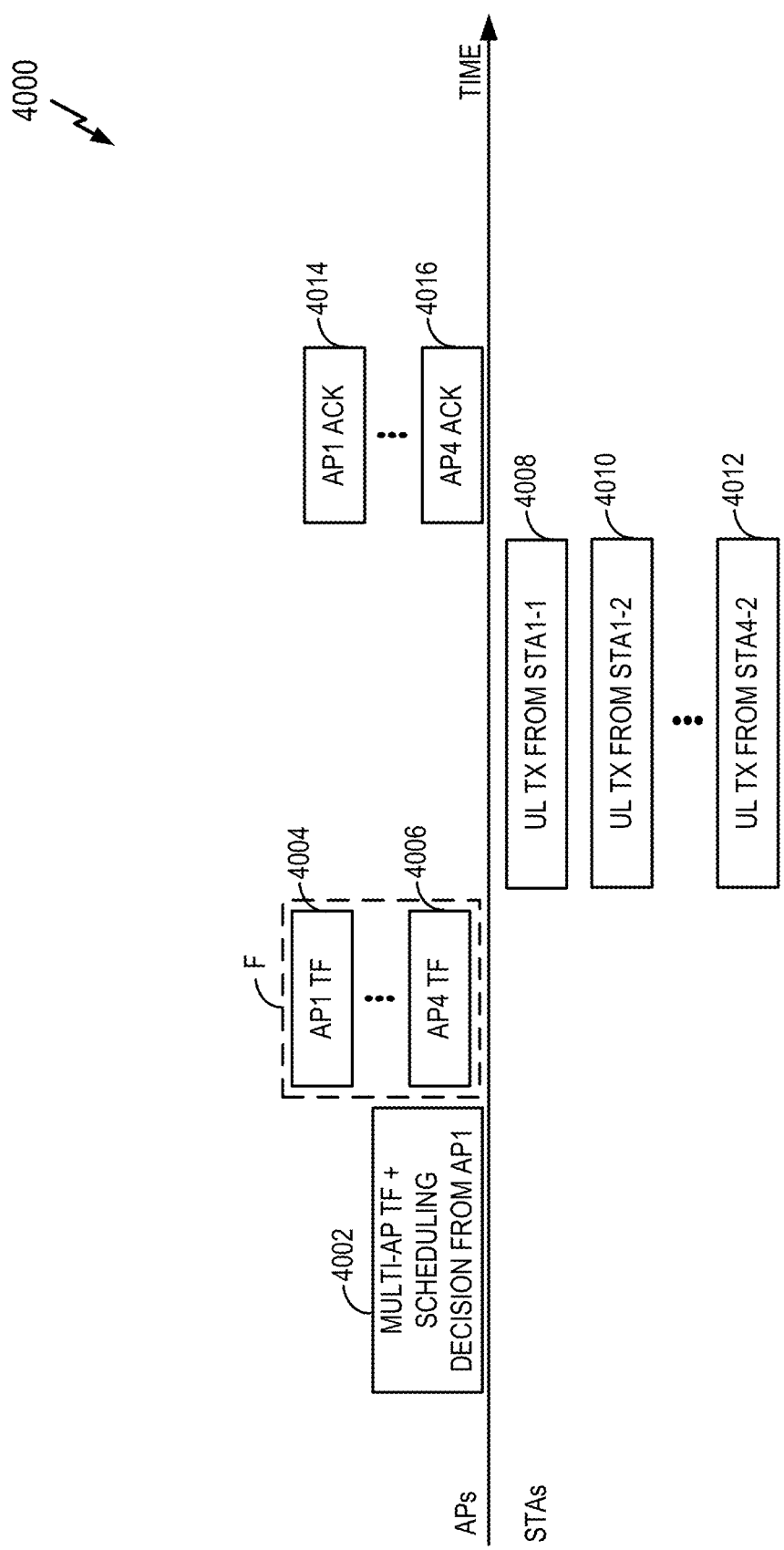
FIG. 40 illustrates an example of a composite downlink orthogonal frequency division multiple access frame in accordance with some aspects of the disclosure.

As shown in the signaling 4000 of FIG. 40, for an UL COBF transmission, a composite DL OFDMA frame may be sent from participating APs to trigger UL transmission by their STAs. A multi-AP trigger 4002 triggers the sending of a composite frame F including TFs from AP1 to AP4 (represented by TF 4004 to TF 4006). The STAs send UL transmissions (represented by transmissions 4008, 4010, through 4012) in response to the composite frame F. AP1 to AP4 then acknowledge (represented by ACKs 4014 to 4106) the UL transmissions.

The DL Multi-BSS Composite Frame may have the following options based on how each AP's DL scheduling information is signaled.

A first option (Option 1) involves an orthogonal scheduling related PHY preamble. Here, a scheduling related PHY preamble may be similar to SIG-B in an IEEE 802.11ax DL MU-MIMO PPDU. Each AP sends its scheduling information on an orthogonal resource.

A second option (Option 2) involves a common scheduling related PHY preamble. Here, each AP sends all of the APs' scheduling information on the same resource.

VII-G-1. Option 1: Orthogonal Scheduling Preamble

Figure 41:
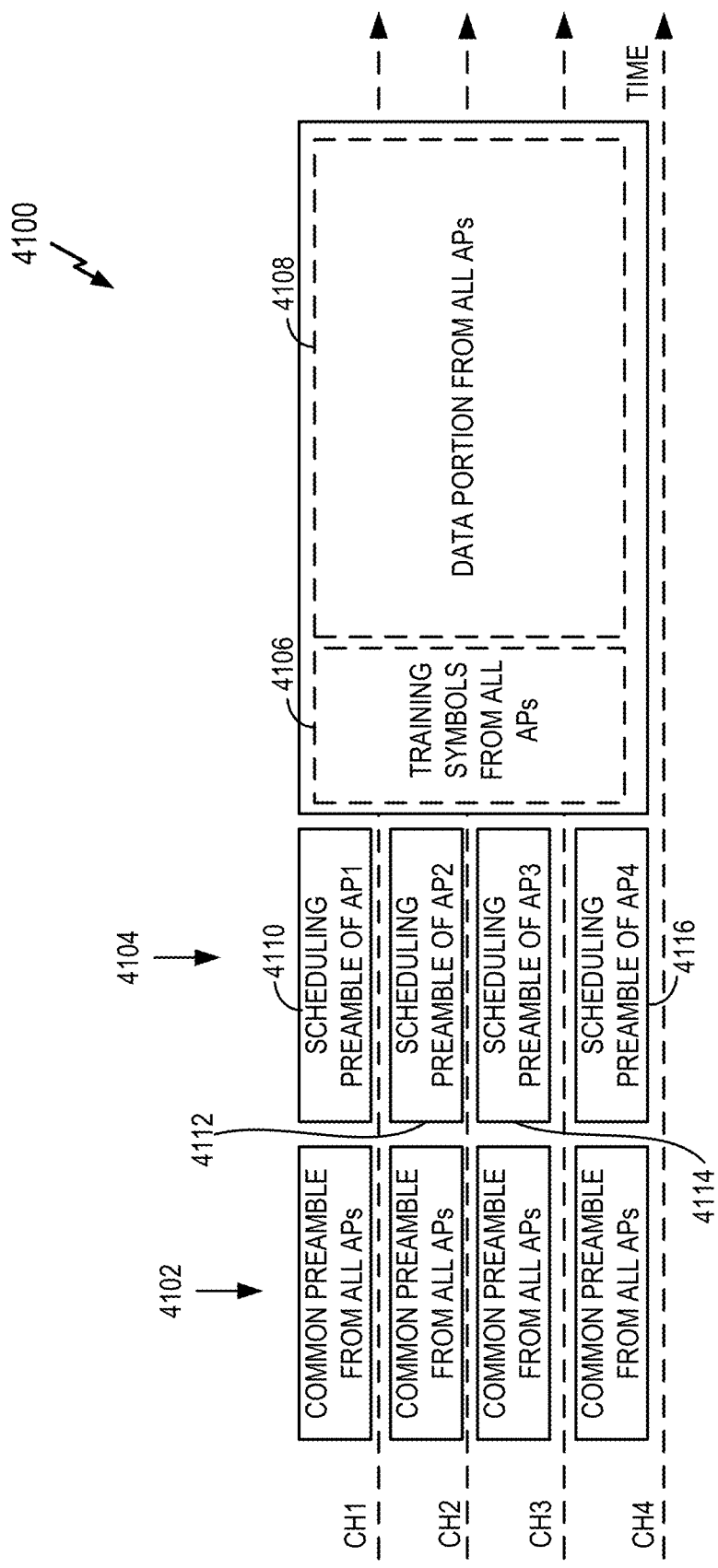
FIG. 41 illustrates an example of a downlink multiple basis service set frame in accordance with some aspects of the disclosure.

A DL multi-BSS frame may have four major components. As shown in FIG. 41, these components may include a common preamble region 4102, a scheduling-related physical layer (PHY) preamble region 4104, a training symbol region 4106 for training symbols from all APs, and a data region 4108 for data from all APs.

VII-G-1.a. Component 1: Common preamble

All APs may send the same common preamble on every 20 MHz channel. For example, all of the APs send the same common preamble on channel 1, all of the APs send the same common preamble on channel 2, all of the APs send the same common preamble on channel 3, and all of the APs send the same common preamble on channel 4. This preamble is to be detected by the AP's STAs on the cluster's primary channel, and to reserve the whole BW. The preamble may have a fixed size and include information common to all APs. For example, the preamble may include L-STF, L-LTF, L-SIG, and part of 11ax SIG-A information. This may include format bits (e.g., to indicate new DL multi-BSS frame), color bits (e.g., dedicated cluster color, or access-winning AP's color), and common frame parameters (e.g., BW, GI+LTF durations, TXOP duration, # of LTFs, scheduling preamble symbol # and MCS, SR information, Doppler mode, etc.).

VII-G-1.b. Component 2: Scheduling Related PHY Preamble

An AP may send its scheduling preamble on an orthogonal resource unit (RU), which may have a variable duration and include information for the AP's own BSS operation. For example, AP1 may send its scheduling preamble 4110 on channel 1, AP2 may send its scheduling preamble 4112 on channel 2, AP3 may send its scheduling preamble 4114 on channel 3, and AP4 may send its scheduling preamble 4116 on channel 4. This information may include DL STA resource allocation and DL receive information (e.g., LDPC extra symbol indicator, pre-FEC padding factor, PE ambiguity indicator). The contents of the scheduling preamble may have a similar format as SIG-B. Here, the extension bit may be set to indicate additional fields are added besides DL resource allocation information. Alternatively, a scheduling preamble may have a new format different from SIG-B.

A STA can determine the RU for its AP's scheduling preamble with the following options.

A first option (Option 1) involves a fixed RU allocation. Each cluster member AP has a fixed RU allocation, e.g., determined upon cluster setup.

In a second option (Option 2), an RU allocation is signaled in a common preamble.

A first sub-option (Option 2-1) for Option 2 involves signaling the index of a pre-configured allocation, e.g., the index could be a bitmap of participated AP indices. For example, the bitmap "1110" may mean that the first 3 APs are in the frame with 3 pre-configured RUs sequentially allocated to them.

Mapping of the index to a pre-configured allocation can have following sub-options. One further sub-option (Option 2-1-1) involves the mapping decision being made by a standards body (e.g., the bitmap "1110" means always use equal RUs for the first three APs). Another further sub-option (Option 2-1-2), involves the mapping being based on a table negotiated upon cluster setup (e.g., the bitmap "1110" in the negotiated table means the RU for the first AP is twice of that for the second AP and the third AP).

A second sub-option (Option 2-1) involves signaling dynamic resource allocation information per AP. Dynamic allocation information may include tone/stream starting index and numbers. The allocation is flexible, but a common preamble may have a varying size.

VII-G-1.c. Component 3: Training Symbols from all APs

All APs send STF and LTFs in the training symbol region 4106. For the case of DL OFDMA across BSSs, each AP's training symbols might only be within its allocated sub-band.

VII-G-1.d. Component 4: Data Portion from all APs

All APs send data in the data region 4108. An AP may send data for each InBSS STA based on an allocation in its scheduling preamble.

VII-G-2. Option 2: Common Scheduling Preamble

Figure 42:
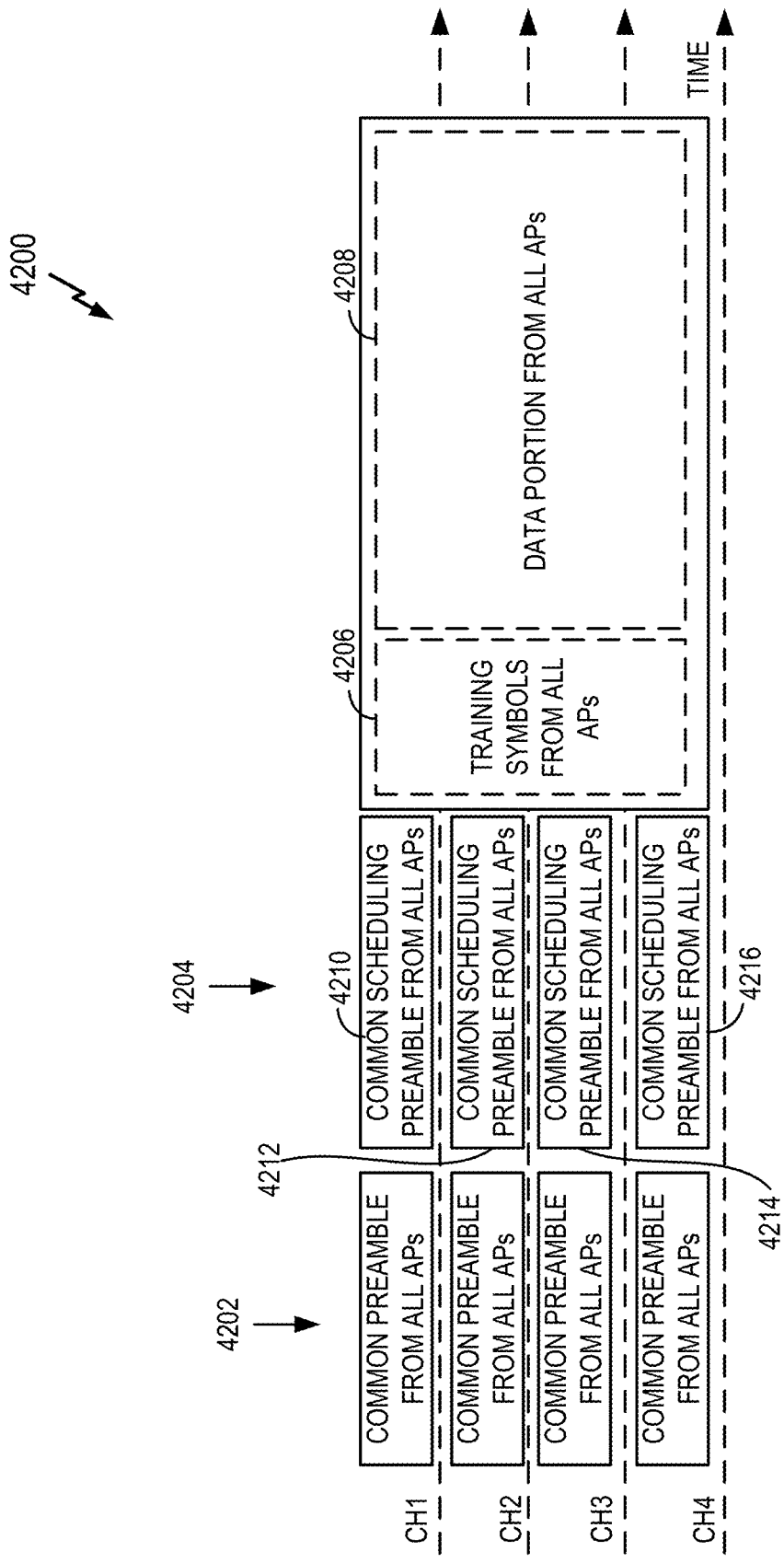
FIG. 42 illustrates an example of a frame with a common scheduling preamble in accordance with some aspects of the disclosure.
Figure 43:
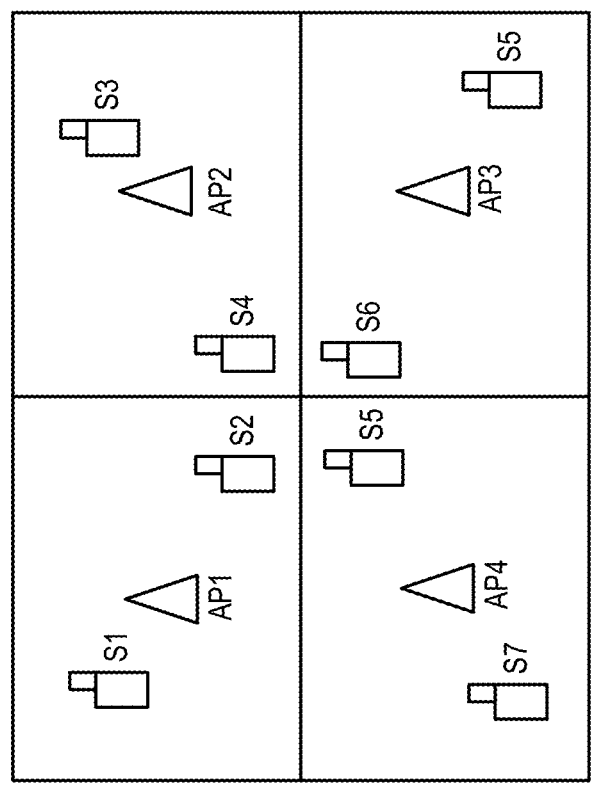
FIG. 43 illustrates another example of a cluster of access points in accordance with some aspects of the disclosure.

Option 2 is the same as Option 1, except that orthogonal scheduling preamble is replaced by a common scheduling preamble 4204 as shown, for example, in FIG. 42. All APs send the same common scheduling preamble 4204 on each 20 MHz. For example, all of the APs send the preamble 4210 on channel 1, all of the APs send the preamble 4212 on channel 2, all of the APs send the preamble 4214 on channel 3, and all of the APs send the preamble 4216 on channel 4. The common scheduling preamble contains scheduling information of all APs. There is no need to signal the scheduling preamble allocation. There is no change on the AP transmission BW. This approach may be more reliable due to the combined energy from all APs. The common scheduling preamble may be different for different 20 MHz bands (e.g., the preamble only carries scheduling information related to that 20 MHz).

VIII. Signaling for DL and UL Joint MIMO

As discussed above, distributed MIMO may take various forms. An example of Joint MIMO will be discussed with reference to the wireless communication system 4300 of FIG. 43 and the scheduling shown in FIG. 44.

As discussed above, there can be two categories of STAs: Reuse STAs and non-Reuse STAs. Reuse STAs are those STAs that have sufficient SINR to serve simultaneously without having to be nulled.

For Non-Reuse/Edge STA, any OBSS transmission degrades the SINR of these STAs. Consequently, these STAs may be time division multiplexed (TDM'd) without Distributed MIMO. Distributed MIMO allows multiplexing these STAs, either with Joint MIMO or with COBF.

Figure 44:
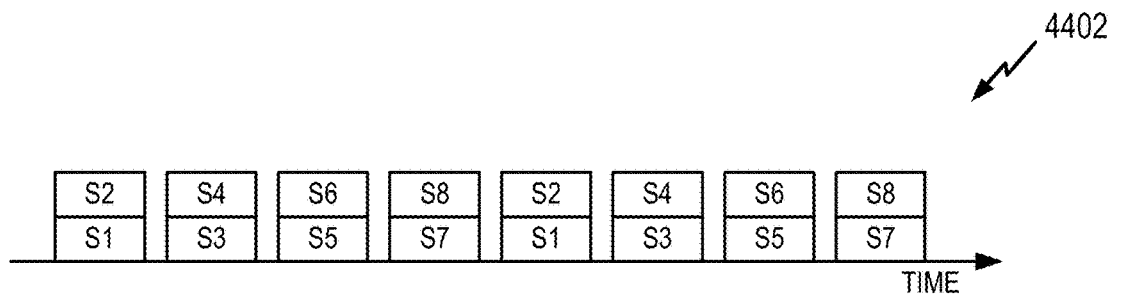
FIG. 44 illustrates an example comparison of multi-user carrier sense multiple access, coordinated beamforming, and joint MIMO.
Figure 44:
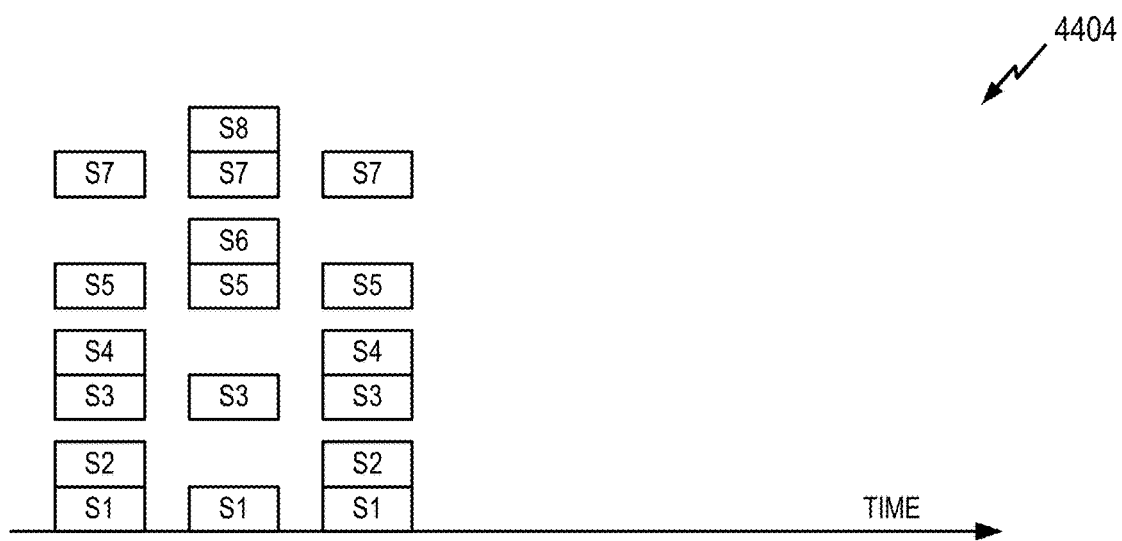
Figure 44:
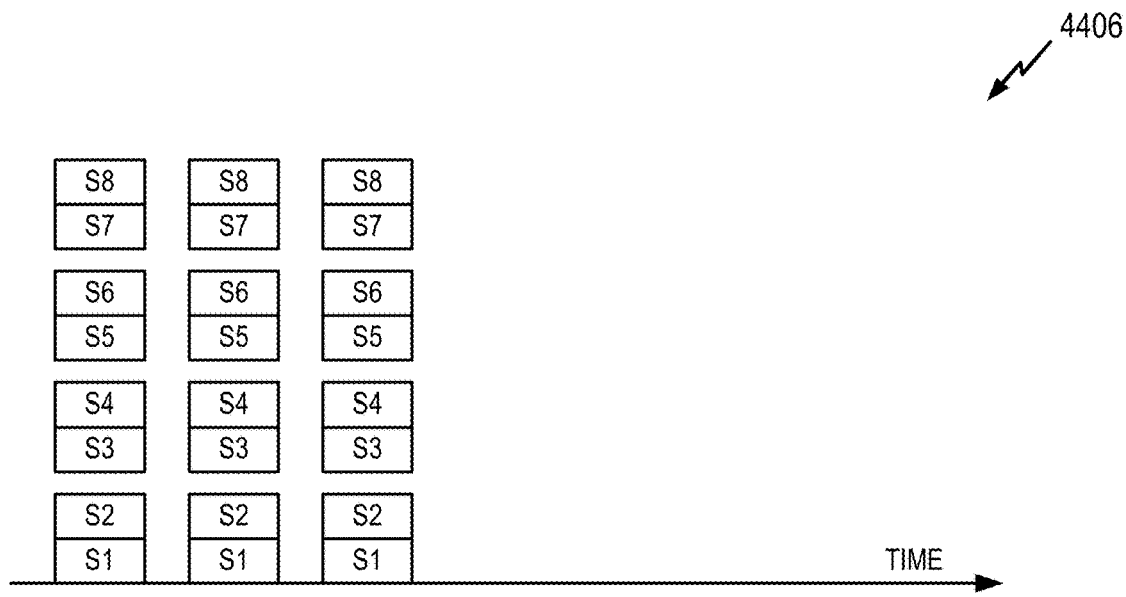

FIG. 44 illustrates an example of scheduling of baseline CSMA with MU 4402. Each of the BSSs are TDM'd since APs are in the same collision domain FIG. 44 also illustrates an example of scheduling of COBF 4404 for comparison. This techniques creates additional reuse opportunities for Non-Reuse STAs by nulling the dominant interferences. The number of Non-Reuse STAs that can be scheduled depends on the number of un-utilized dimensions.

Finally, FIG. 44 illustrates an example of scheduling of Joint MIMO 4406 for further comparison. In a TXOP, the cluster (4 APs) can serve N 1-SS STAs, where N is approximately ¾th of the total number of antennas across all 4 APs. An example of signaling (similar to the signaling described above) that could be used for Joint MIMO follows.

A first step involves cluster forming. If overhead is ignored, it is almost always beneficial to participate in a joint MIMO operation, regardless of whether the AP's dimensions are fully utilized or underutilized. Thus, there is no need for metrics to help determine if grouping is beneficial.

A second step involves reuse STA identification. This might not be critical to Joint MIMO, since every stream will consume one dimension. Thus, there might not be a reuse use case within a Joint MIMO cluster, even if STA does not see all of the APs. Potential identification benefits include: in DL joint MIMO, a STA don't need to send a BFRP for unseen APs (but there is no such issue if an UL signal is used for DL sounding), and in UL joint MIMO, STAs affecting disjoint sets of APs can share same UL LTF sequence.

A third step involves sounding for DL Joint MIMO. AN UL sounding NDP can save more overhead if a large number of STAs is targeted (this may be also good for DL COBF). However, periodic calibration may be needed to correct antenna chain phase shifts across APs. A sounding scheduling decision frame(s) may be useful to organize sounding. See the discussion of regarding the signaling of the DL COBF sounding scheduling decision above.

A fourth step involves an RSSI difference check in data transmission scheduling. This step might not be needed for DL joint MIMO because all streams sent by all APs may arrive at each STA with similar RSSI. This step may be used for UL joint MIMO because the total RSSI per STA received by all APs could be very different across STAs.

A fifth step involves a frame sequence and format for data transmission. The frame sequence may be similar to DL/UL COBF (e.g., as discussed herein). For DL Joint MIMO, the sequence could be the Multi-AP TF+DL multi-BSS frame for Joint MIMO+UL STA ACK. See the above discussion for the signaling of the DL COBF scheduling decision. For UL Joint MIMO, the sequence could be Multi-AP TF+DL multi-BSS frame for individual AP TFs+UL Joint MIMO transmission+DL AP ACK. See the above discussion of the signaling of the UL COBF scheduling decision.

A Multi-AP TF may have similar contents for a scheduling decision. Alternatively, a decision may be sent by central controller via backhaul.

A DL multi-BSS frame may have a similar format: Duplicated SIG-A+orthogonal SIG-B across APs. See the discussion of the DL Multi-BSS composite frame format above.

A sixth step involves PHY operations that might not need new MAC signaling. If UL sounding is used in DL joint MIMO, periodic calibration may be used to correct phase shifts across APs. This phase shift may be estimated by the master AP's signals, e.g., multi-AP TF or ACK.

If UL sounding is used in DL joint MIMO, APs may remove their AGC gains and phase shifts on a measured UL channel. The APs can know their actual AGC gains and phase shifts by their own offline calibrations.

For data transmission in DL joint MIMO, APs may remove their phase shifts associated with the PA adjustments. APs can know their associated phase shifts by their own offline calibrations.

For data transmission in DL joint MIMO, APs may remove transmitter phase shifts within the data transmission duration. APs can estimate frequency offset from a master AP based on the master AP's signals.

Example Wireless Communication System

The teachings herein may be implemented using various wireless technologies and/or various spectra. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_t$) transmit antennas and multiple ($N_r$) receive antennas for data transmission. A MIMO channel formed by the $N_t$ transmit and $N_r$ receive antennas may be decomposed into $N_s$ independent channels, which are also referred to as spatial channels or streams, where $N_s \leq \min\{N_t, N_r\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also include, be implemented as, or known as a Transmit Receive Point (TRP), a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may include, be implemented as, or known as a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, a medical device, a sensor device, or any other suitable device that is configured to communicate via a wireless medium.

Figure 45:
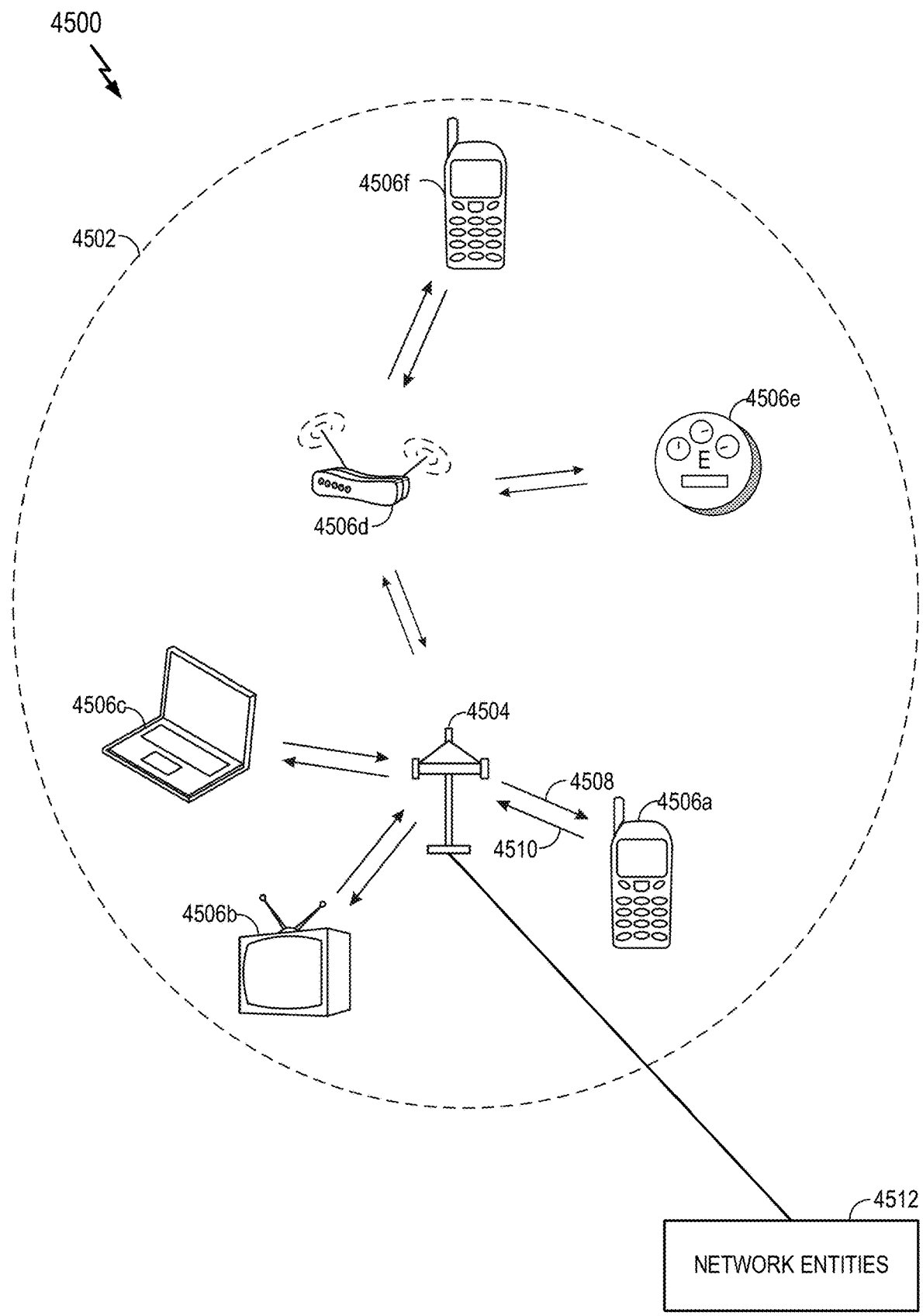
FIG. 45 illustrates an example of a wireless communication system in which aspects of the present disclosure may be employed.

FIG. 45 illustrates an example of a wireless communication system 4500 in which aspects of the present disclosure may be employed. The wireless communication system 4500 may operate pursuant to a wireless standard, for example the 802.11 standard. The wireless communication system 4500 may include an AP 4504, which communicates with STAs 4506a, 4506b, 4506c, 4506d, 4506e, and 4506f (collectively STAs 4506).

STAs 4506e and 4506f may have difficulty communicating with the AP 4504 or may be out of range and unable to communicate with the AP 4504. As such, another STA 4506d may be configured as a relay device (e.g., a device including STA and AP functionality) that relays communication between the AP 4504 and the STAs 4506e and 4506f.

A variety of processes and methods may be used for transmissions in the wireless communication system 4500 between the AP 4504 and the STAs 4506. For example, signals may be sent and received between the AP 4504 and the STAs 4506 in accordance with OFDM/OFDMA techniques. If this is the case, the wireless communication system 4500 may be referred to as an OFDM/OFDMA system. Alternatively, signals may be sent and received between the AP 4504 and the STAs 4506 in accordance with CDMA techniques. If this is the case, the wireless communication system 4500 may be referred to as a CDMA system.

A communication link that facilitates transmission from the AP 4504 to one or more of the STAs 4506 may be referred to as a downlink (DL) 4508, and a communication link that facilitates transmission from one or more of the STAs 4506 to the AP 4504 may be referred to as an uplink (UL) 4510. Alternatively, a downlink 4508 may be referred to as a forward link or a forward channel, and an uplink 4510 may be referred to as a reverse link or a reverse channel.

The AP 4504 may act as a base station and provide wireless communication coverage in a basic service area (BSA) 4502. The AP 4504 along with the STAs 4506 associated with the AP 4504 and that use the AP 4504 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 4504 or to some other access point in the network (not shown).

Each of the access points may communicate with one or more network entities (represented, for convenience, by network entities 4512 in FIG. 45), including each other, to facilitate wide area network connectivity. A network entity may take various forms such as, for example, one or more radio and/or core network entities. Thus, in various implementations the network entities 4512 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 4500 might not have a central AP 4504, but rather may function as a peer-to-peer network between the STAs 4506. Accordingly, the functions of the AP 4504 described herein may alternatively be performed by one or more of the STAs 4506. Also, as mentioned above, a relay may incorporate at least some of the functionality of an AP and a STA.

Figure 46:
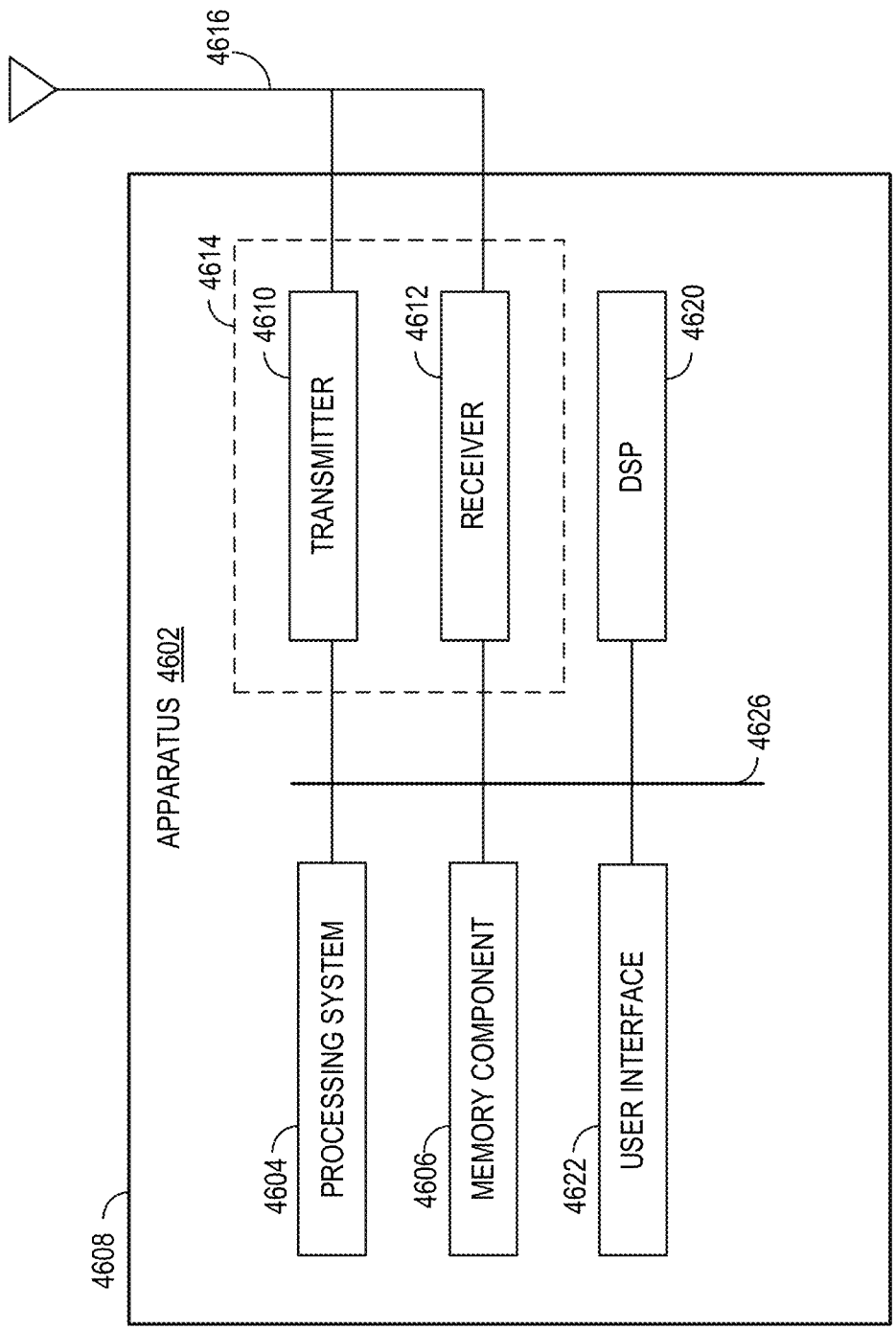
FIG. 46 is a functional block diagram of an example apparatus that may be employed within a wireless communication system in accordance with some aspects of the disclosure.

FIG. 46 illustrates various components that may be utilized in an apparatus 4602 (e.g., a wireless device) that may be employed within the wireless communication system 4500. The apparatus 4602 is an example of a device that may be configured to implement the various methods described herein. For example, the apparatus 4602 may take the form of the AP 4504, a relay (e.g., the STA 4506d), or one of the STAs 4506 of FIG. 45.

The apparatus 4602 may include a processing system 4604 that controls operation of the apparatus 4602. The processing system 4604 may also be referred to as a central processing unit (CPU). A memory component 4606 (e.g., including a memory device), which may include both read-only memory (ROM) and random access memory (RAM), provides instructions and data to the processing system 4604. A portion of the memory component 4606 may also include non-volatile random access memory (NVRAM). The processing system 4604 typically performs logical and arithmetic operations based on program instructions stored within the memory component 4606. The instructions in the memory component 4606 may be executable to implement the methods described herein.

When the apparatus 4602 is implemented or used as a transmitting node, the processing system 4604 may be configured to select one of a plurality of media access control (MAC) header types, and to generate a packet having that MAC header type. For example, the processing system 4604 may be configured to generate a packet including a MAC header and a payload and to determine what type of MAC header to use.

When the apparatus 4602 is implemented or used as a receiving node, the processing system 4604 may be configured to process packets of a plurality of different MAC header types. For example, the processing system 4604 may be configured to determine the type of MAC header used in a packet and process the packet and/or fields of the MAC header.

The processing system 4604 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 4602 may also include a housing 4608 that may include a transmitter 4610 and a receiver 4612 to allow transmission and reception of data between the apparatus 4602 and a remote location. The transmitter 4610 and receiver 4612 may be combined into single communication device (e.g., a transceiver 4614). An antenna 4616 may be attached to the housing 4608 and electrically coupled to the transceiver 4614. The apparatus 4602 may also include (not shown) multiple transmitters, multiple receivers, multiple transceivers, and/or multiple antennas. A transmitter 4610 and a receiver 4612 may take the form of an integrated device (e.g., embodied as a transmitter circuit and a receiver circuit of a single communication device) in some implementations, may take the form of a separate transmitter device and a separate receiver device in some implementations, or may be embodied in other ways in other implementations.

The transmitter 4610 may be configured to wirelessly transmit packets having different MAC header types. For example, the transmitter 4610 may be configured to transmit packets with different types of headers generated by the processing system 4604, discussed above.

The receiver 4612 may be configured to wirelessly receive packets having different MAC header type. In some aspects, the receiver 4612 is configured to detect a type of a MAC header used and process the packet accordingly.

The receiver 4612 may be used to detect and quantify the level of signals received by the transceiver 4614. The receiver 4612 may detect such signals as total energy, energy per subcarrier per symbol, power spectral density and other signals. The apparatus 4602 may also include a digital signal processor (DSP) 4620 for use in processing signals. The DSP 4620 may be configured to generate a data unit for transmission. In some aspects, the data unit may be a physical layer data unit (PPDU). In some aspects, the PPDU is referred to as a packet.

The apparatus 4602 may further include a user interface 4622 in some aspects. The user interface 4622 may include a keypad, a microphone, a speaker, and/or a display. The user interface 4622 may include any element or component that conveys information to a user of the apparatus 4602 and/or receives input from the user.

The various components of the apparatus 4602 may be coupled together by a bus system 4626. The bus system 4626 may include a data bus, for example, as well as a power bus, a control signal bus, and a status signal bus in addition to the data bus. Those of skill in the art will appreciate the components of the apparatus 4602 may be coupled together or accept or provide inputs to each other using some other mechanism.

Although a number of separate components are illustrated in FIG. 46, one or more of the components may be combined or commonly implemented. For example, the processing system 4604 may be used to implement not only the functionality described above with respect to the processing system 4604, but also to implement the functionality described above with respect to the transceiver 4614 and/or the DSP 4620. Further, each of the components illustrated in FIG. 46 may be implemented using a plurality of separate elements. Furthermore, the processing system 4604 may be used to implement any of the components, modules, circuits, or the like described below, or each may be implemented using a plurality of separate elements.

For ease of reference, when the apparatus 4602 is configured as a transmitting node, it is hereinafter referred to as an apparatus 4602t. Similarly, when the apparatus 4602 is configured as a receiving node, it is hereinafter referred to as an apparatus 4602r. A device in the wireless communication system 4500 may implement only functionality of a transmitting node, only functionality of a receiving node, or functionality of both a transmitting node and a receive node.

As discussed above, the apparatus 4602 may take the form of an AP 4504 or a STA 4506, and may be used to transmit and/or receive communication having a plurality of MAC header types.

The components of FIG. 46 may be implemented in various ways. In some implementations, the components of FIG. 46 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 46 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 47:
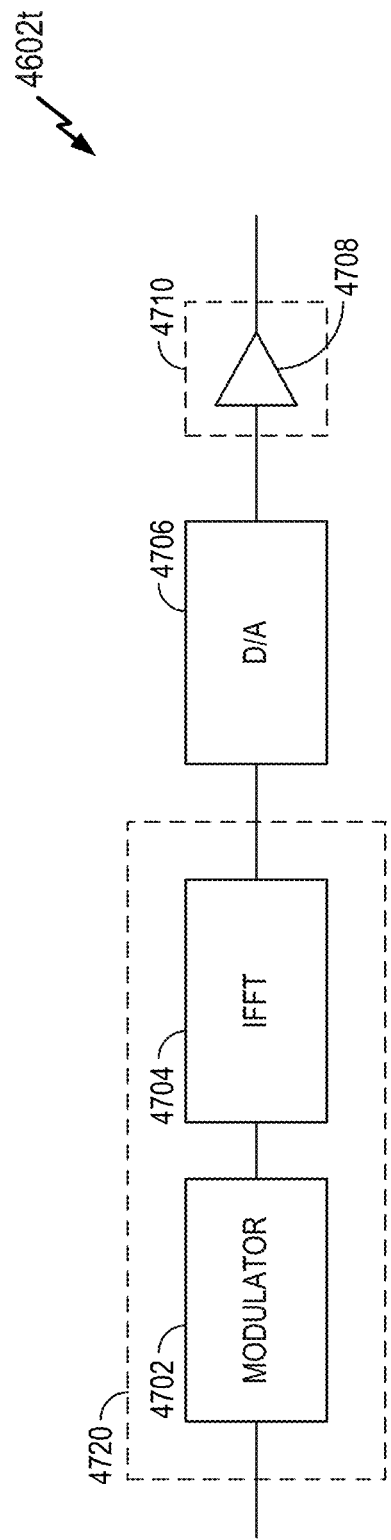
FIG. 47 is a functional block diagram of example components that may be utilized in the apparatus of FIG. 46 to transmit wireless communication.

As discussed above, the apparatus 4602 may take the form of an AP 4504 or a STA 4506, a relay, or some other type of apparatus, and may be used to transmit and/or receive communication. FIG. 47 illustrates various components that may be utilized in the apparatus 4602t to transmit wireless communication. The components illustrated in FIG. 47 may be used, for example, to transmit OFDM communication. In some aspects, the components illustrated in FIG. 47 are used to generate and transmit packets to be sent over a bandwidth of less than or equal to 1 MHz.

The apparatus 4602t of FIG. 47 may include a modulator 4702 configured to modulate bits for transmission. For example, the modulator 4702 may determine a plurality of symbols from bits received from the processing system 4604 (FIG. 46) or the user interface 4622 (FIG. 46), for example by mapping bits to a plurality of symbols according to a constellation. The bits may correspond to user data or to control information. In some aspects, the bits are received in codewords. In one aspect, the modulator 4702 may include a QAM (quadrature amplitude modulation) modulator, for example, a 16-QAM modulator or a 64-QAM modulator. In other aspects, the modulator 4702 may include a binary phase-shift keying (BPSK) modulator, a quadrature phase-shift keying (QPSK) modulator, or an 8-PSK modulator.

The apparatus 4602t may further include a transform module 4704 configured to convert symbols or otherwise modulated bits from the modulator 4702 into a time domain. In FIG. 47, the transform module 4704 is illustrated as being implemented by an inverse fast Fourier transform (IFFT) module. In some implementations, there may be multiple transform modules (not shown) that transform units of data of different sizes. In some implementations, the transform module 4704 may be itself configured to transform units of data of different sizes. For example, the transform module 4704 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 4704 may be referred to as the size of the transform module 4704.

In FIG. 47, the modulator 4702 and the transform module 4704 are illustrated as being implemented in the DSP 4720. In some aspects, however, one or both of the modulator 4702 and the transform module 4704 are implemented in the processing system 4604 or in another element of the apparatus 4602t (e.g., see description above with reference to FIG. 46).

As discussed above, the DSP 4720 may be configured to generate a data unit for transmission. In some aspects, the modulator 4702 and the transform module 4704 may be configured to generate a data unit including a plurality of fields including control information and a plurality of data symbols.

Returning to the description of FIG. 47, the apparatus 4602t may further include a digital to analog converter 4706 configured to convert the output of the transform module into an analog signal. For example, the time-domain output of the transform module 4704 may be converted to a baseband OFDM signal by the digital to analog converter 4706. The digital to analog converter 4706 may be implemented in the processing system 4604 or in another element of the apparatus 4602 of FIG. 46. In some aspects, the digital to analog converter 4706 is implemented in the transceiver 4614 (FIG. 46) or in a data transmit processor.

The analog signal may be wirelessly transmitted by the transmitter 4710. The analog signal may be further processed before being transmitted by the transmitter 4710, for example by being filtered or by being upconverted to an intermediate or carrier frequency. In the aspect illustrated in FIG. 47, the transmitter 4710 includes a transmit amplifier 4708. Prior to being transmitted, the analog signal may be amplified by the transmit amplifier 4708. In some aspects, the amplifier 4708 may include a low noise amplifier (LNA).

The transmitter 4710 is configured to transmit one or more packets or data units in a wireless signal based on the analog signal. The data units may be generated using the processing system 4604 (FIG. 46) and/or the DSP 4720, for example using the modulator 4702 and the transform module 4704 as discussed above. Data units that may be generated and transmitted as discussed above are described in additional detail below.

Figure 48:
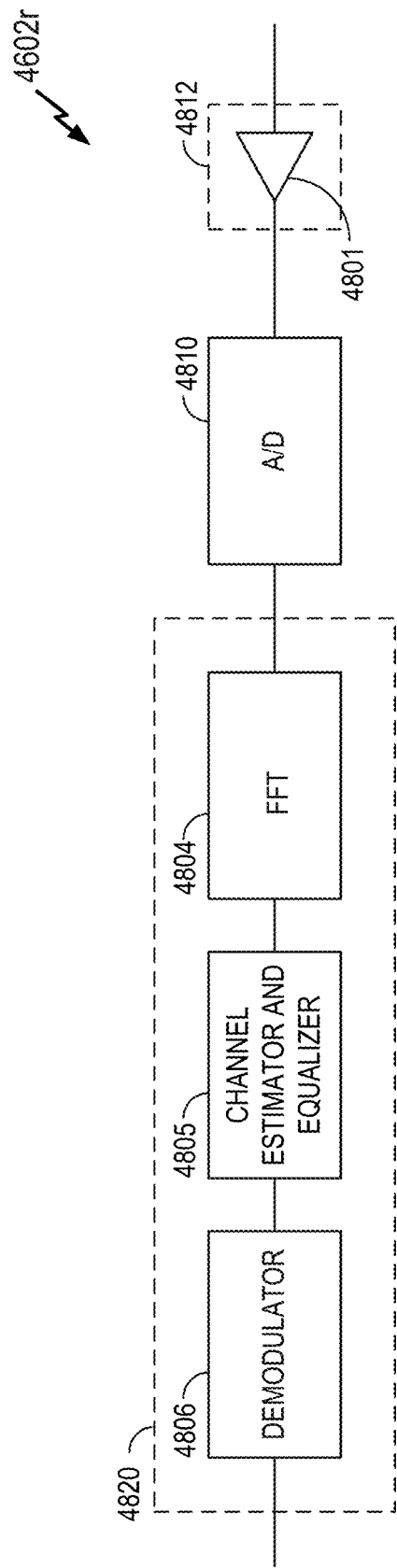
FIG. 48 is a functional block diagram of example components that may be utilized in the apparatus of FIG. 46 to receive wireless communication.

FIG. 48 illustrates various components that may be utilized in the apparatus 4602 of FIG. 46 to receive wireless communication. The components illustrated in FIG. 48 may be used, for example, to receive OFDM communication. For example, the components illustrated in FIG. 48 may be used to receive data units transmitted by the components discussed above with respect to FIG. 47.

The receiver 4812 of apparatus 4602r is configured to receive one or more packets or data units in a wireless signal. Data units that may be received and decoded or otherwise processed as discussed below.

In the aspect illustrated in FIG. 48, the receiver 4812 includes a receive amplifier 4801. The receive amplifier 4801 may be configured to amplify the wireless signal received by the receiver 4812. In some aspects, the receiver 4812 is configured to adjust the gain of the receive amplifier 4801 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 4801 may include an LNA.

The apparatus 4602r may include an analog to digital converter 4810 configured to convert the amplified wireless signal from the receiver 4812 into a digital representation thereof. Further to being amplified, the wireless signal may be processed before being converted by the analog to digital converter 4810, for example by being filtered or by being downconverted to an intermediate or baseband frequency. The analog to digital converter 4810 may be implemented in the processing system 4604 (FIG. 46) or in another element of the apparatus 4602r. In some aspects, the analog to digital converter 4810 is implemented in the transceiver 4614 (FIG. 46) or in a data receive processor.

The apparatus 4602r may further include a transform module 4804 configured to convert the representation of the wireless signal into a frequency spectrum. In FIG. 48, the transform module 4804 is illustrated as being implemented by a fast Fourier transform (FFT) module. In some aspects, the transform module may identify a symbol for each point that it uses. As described above with reference to FIG. 47, the transform module 4804 may be configured with a plurality of modes, and may use a different number of points to convert the signal in each mode. The number of points used by the transform module 4804 may be referred to as the size of the transform module 4804. In some aspects, the transform module 4804 may identify a symbol for each point that it uses.

The apparatus 4602r may further include a channel estimator and equalizer 4805 configured to form an estimate of the channel over which the data unit is received, and to remove certain effects of the channel based on the channel estimate. For example, the channel estimator and equalizer 4805 may be configured to approximate a function of the channel, and the channel equalizer may be configured to apply an inverse of that function to the data in the frequency spectrum.

The apparatus 4602r may further include a demodulator 4806 configured to demodulate the equalized data. For example, the demodulator 4806 may determine a plurality of bits from symbols output by the transform module 4804 and the channel estimator and equalizer 4805, for example by reversing a mapping of bits to a symbol in a constellation. The bits may be processed or evaluated by the processing system 4604 (FIG. 46), or used to display or otherwise output information to the user interface 4622 (FIG. 46). In this way, data and/or information may be decoded. In some aspects, the bits correspond to codewords. In one aspect, the demodulator 4806 may include a QAM (quadrature amplitude modulation) demodulator, for example an 8-QAM demodulator or a 64-QAM demodulator. In other aspects, the demodulator 4806 may include a binary phase-shift keying (BPSK) demodulator or a quadrature phase-shift keying (QPSK) demodulator.

In FIG. 48, the transform module 4804, the channel estimator and equalizer 4805, and the demodulator 4806 are illustrated as being implemented in the DSP 4820. In some aspects, however, one or more of the transform module 4804, the channel estimator and equalizer 4805, and the demodulator 4806 are implemented in the processing system 4604 (FIG. 46) or in another element of the apparatus 4602 (FIG. 46).

As discussed above, the wireless signal received at the receiver 4612 may include one or more data units. Using the functions or components described above, the data units or data symbols therein may be decoded evaluated or otherwise evaluated or processed. For example, the processing system 4604 (FIG. 46) and/or the DSP 4820 may be used to decode data symbols in the data units using the transform module 4804, the channel estimator and equalizer 4805, and the demodulator 4806.

Data units exchanged by the AP 4504 and the STA 4506 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 4602t shown in FIG. 47 is an example of a single transmit chain used for transmitting via an antenna. The apparatus 4602r shown in FIG. 48 is an example of a single receive chain used for receiving via an antenna. In some implementations, the apparatus 4602t or 4602r may implement a portion of a MIMO system using multiple antennas to simultaneously transmit data.

The wireless communication system 4500 may employ methods to allow efficient access of the wireless medium based on unpredictable data transmissions while avoiding collisions. As such, in accordance with various aspects, the wireless communication system 4500 performs carrier sense multiple access/collision avoidance (CSMA/CA) that may be referred to as the Distributed Coordination Function (DCF). More generally, an apparatus 4602 having data for transmission senses the wireless medium to determine if the channel is already occupied. If the apparatus 4602 senses the channel is idle, then the apparatus 4602 transmits prepared data. Otherwise, the apparatus 4602 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus may include a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may include a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may include an access point, a relay, or an access terminal.

An access terminal may include, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may take the form of a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may include, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may include, be implemented as, or known as a relay node, a relay device, a relay station, a relay apparatus, or some other similar terminology. As discussed above, in some aspects, a relay may include some access terminal functionality and some access point functionality.

In some aspects, a wireless apparatus may include an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3$^{rd}$ Generation Partnership Project" (3GPP), while cdma2000 is described in documents from an organization named "3$^{rd}$ Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

Example Communication Device

Figure 49:
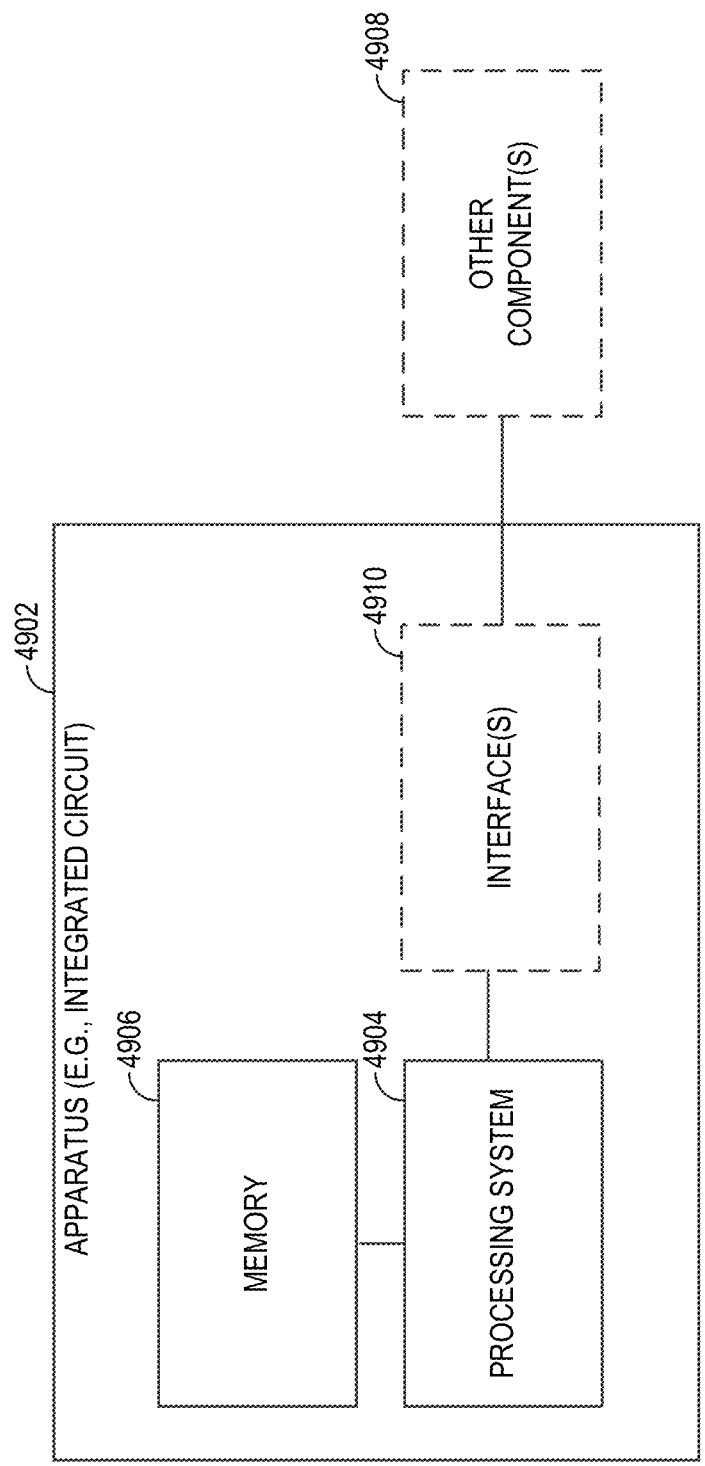
FIG. 49 is a functional block diagram of an example apparatus in accordance with some aspects of the disclosure.

FIG. 49 illustrates an example apparatus 4900 (e.g., an AP, an AT, or some other type of wireless communication node) according to certain aspects of the disclosure. The apparatus 4900 includes an apparatus 4902 (e.g., an integrated circuit) and, optionally, at least one other component 4908. In some aspects, the apparatus 4902 may be configured to operate in a wireless communication node (e.g., an AP or an AT) and to perform one or more of the operations described herein. For convenience, a wireless communication node may be referred to herein as a wireless node. In different scenarios, a wireless node may be an AP, a STA, a central scheduler, or some other type of communication node. The apparatus 4902 includes a processing system 4904, and a memory 4906 coupled to the processing system 4904. Example implementations of the processing system 4904 are provided herein. In some aspects, the processing system 4904 and the memory 4906 of FIG. 49 may correspond to the processing system 4604 and the memory component 4606 of FIG. 46.

The processing system 4904 is generally adapted for processing, including the execution of such programming stored on the memory 4906. For example, the memory 4906 may store instructions that, when executed by the processing system 4904, cause the processing system 4904 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 4902 communicates with at least one other component 4908 (i.e., a component external to the apparatus 4902) of the apparatus 4900. To this end, in some implementations, the apparatus 4902 may include at least one interface 4910 (e.g., a send/receive interface) coupled to the processing system 4904 for outputting and/or obtaining (e.g., sending and/or receiving) information (e.g., received information, generated information, decoded information, messages, etc.) between the processing system 4904 and the at least one other component 4908. In some implementations, the at least one interface 4910 may include an interface bus, bus drivers, bus receivers, other suitable circuitry, or a combination thereof. In some implementations, the at least one interface 4910 may include radio frequency (RF) circuitry (e.g., an RF transmitter and/or an RF receiver). In some implementations, the at least one interface 4910 may be configured to interface the apparatus 4902 to one or more other components of the apparatus 4900 (other components not shown in FIG. 49). For example, the at least one interface 4910 may be configured to interface the processing system 4904 to a radio frequency (RF) front end (e.g., an RF transmitter and/or am RF receiver). In some implementations, an interface may include multiple interfaces. For example, a bidirectional interface may include a first interface for obtaining and a second interface for outputting.

The apparatus 4902 may communicate with other apparatuses in various ways. In cases where the apparatus 4902 includes an RF transceiver (not shown in FIG. 49), the apparatus may transmit and receive information (e.g., a frame, a message, bits, etc.) via RF signaling. In some cases, rather than transmitting information via RF signaling, the apparatus 4902 may have an interface to provide (e.g., output, send, transmit, etc.) information for RF transmission. For example, the processing system 4904 may output information, via a bus interface, to an RF front end for RF transmission. Similarly, rather than receiving information via RF signaling, the apparatus 4902 may have an interface to obtain information that is received by another apparatus. For example, the processing system 4904 may obtain (e.g., receive) information, via a bus interface, from an RF receiver that received the information via RF signaling.

Example Processes

Figure 50:
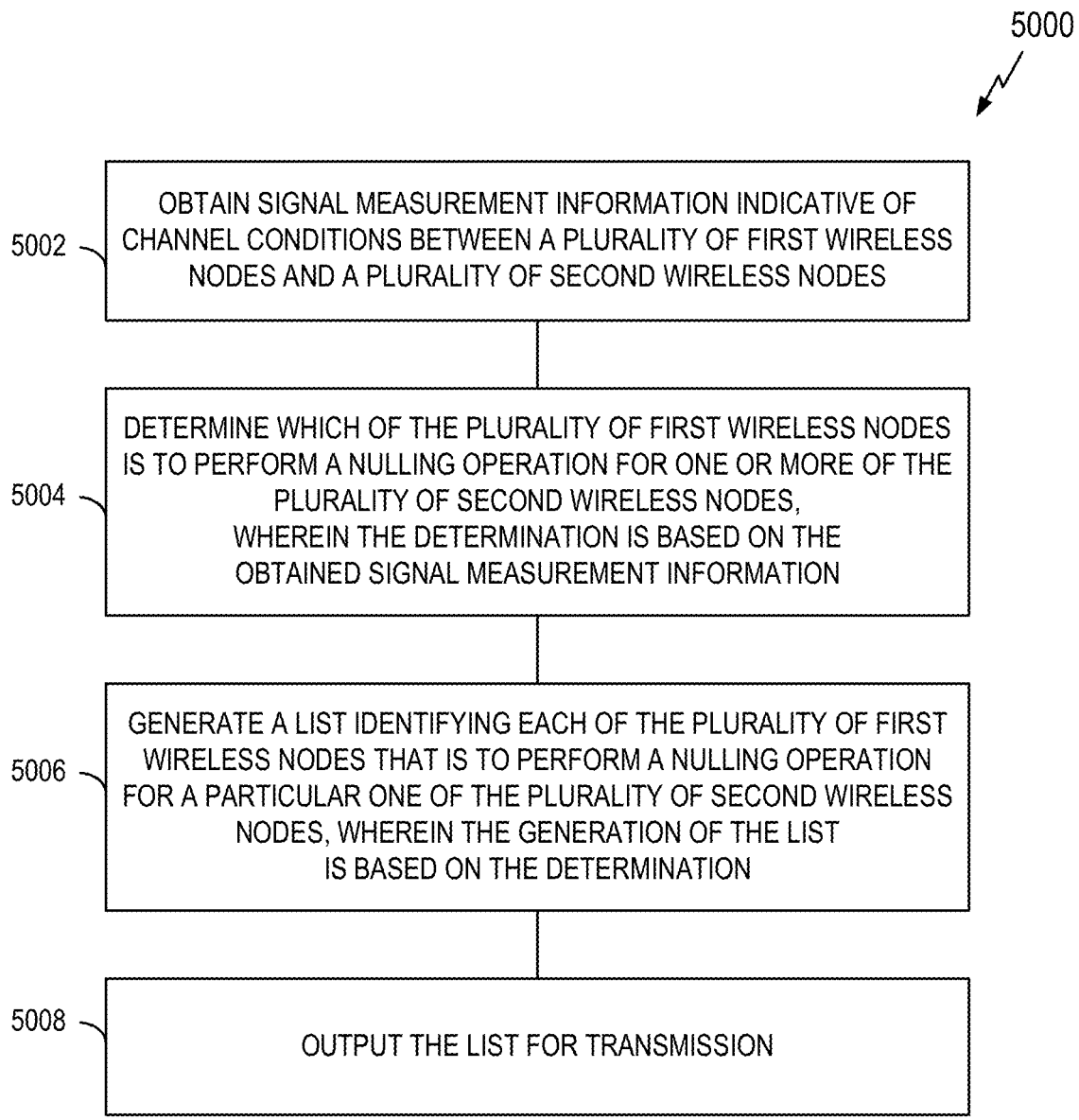
FIG. 50 is a flow diagram of an example process for identifying nodes for a nulling operation in accordance with some aspects of the disclosure.

FIG. 50 illustrates an example process 5000 for communication in accordance with some aspects of the disclosure. The process 5000 may take place within a processing system (e.g., the processing system 4904 of FIG. 49), which may be located in an AP, a STA, or some other suitable apparatus. Of course, in various aspects within the scope of the disclosure, the process 5000 may be implemented by any suitable apparatus capable of supporting communication-related operations.

At block 5002, an apparatus (e.g., an AP or some other node) obtains signal measurement information indicative of channel conditions between a plurality of first wireless nodes (e.g., APs) and a plurality of second wireless nodes (e.g., STAs). In some aspects, the plurality of first wireless nodes may include at least part of a cluster of wireless nodes configured to collectively serve the plurality of second wireless nodes. In some aspects, the cluster may include a coordinated beamforming cluster or a joint multiple-input multiple-output (MIMO) cluster.

The signal measurement information may take different forms in different scenarios. In some aspects, the signal measurement information may include at least one received signal strength indication (RSSI). In some aspects, the signal measurement information may include at least one signal-to-interference-and-noise ratio (SINR). In some aspects, the signal measurement information may be for at least one uplink signal, at least one downlink signal, or any combination thereof.

In some aspects, the signal measurement information may include a result of at least one beacon signal measurement. In addition, the obtaining may include obtaining the result of the at least one beacon signal measurement. In some aspects, the process 5000 may further include the apparatus generating a request for the plurality of second wireless nodes to measure a beacon signal from each of the plurality of first wireless nodes and outputting the request (e.g., for transmission to access points of the cluster). In this case, the result of the at least one beacon signal measurement may be obtained after outputting the request.

In some aspects, the signal measurement information may include a result of at least one sounding measurement. In addition, the obtaining may include obtaining the result of the at least one sounding measurement. In some aspects, the process 5000 may further include the apparatus generating a request for the plurality of second wireless nodes to conduct a sounding measurement with each of the plurality of first wireless nodes and outputting the request (e.g., for transmission to access points of the cluster). In this case, the result of the at least one sounding measurement may be obtained after outputting the request.

In some aspects, the signal measurement information may include a result of at least one uplink signal measurement. In addition, the obtaining may include obtaining the result of the at least one uplink signal measurement. In some aspects, the process 5000 may further include the apparatus generating a request for the plurality of second wireless nodes to transmit an uplink signal to each of the plurality of first wireless nodes and outputting the request (e.g., for transmission to access points of the cluster). In this case, the result of the at least one uplink signal measurement may be obtained after outputting the request.

In some aspects, at least one of the plurality of second wireless nodes may be associated with one of the plurality of first wireless nodes. In some aspects, the at least one of the plurality of second wireless nodes may be a basic service set.

At block 5004, the apparatus determines which of the plurality of first wireless nodes is to perform a nulling operation for one or more of the plurality of second wireless nodes, wherein the determination is based on the obtained signal measurement information.

At block 5006, the apparatus generates a list identifying each of the plurality of first wireless nodes that is to perform a nulling operation for a particular one of the plurality of second wireless nodes, wherein the generation of the list is based on the determination of block 5004.

At block 5008, the apparatus outputs the list for transmission.

Figure 51:
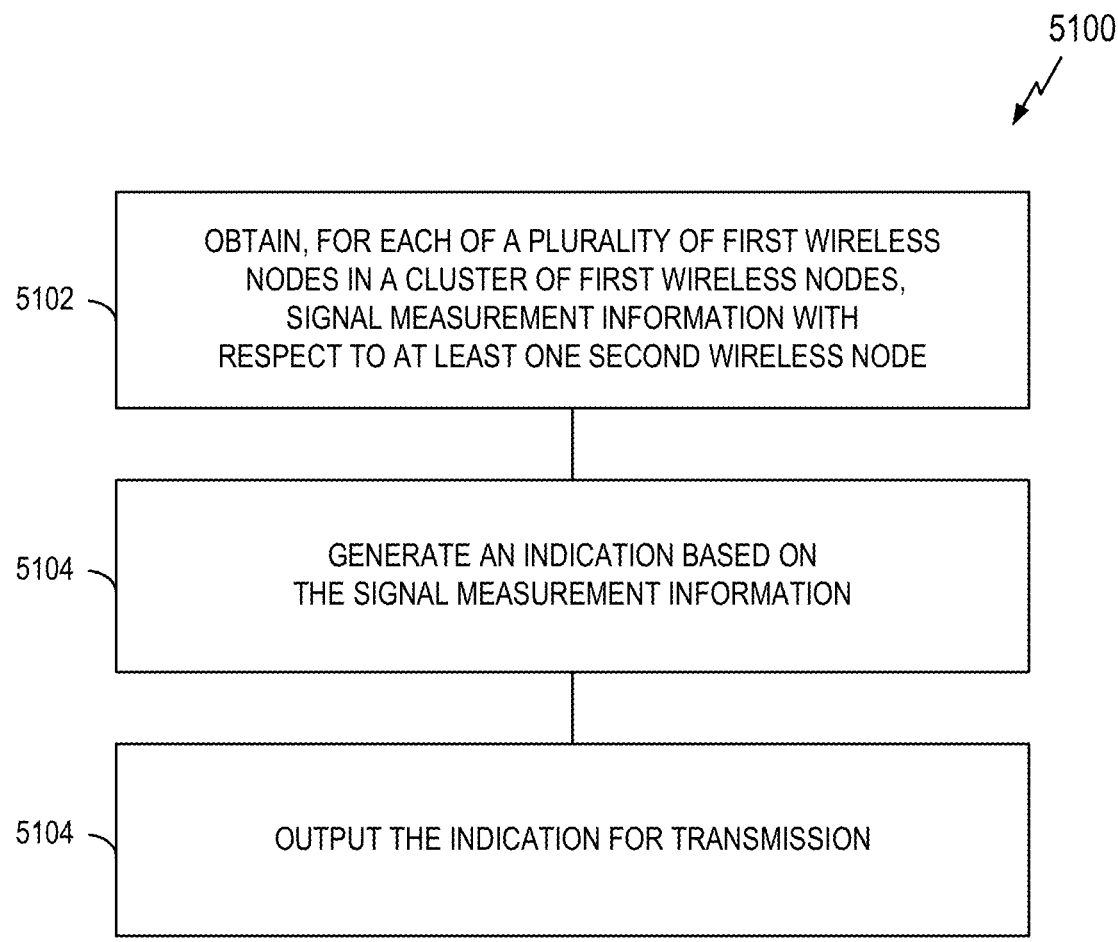
FIG. 51 is a flow diagram of an example process for providing an indication based on signal measurement information in accordance with some aspects of the disclosure.

FIG. 51 illustrates an example process 5100 for communication in accordance with some aspects of the disclosure. The process 5100 may take place within a processing system (e.g., the processing system 4904 of FIG. 49), which may be located in an AP, a STA, or some other suitable apparatus. Of course, in various aspects within the scope of the disclosure, the process 5100 may be implemented by any suitable apparatus capable of supporting communication-related operations.

At block 5102, an apparatus (e.g., an AP, a STA, or some other node) obtains, for each of a plurality of first wireless nodes in a cluster of first wireless nodes, signal measurement information with respect to at least one second wireless node. In some aspects, the signal measurement information may include at least one received signal strength indication (RSSI), at least one signal-to-interference-and-noise ratio (SINR), or any combination thereof. In some aspects, the signal measurement information may be reported by the at least one second wireless node to an associated one of the plurality of first wireless nodes in the cluster. In some aspects, the cluster may include a coordinated beamforming cluster or a joint multiple-input multiple-output (MIMO) cluster.

At block 5104, the apparatus generates an indication based on the signal measurement information. In some aspects, the indication may include: the signal measurement information, an identifier of an access point that is to perform nulling, or some other information.

At block 5106, the apparatus outputs the indication (e.g., for transmission to at least one access point).

In some aspects, the process 5100 may further include the apparatus generating a packet including a media access control (MAC) header, the header having a high efficiency control field including the indication therein or a management frame including the indication therein. In addition, the outputting of the indication may include outputting the packet.

In some aspects, the process 5100 may further include the apparatus determining whether at least one of the plurality of first wireless nodes is to generate at least one nulling signal for the at least one second wireless node. In some aspects, the determination may be based on the signal measurement information. In addition, the generation of the indication may involve including at least one identifier of the at least one of the plurality of first wireless nodes in the indication.

In some aspects, the at least one second wireless node may include a plurality of second wireless nodes in a set of second wireless nodes served by a first one of the plurality of first wireless nodes. In addition, the apparatus may output the indication for transmission to at least a second one of the plurality of first wireless nodes. In some aspects, the set of second wireless nodes may include a basic service set.

In some aspects, process 5100 may include the apparatus obtaining additional signal measurement information from the at least a second one of the plurality of first wireless nodes, and generating a transmission schedule based on the additional signal measurement information. In some aspects, the additional signal measurement information may relate to at least one other second wireless node associated with the at least a second one of the plurality of first wireless nodes. In some aspects, transmission of signal measurement information by the first one of the plurality of first wireless nodes to the at least a second one of the plurality of first wireless nodes may be scheduled by one of the plurality of first wireless nodes in the cluster.

In some aspects, the process 5100 may further include the apparatus obtaining a request to measure a beacon signal from each of the plurality of first wireless nodes in the cluster. In some aspects, the obtaining of the signal measurement may include measuring a beacon signal from each of the plurality of first wireless nodes in the cluster. In some aspects, the outputting of the indication for transmission may include outputting a result of the measurement of the beacon signal.

In some aspects, the process 5100 may further include the apparatus obtaining a request to conduct a sounding measurement with each of the plurality of first wireless nodes in the cluster. In some aspects, the obtaining of the signal measurement may include conducting a sounding measurement with each of the plurality of first wireless nodes in the cluster. In some aspects, the outputting of the indication for transmission may include outputting a result of the sounding measurement based on the sounding measurement.

In some aspects, the process 5100 may further include the apparatus obtaining a request to transmit an uplink signal to each of the plurality of first wireless nodes in the cluster, and outputting an uplink signal for transmission to each of the plurality of first wireless nodes in the cluster after obtaining the request.

Figure 52:
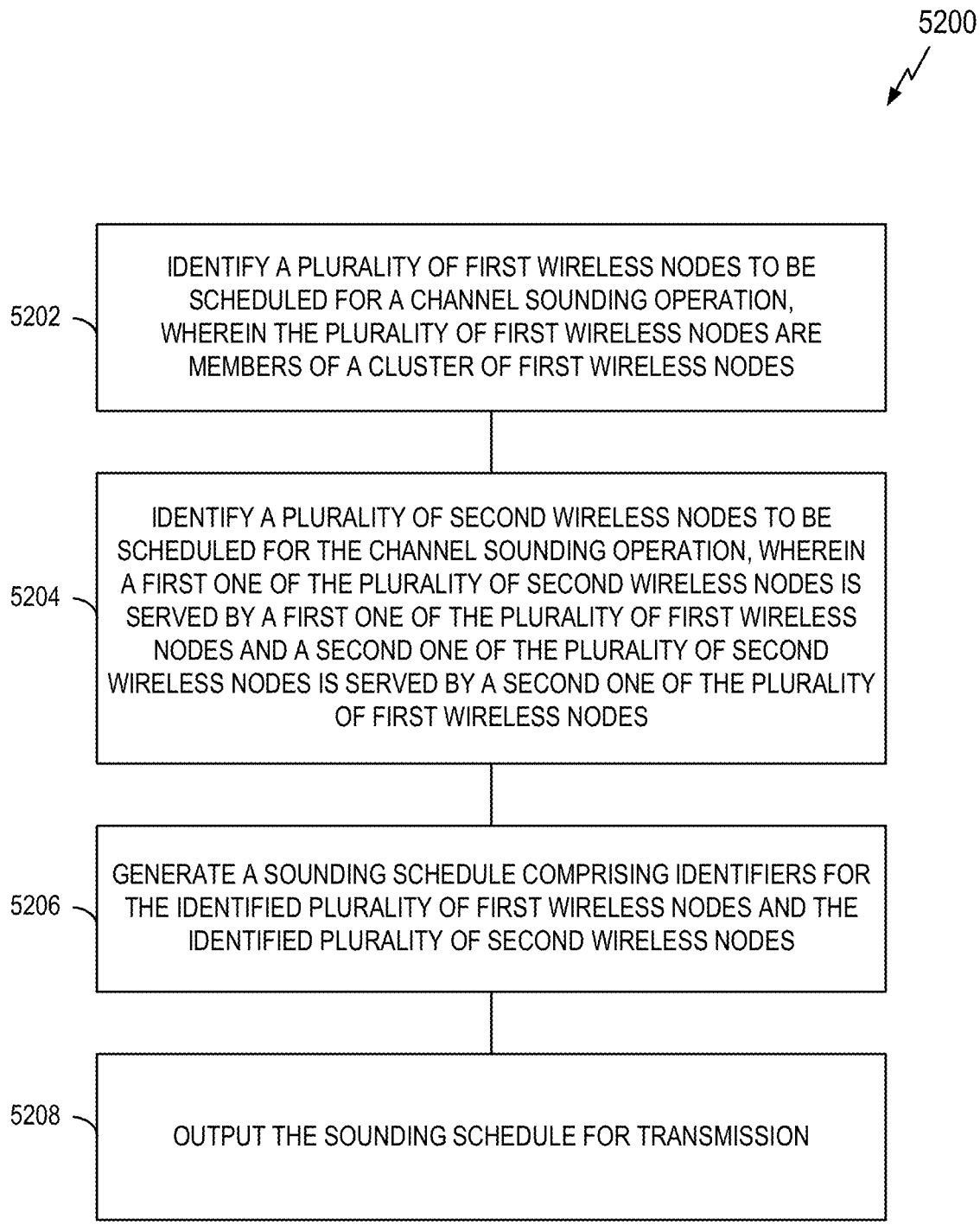
FIG. 52 is a flow diagram of an example sounding scheduling process in accordance with some aspects of the disclosure.

FIG. 52 illustrates an example process 5200 for communication in accordance with some aspects of the disclosure. The process 5200 may take place within a processing system (e.g., the processing system 4904 of FIG. 49), which may be located in an AP, a STA, or some other suitable apparatus. Of course, in various aspects within the scope of the disclosure, the process 5200 may be implemented by any suitable apparatus capable of supporting communication-related operations.

At block 5202, an apparatus (e.g., an AP or some other node) identifies a plurality of first wireless nodes to be scheduled for a channel sounding operation, wherein the plurality of first wireless nodes are members of a cluster of first wireless nodes. In some aspects, the cluster may include a coordinated beamforming cluster or a joint multiple-input multiple-output (MIMO) cluster.

At block 5204, the apparatus identifies a plurality of second wireless nodes to be scheduled for the channel sounding operation, wherein a first one of the plurality of second wireless nodes is served by a first one of the plurality of first wireless nodes and a second one of the plurality of second wireless nodes is served by a second one of the plurality of first wireless nodes. In some aspects, the identification of the plurality of second wireless nodes may include identifying wireless nodes that are to measure each individual null data packet (NDP) sent by at least one of the plurality of first wireless nodes.

At block 5206, the apparatus generates a sounding schedule including identifiers for the identified plurality of first wireless nodes and the identified plurality of second wireless nodes.

In some aspects, the sounding schedule may include: an order in which the plurality of first wireless nodes are to send respective null data packets (NDPs), a beamforming report (BFRP) configuration for each of the plurality of second wireless nodes, a tone grouping number for each of the plurality of second wireless nodes, a codebook size for each of the plurality of second wireless nodes, a null data packet (NDP) configuration for each of the plurality of first wireless nodes, an NDP bandwidth for each of the plurality of first wireless nodes, a number of sounding streams for each of the plurality of first wireless nodes, or any combination thereof.

At block 5208, the apparatus outputs the sounding schedule (e.g., for transmission to access points of the cluster).

In some aspects, the process 5200 may further include the apparatus generating a scheduling frame including the sounding schedule therein. In some aspects, the outputting of the sounding schedule may include outputting the scheduling frame for transmission at a beginning of a sounding sequence.

In some aspects, the process 5200 may further include the apparatus generating a null data packet announcement (NDPA) frame including the sounding schedule therein. In some aspects, the outputting of the sounding schedule may include outputting the NDPA frame for transmission at a beginning of a sounding sequence.

In some aspects, the process 5200 may further include the apparatus generating a sounding trigger and scheduling frame including the sounding schedule therein. In some aspects, the outputting of the sounding schedule may include outputting the sounding trigger and scheduling frame for transmission at a beginning of a sounding sequence.

In some aspects, the process 5200 may further include the apparatus obtaining information for the identification of the plurality of first wireless nodes, the plurality of second wireless nodes, or any combination thereof. In some aspects, the process 5200 may further include the apparatus outputting at least one query for transmission, where the at least one query solicits the information from the plurality of first wireless nodes. In some aspects, the at least one query may indicate at least one resource to be used per response, and the at least one resource may include at least one sub-band, at least one spatial stream, at least one time slot, or any combination thereof. In some aspects, the process 5200 may further include the apparatus outputting at least one query for transmission, where the at least one query solicits the information from the plurality of second wireless nodes. In some aspects, the obtaining of the information may include obtaining autonomous advertisements including the information from the plurality of first wireless nodes. In some aspects, the obtaining of the information may include obtaining autonomous advertisements including the information from the plurality of second wireless nodes.

In some aspects, the information may include: second wireless node identifiers per basic service set (BSS) of any of the plurality of second wireless nodes that are candidates for distributed multiple-input multiple-output (MIMO) data reception within the cluster, second wireless node identifiers of any of the plurality of second wireless nodes that have data to send, first wireless node identifiers of any of the plurality of first wireless nodes that are candidates to perform a nulling operation with respect to at least one of the plurality of second wireless nodes, capability information for distributed MIMO sounding for at least one of the plurality of second wireless nodes, or any combination thereof.

Figure 53:
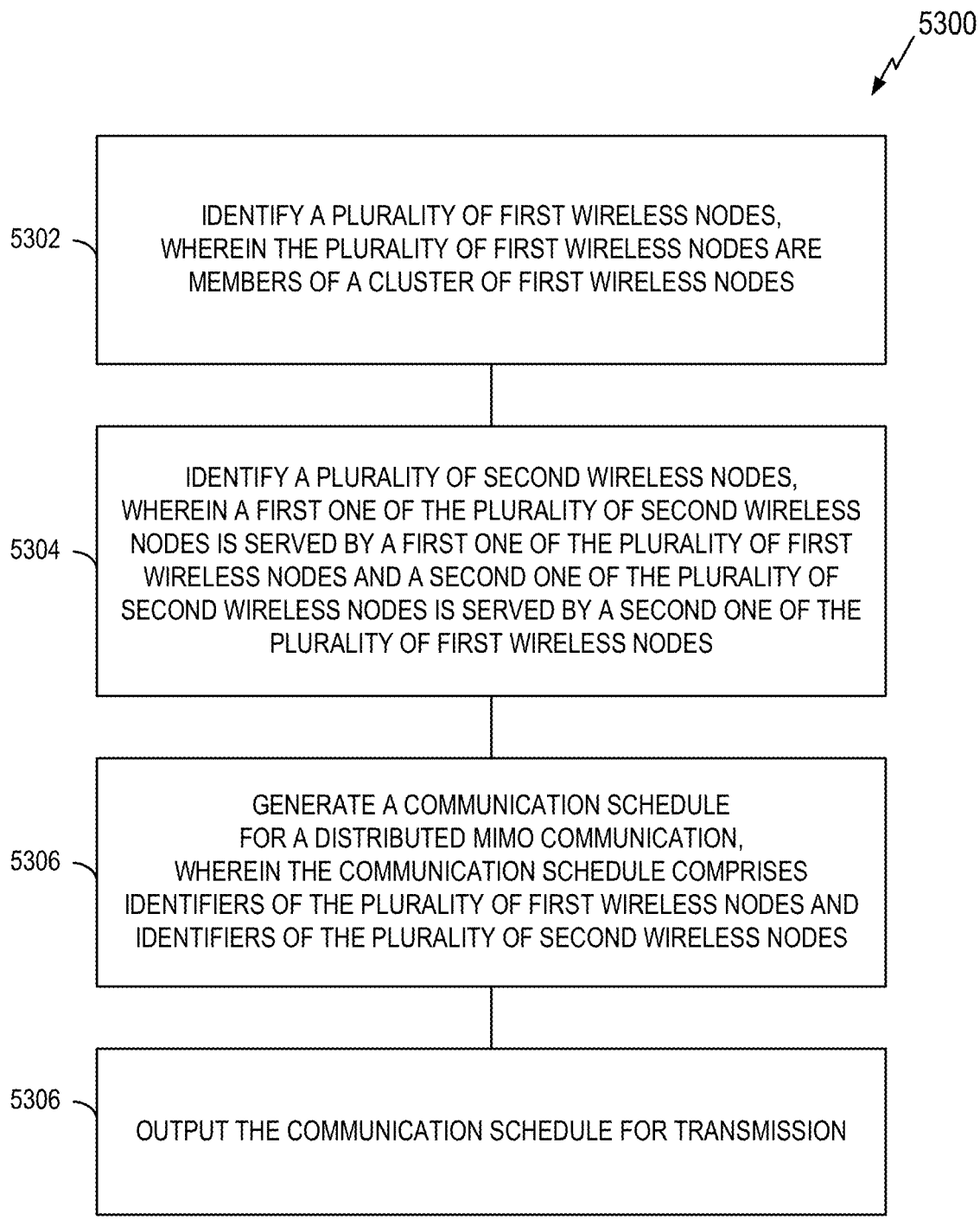
FIG. 53 is a flow diagram of an example scheduling process in accordance with some aspects of the disclosure.

FIG. 53 illustrates an example process 5300 for communication in accordance with some aspects of the disclosure. The process 5300 may take place within a processing system (e.g., the processing system 4904 of FIG. 49), which may be located in an AP, a STA, or some other suitable apparatus. Of course, in various aspects within the scope of the disclosure, the process 5300 may be implemented by any suitable apparatus capable of supporting communication-related operations.

At block 5302, an apparatus (e.g., an AP or some other node) identifies a plurality of first wireless nodes, wherein the plurality of first wireless nodes are members of a cluster of first wireless nodes. In some aspects, the identification of the plurality of first wireless nodes may include determining, for each of the plurality of first wireless nodes of the cluster of first wireless nodes, whether the first wireless node has sufficient dimensions to serve at least one of the plurality of second wireless nodes in a basic service set of the first wireless node and to null any of the plurality of second wireless nodes not in the basic service set of the first wireless node that require nulling for the distributed MIMO communication. In some aspects, the cluster may include a coordinated beamforming cluster or a joint multiple-input multiple-output (MIMO) cluster.

At block 5304, the apparatus identifies a plurality of second wireless nodes, wherein a first one of the plurality of second wireless nodes is served by a first one of the plurality of first wireless nodes and a second one of the plurality of second wireless nodes is served by a second one of the plurality of first wireless nodes. In some aspects, the identification of the plurality of second wireless nodes may include, for each of the plurality of first wireless nodes, identifying at least one of the plurality of second wireless nodes in a basic service set of the first wireless node that is served by the first wireless node and has data to send. In some aspects, the identification of the plurality of second wireless nodes may include, for each of the plurality of first wireless nodes, identifying at least one of the plurality of second wireless nodes that is not in a basic service set of the first wireless node and is to be nulled by the first wireless node.

At block 5306, the apparatus generates a communication schedule for a distributed multiple-input multiple-output (MIMO) communication (e.g., a downlink transmission or an uplink transmission), wherein the communication schedule includes identifiers of the plurality of first wireless nodes and identifiers of the plurality of second wireless nodes. In some aspects, the distributed MIMO communication may include a coordinated beamforming (COBF) communication or a joint multiple-input multiple-output (MIMO) communication.

In some aspects, the communication schedule may include trigger frame scheduling information for the plurality of first wireless nodes. In some aspects, the trigger frame scheduling information may include: an identifier for each of the plurality of first wireless nodes, at least one trigger frame resource allocation for each of the plurality of first wireless nodes, at least one start stream index for each of the plurality of first wireless nodes, at least one stream number for each of the plurality of first wireless nodes, at least one time slot for each of the plurality of first wireless nodes, at least one sub-band for each of the plurality of first wireless nodes, at least one modulation and coding scheme (MCS) for each of the plurality of first wireless nodes, a duration of at least one trigger frame transmission, at least one bandwidth for at least one trigger frame transmission, or any combination thereof.

In some aspects, the communication schedule may include: a second wireless node identifier for each of the plurality of second wireless nodes, at least one distributed MIMO communication resource allocation for each of the plurality of second wireless nodes, at least one identifier of at least one of the plurality of first wireless nodes scheduled to perform a nulling operation for at least one of the plurality of second wireless nodes, at least one received signal strength indication (RSSI) at each of the plurality of first wireless nodes, a duration of the distributed MIMO communication, at least one bandwidth for the distributed MIMO communication, or any combination thereof.

In some aspects, the communication schedule may include: at least one start stream index for each of the plurality of second wireless nodes, at least one stream number for each of the plurality of second wireless nodes, at least one modulation and coding scheme (MCS) for each of the plurality of second wireless nodes, at least one identifier of at least one of the plurality of first wireless nodes not scheduled to perform a nulling operation for at least one of the plurality of second wireless nodes, or any combination thereof.

In some aspects, the communication schedule may include scheduling information for at least one acknowledgement of the distributed MIMO communication. In some aspects, the scheduling information may include: at least one acknowledgement resource for each of the plurality of second wireless nodes, at least one acknowledgement resource for all of the plurality of second wireless nodes, at least one start stream index for each of the plurality of second wireless nodes, at least one stream number for each of the plurality of second wireless nodes, at least one time slot for each of the plurality of second wireless nodes, at least one sub-band for each of the plurality of second wireless nodes, at least one modulation and coding scheme (MCS) for each of the plurality of second wireless nodes, or any combination thereof.

At block 5308, the apparatus outputs the communication schedule for transmission.

In some aspects, the process 5300 may include the apparatus generating at least one scheduling frame including the communication schedule. In some aspects, the outputting of the communication schedule may include outputting the at least one scheduling frame for transmission. In some aspects, the at least one scheduling frame may be output for transmission prior to, combined with, or after at least one trigger frame. In some aspects, the at least one scheduling frame may include an aggregate scheduling frame for all of the plurality of first wireless nodes, the aggregate scheduling frame is output for transmission prior to the distributed MIMO communication. In some aspects, the at least one scheduling frame may be to trigger the plurality of second wireless nodes to commence the distributed MIMO communication. In some aspects, the at least one scheduling frame may include an indication informing the plurality of first wireless nodes to skip sending trigger frames. In some aspects, the at least one scheduling frame may include a plurality of frames for a plurality of distributed MIMO transmissions, for a particular one of the frames, the particular frame precedes a corresponding one of the plurality of distributed MIMO transmissions. In some aspects, the plurality of frames may include trigger frames. In some aspects, the process 5300 may include the apparatus soliciting an acknowledgement of the plurality of distributed MIMO transmissions. In some aspects, the at least one scheduling frame may include a trigger and scheduling frame for all of the plurality of first wireless nodes. In some aspects, the at least one scheduling frame may be to trigger the plurality of first wireless nodes to commence transmission of at least one trigger frame. In some aspects, the at least one trigger frame may be to trigger distributed MIMO transmissions for all of the plurality of first wireless nodes. In some aspects, the at least one trigger frame may be to trigger at least one of the plurality of second wireless nodes to commence the distributed MIMO communication.

In some aspects, the process 5300 may include the apparatus generating a trigger frame that includes the communication schedule. In some aspects, the outputting of the communication schedule may include outputting the trigger frame for transmission prior to the distributed MIMO communication.

In some aspects, the process 5300 may include the apparatus obtaining second wireless node information. In some aspects, the generation of the communication schedule may be based on the second wireless node information. In some aspects, the second wireless node information may include: identifiers per basic service set (BSS) of any of the plurality of second wireless nodes that are candidates for distributed multiple-input multiple-output (MIMO) data reception within the cluster, second wireless node identifiers of any of the plurality of second wireless nodes for which there is data, capability information for distributed MIMO reception by each of the plurality of second wireless nodes, at least one resource for the distributed MIMO communication to each of the plurality of second wireless nodes, at least one identifier of at least one of the plurality of first wireless nodes that is a candidate to perform a nulling operation for at least one of the plurality of second wireless nodes, at least one scheduling priority metric for each of the plurality of second wireless nodes, received signal strength indication (RSSI) difference tolerance information for each of the plurality of second wireless nodes, or any combination thereof. In some aspects, the RSSI difference tolerance information may include, for each of the plurality of second wireless nodes, a maximum tolerable RSSI at a serving first wireless node due to at least one transmission by the second wireless node, RSSI at each first wireless node due to at least one transmission by the second wireless node, or any combination thereof. In some aspects, the second wireless node information may include acknowledgement information for at least one acknowledgement of the distributed MIMO data communication. In some aspects, the acknowledgement information may include, for each of the plurality of second wireless nodes: at least one required acknowledgement resource, acknowledgement transmission capability information, at least one start stream index, at least one stream number, at least one time slot, at least one sub-band, at least one modulation and coding scheme (MCS), or any combination thereof. In some aspects, the second wireless node information may include at least one acknowledgement resource for all of the plurality of second wireless nodes. In some aspects, the process 5300 may include the apparatus outputting at least one query for transmission. In some aspects, the at least one query may solicit the second wireless node information from the plurality of first wireless nodes. In some aspects, the at least one query indicates at least one resource to be used per response, and the at least one resource may include at least one sub-band, at least one spatial stream index range, at least one time slot, or any combination thereof. In some aspects, the process 5300 may include the apparatus outputting at least one query for transmission. In some aspects, the at least one query may solicit the second wireless node information from the plurality of second wireless nodes. In some aspects, the obtaining of the second wireless node information may include: obtaining autonomous advertisements that include the second wireless node information from the plurality of first wireless nodes. In some aspects, the obtaining of the autonomous advertisements may include collecting information during designated advertisement periods. In some aspects, the obtaining of the second wireless node information may include: obtaining autonomous advertisements that include the second wireless node information from the plurality of second wireless nodes.

Figure 54:
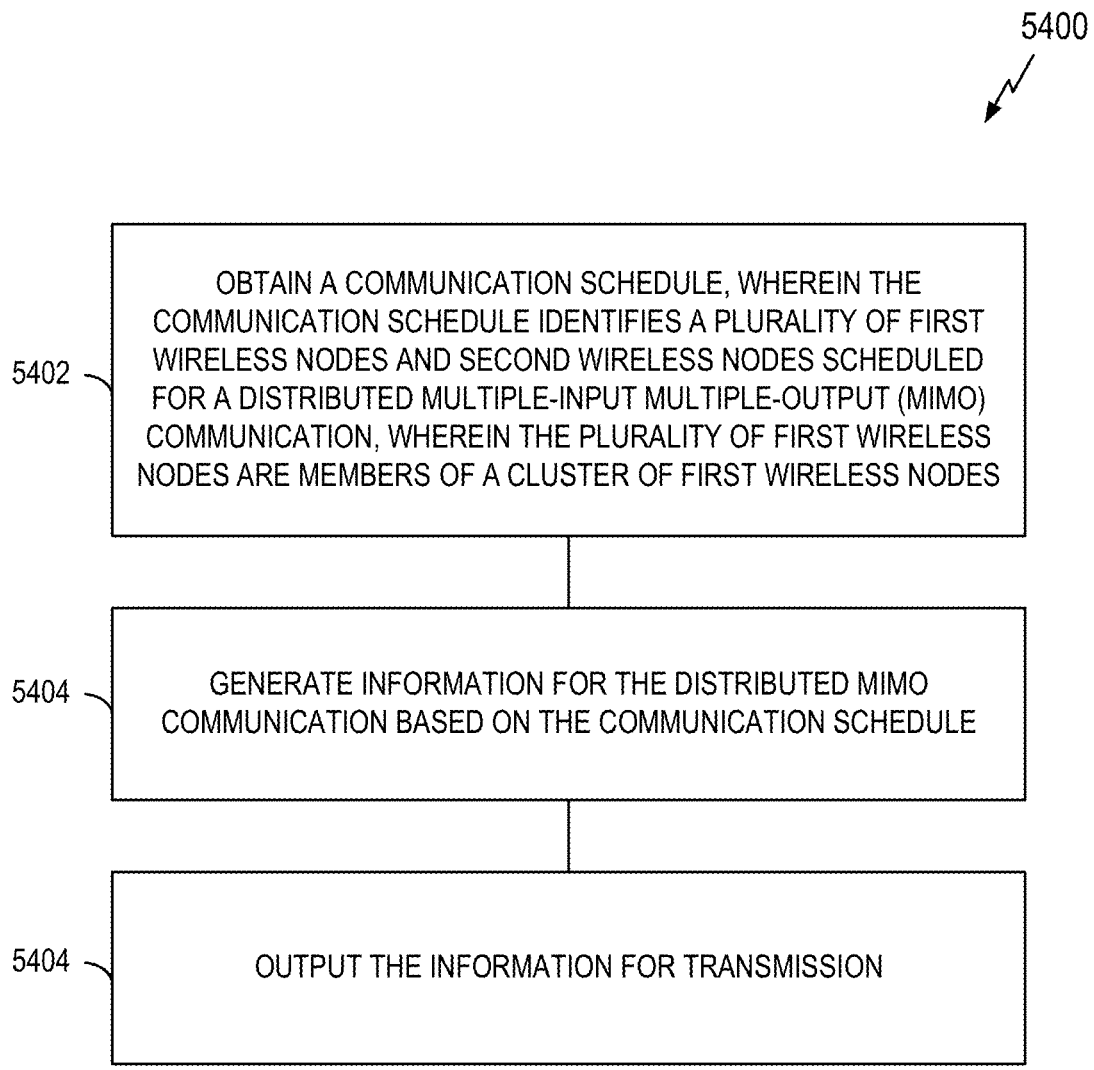
FIG. 54 is a flow diagram of an example a scheduled communication process in accordance with some aspects of the disclosure.

FIG. 54 illustrates an example process 5400 for communication in accordance with some aspects of the disclosure. The process 5400 may take place within a processing system (e.g., the processing system 4904 of FIG. 49), which may be located in an AP, a STA, or some other suitable apparatus. Of course, in various aspects within the scope of the disclosure, the process 5400 may be implemented by any suitable apparatus capable of supporting communication-related operations.

At block 5402, an apparatus (e.g., an AP or some other node) obtains a communication schedule, wherein the communication schedule identifies a plurality of first wireless nodes and second wireless nodes scheduled for a distributed multiple-input multiple-output (MIMO) communication, wherein the plurality of first wireless nodes are members of a cluster of first wireless nodes.

At block 5404, the apparatus generates information for the distributed MIMO communication based on the communication schedule.

At block 5406, the apparatus outputs the information (e.g., for transmission to stations in a cluster).

In some aspects, the process 5400 may include the apparatus outputting second wireless node information for transmission. In some aspects, the second wireless node information may be for generation of the communication schedule. In some aspects, the second wireless node information may be output for transmission via: at least one physical (PHY) layer preamble, at least one high efficiency (HE) control field of a media access control (MAC) header, at least one information element, or any combination thereof. In some aspects, the process 5400 may include the apparatus obtaining at least one query. In some aspects, the at least one query may solicit the second wireless node information. In some aspects, the second wireless node information may be output after obtaining the at least one query.

Figure 55:
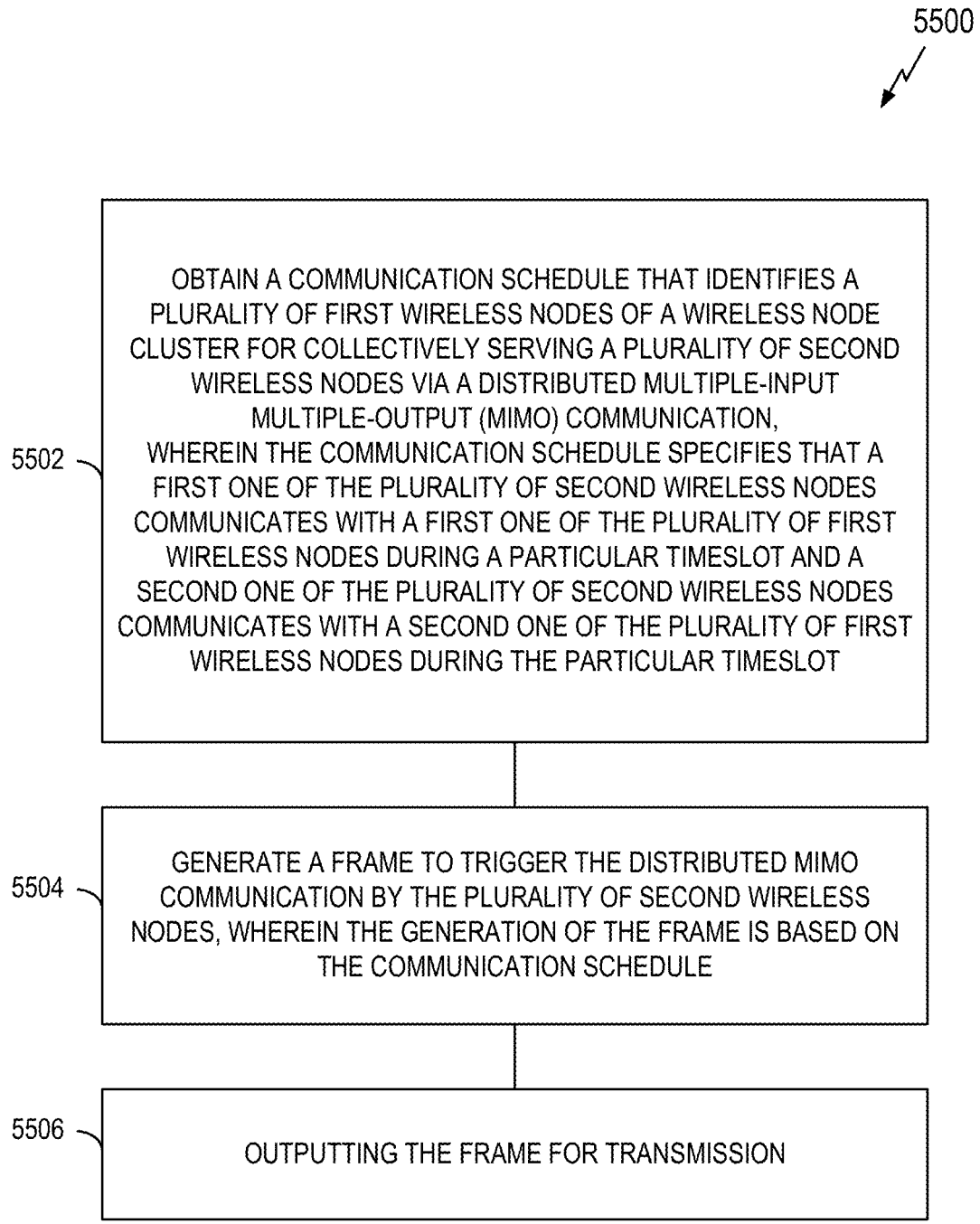
FIG. 55 is a flow diagram of an example process for triggering communication in accordance with some aspects of the disclosure.

FIG. 55 illustrates an example process 5500 for communication in accordance with some aspects of the disclosure. The process 5500 may take place within a processing system (e.g., the processing system 4904 of FIG. 49), which may be located in an AP, a STA, or some other suitable apparatus. Of course, in various aspects within the scope of the disclosure, the process 5500 may be implemented by any suitable apparatus capable of supporting communication-related operations.

At block 5502, an apparatus (e.g., an AP or some other node) obtains a communication schedule that identifies a plurality of first wireless nodes of a wireless node cluster for collectively serving a plurality of second wireless nodes via a distributed multiple-input multiple-output (MIMO) communication. In some aspects, the communication schedule may specify that a first one of the plurality of second wireless nodes communicates with a first one of the plurality of first wireless nodes during a particular timeslot and a second one of the plurality of second wireless nodes communicates with a second one of the plurality of first wireless nodes during the particular timeslot.

At block 5504, the apparatus generates a frame to trigger the distributed MIMO communication (e.g., uplink communication) by the plurality of second wireless nodes, wherein the generation of the frame is based on the communication schedule. In some aspects, the frame may include a trigger frame including the communication schedule. In some aspects, the trigger frame may be scheduled for transmission prior to the distributed MIMO communication.

At block 5506, the apparatus outputs the frame (e.g., for transmission to at least one access point of a cluster).

In some aspects, the process 5500 may include the apparatus determining, from the communication schedule, scheduling information for each of the plurality of second wireless nodes in a basic service set of one of the plurality of first wireless nodes. In some aspects, the process 5500 may include the apparatus outputting the scheduling information for transmission on a resource that is orthogonal to any resource used by any other one of the plurality of first wireless nodes for communication of other scheduling information.

In some aspects, the process 5500 may include the apparatus determining, from the communication schedule, scheduling information for each of the plurality of second wireless nodes in a basic service set of one of the plurality of first wireless nodes. In some aspects, the process 5500 may include the apparatus outputting the scheduling information for transmission on the same resource that is used by any other one of the plurality of first wireless nodes for communication of other scheduling information.

In some aspects, the process 5500 may include the apparatus outputting a preamble for transmission on a resource that is used by at least one other one of the plurality of first wireless nodes for communication of the preamble.

In some aspects, the process 5500 may include the apparatus outputting a preamble for transmission on a resource that is orthogonal to any resource used by at least one other one of the plurality of first wireless nodes for communication of another preamble.

In some aspects, the process 5500 may include the apparatus outputting second wireless node information for transmission, wherein the second wireless node information may be for generation of the communication schedule. In some aspects, the second wireless node information may be output for transmission via: at least one physical (PHY) layer preamble, at least one high efficiency (HE) control field of a media access control (MAC) header, at least one information element, or any combination thereof. In some aspects, the process 5500 may include the apparatus obtaining at least one query. In some aspects, the at least one query solicits the second wireless node information. In some aspects, the second wireless node information may be output after the at least one query is obtained.

In some aspects, the process 5500 may include the apparatus determining, from the communication schedule, scheduling information for each of the plurality of second wireless nodes in a basic service set of one of the plurality of first wireless nodes. In some aspects, the generation of the frame may include generating at least one trigger frame based on the scheduling information. In some aspects, the outputting of the frame may include the outputting the at least one trigger frame for transmission to each of the plurality of second wireless nodes in the basic service set of one of the plurality of first wireless nodes. In some aspects, the at least one trigger frame may include a plurality of trigger frames for a plurality of distributed MIMO transmissions. In some aspects, for a particular one of the trigger frames, the particular trigger frame precedes a corresponding one of the plurality of distributed MIMO transmissions. In some aspects, the at least one trigger frame may include at least one acknowledgement of a distributed MIMO communication. In some aspects, the at least one trigger frame may include a trigger and scheduling frame for all of the plurality of first wireless nodes. In some aspects, the trigger and scheduling frame may be scheduled for transmission prior to the distributed MIMO communication.

In some aspects, the process 5500 may include the apparatus determining scheduling information for all of the plurality of second wireless nodes based on the communication schedule. In some aspects, the frame may include a trigger frame including the scheduling information for all of the plurality of second wireless nodes.

Figure 56:
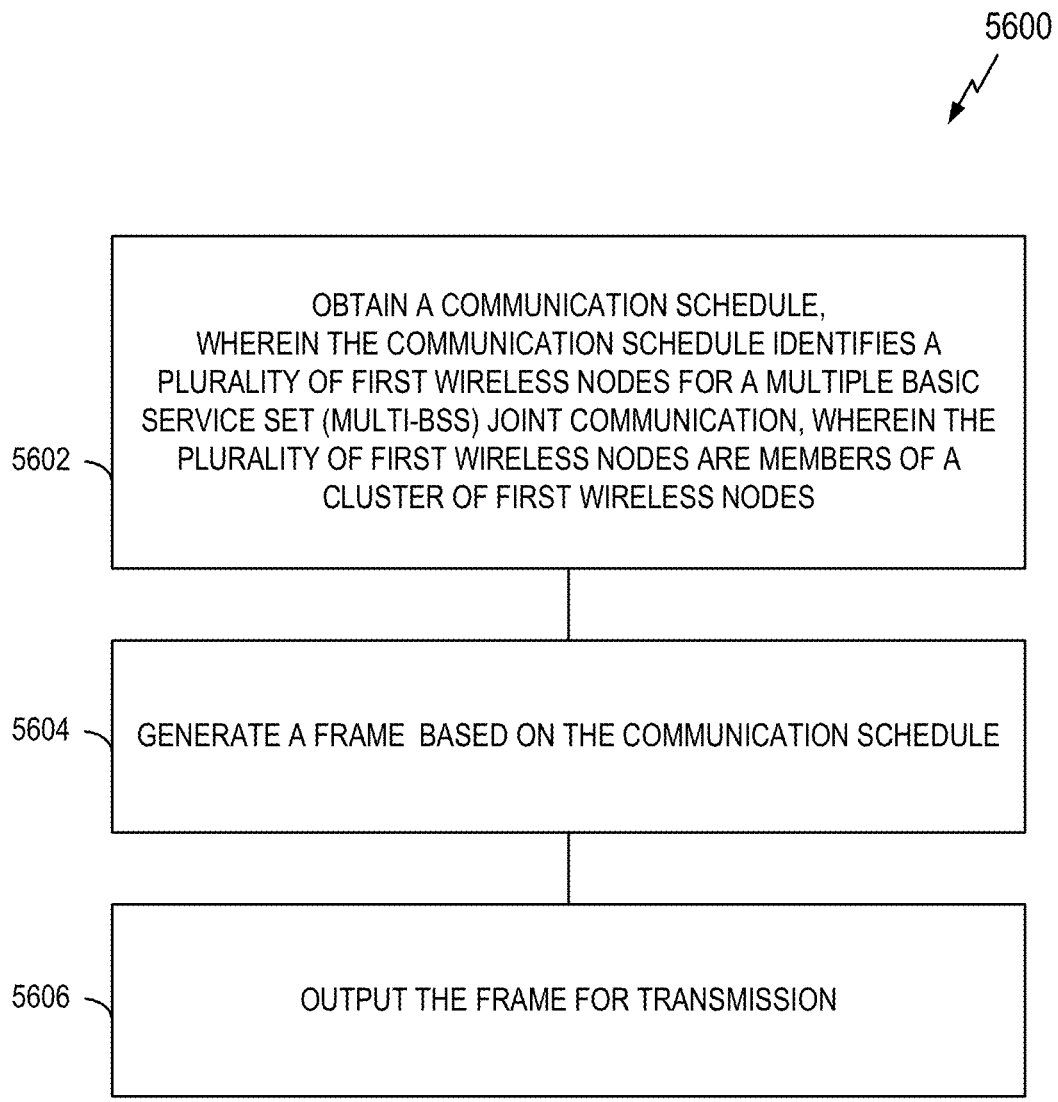
FIG. 56 is a flow diagram of another example of a scheduled communication process in accordance with some aspects of the disclosure.

FIG. 56 illustrates an example process 5600 for communication in accordance with some aspects of the disclosure. The process 5600 may take place within a processing system (e.g., the processing system 4904 of FIG. 49), which may be located in an AP, a STA, or some other suitable apparatus. Of course, in various aspects within the scope of the disclosure, the process 5600 may be implemented by any suitable apparatus capable of supporting communication-related operations.

At block 5602, an apparatus (e.g., an AP or some other node) obtains a communication schedule, wherein the communication schedule identifies a plurality of first wireless nodes for a multiple basic service set (multi-BSS) joint communication, wherein the plurality of first wireless nodes are members of a cluster of first wireless nodes. In some aspects, the communication schedule is sent by one of the plurality of first wireless nodes prior to the joint transmission. In some aspects, the multi-BSS joint communication may be a multi-BSS coordinated beamforming communication, a joint MIMO communication, or an orthogonal frequency division multiple access (OFDMA) communication.

At block 5604, the apparatus generates a frame based on the communication schedule.

At block 5606, the apparatus outputs the frame (e.g., for transmission to at least one station in a cluster).

In some aspects, a physical layer preamble of the frame may include a non-scheduling-related preamble section and a scheduling-related preamble section. In some aspects, the non-scheduling-related preamble section has the same contents for all of the plurality of first wireless nodes and is for transmission over the same resource by all of the plurality of first wireless nodes. In some aspects, the same contents include resource allocation information for the scheduling related preamble section for each of the plurality of first wireless nodes. In some aspects, the scheduling-related preamble section has same contents for each of the plurality of first wireless nodes and is for transmission over the same resource by all of the plurality of first wireless nodes. In some aspects, the same contents include downlink scheduling information for all scheduled second wireless nodes associated with the plurality of first wireless nodes. In some aspects, the scheduling-related preamble section has different contents for each of the plurality of first wireless nodes and is for transmission over orthogonal resource by different one of the plurality of first wireless nodes. In some aspects, the different contents for each of the plurality of first wireless nodes include downlink scheduling information for all scheduled second wireless nodes associated with the plurality of first wireless nodes.

Example Apparatus

Figure 57:
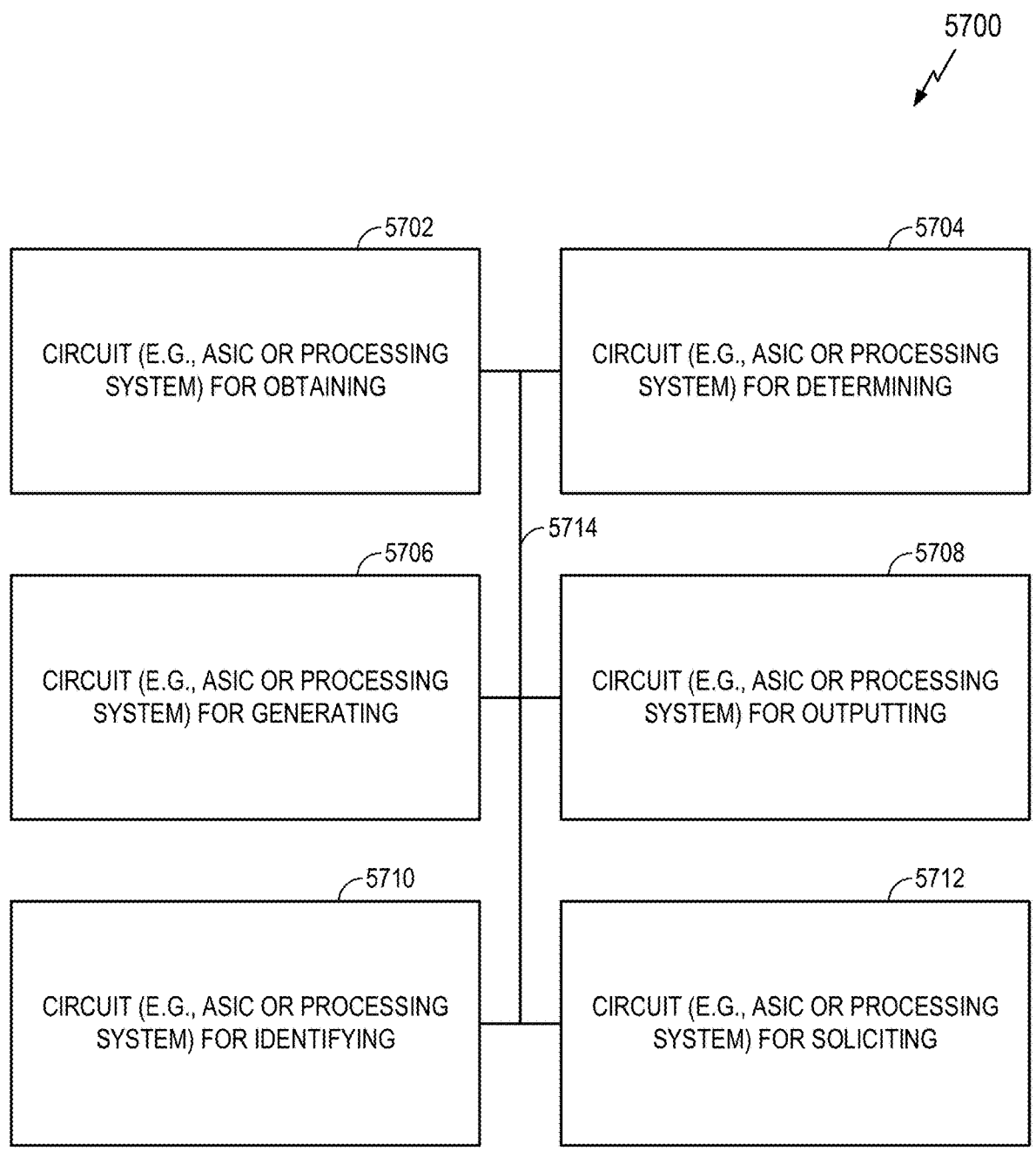
FIG. 57 is a simplified block diagram of several sample aspects of an apparatus configured with functionality in accordance with some aspects of the disclosure.

The components described herein may be implemented in a variety of ways. Referring to FIG. 57, an apparatus 5700 is represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 5700 includes one or more components (modules) that may perform one or more of the functions described herein with regard to various figures. For example, a circuit (e.g., an ASIC) for obtaining 5702, e.g., a means for obtaining, may correspond to, for example, an interface (e.g., a bus interface, a send/receive interface), a communication device, a transceiver, a transmitter, or some other similar component as discussed herein. A circuit (e.g., an ASIC) for determining 5704, e.g., a means for determining, may correspond to, for example, a processing system as discussed herein. A circuit (e.g., an ASIC) for generating 5706, e.g., a means for generating, may correspond to, for example, a processing system as discussed herein. A circuit (e.g., an ASIC) for outputting 5708, e.g., a means for outputting, may correspond to, for example, an interface (e.g., a bus interface, a send/receive interface), a communication device, a transceiver, a receiver, or some other similar component as discussed herein. A circuit (e.g., an ASIC) for identifying 5710, e.g., a means for identifying, may correspond to, for example, a processing system as discussed herein. A circuit (e.g., an ASIC) for soliciting 5712, e.g., a means for soliciting, may correspond to, for example, a processing system as discussed herein.

Two or more of the modules of FIG. 57 may communicate with each other or some other component via a signaling bus 5714. In various implementations, the processing system 4604 of FIG. 46 and/or the processing system 4904 of FIG. 49 may include one or more of the circuits of FIG. 57.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented herein by dashed boxes may be optional.

As noted above, the apparatus 5700 may include or take the form of one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 5700 may be a single device (e.g., with components 5702-5712 constituting different sections of an ASIC). As another specific example, the apparatus 5700 may be several devices (e.g., with the components 5702 and 5708 constituting one ASIC, and the components 5704, 5706, 5710, and 5712 constituting another ASIC).

In addition, the components and functions represented by FIG. 57 as well as other components and functions described herein, may be implemented using any suitable means. Such means are implemented, at least in part, using corresponding structure as taught herein. For example, the components described above in conjunction with the "ASIC for" components of FIG. 57 correspond to similarly designated "means for" functionality. Thus, one or more of such means is implemented using one or more of processor components, integrated circuits, or other suitable structure as taught herein in some implementations.

The various operations of methods described herein may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar functionality and/or numbering. For example, the blocks of the processes 5000-5600 illustrated herein may correspond at least in some aspects, to corresponding blocks of the apparatus 5700 illustrated in FIG. 57. For example, a means for obtaining may be the circuit for obtaining 5702, a means for determining be the circuit for determining 5704, a means for generating may be the circuit for generating 5706, a means for outputting may be the circuit for outputting 5708, a means for identifying may be the circuit for identifying 5710, and a means for soliciting may be the circuit for soliciting 5712.

Figure 58:
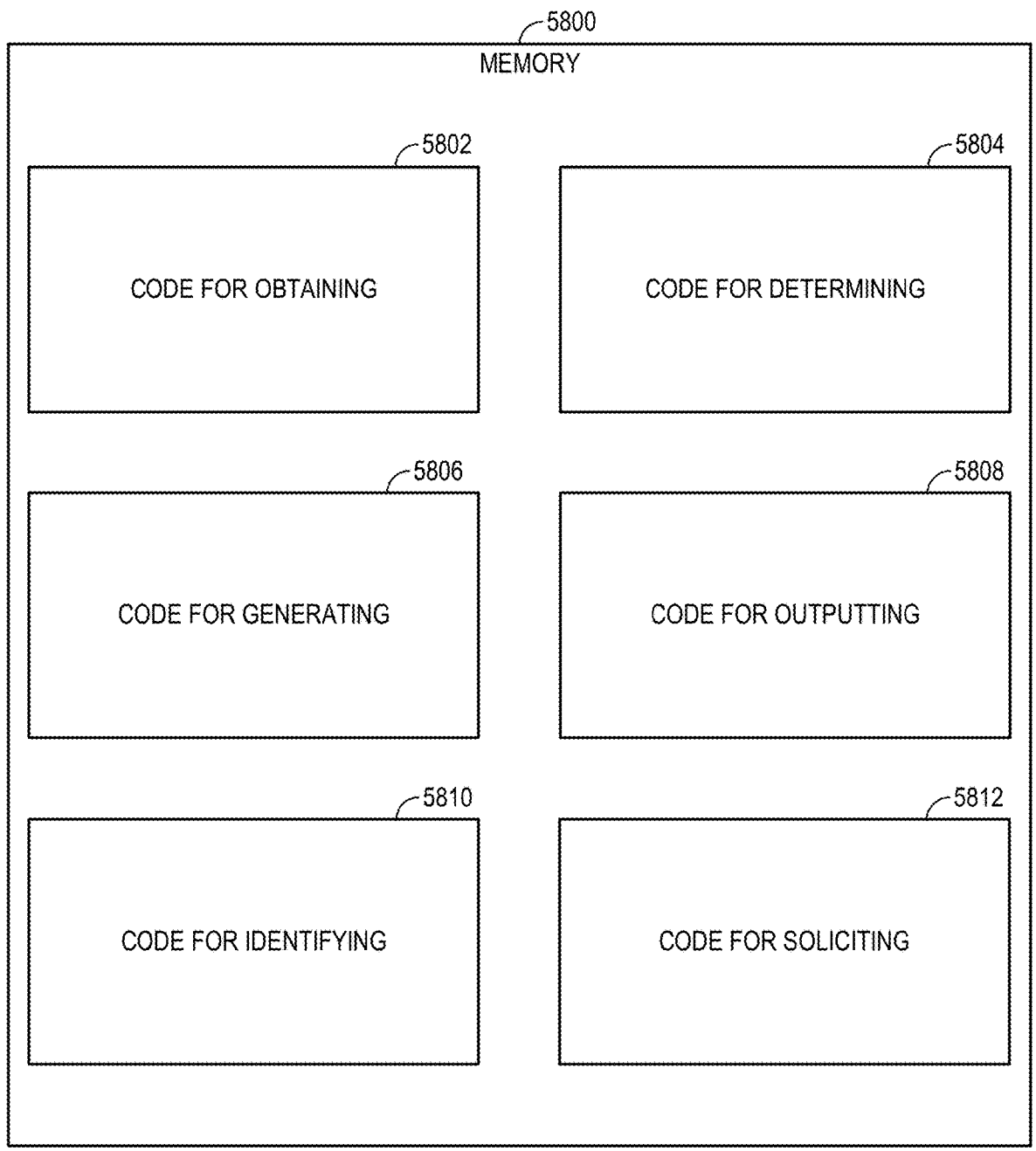
FIG. 58 is a simplified block diagram of several sample aspects of a memory configured with code in accordance with some aspects of the disclosure.

Referring to FIG. 58, programming stored by the memory 5802 (e.g. a storage medium, a memory device, etc.), when executed by a processing system (e.g., the processing system 4904 of FIG. 48), causes the processing system to perform one or more of the various functions and/or process operations described herein. For example, the programming, when executed by the processing system 4904, may cause the processing system 4904 to perform the various functions, steps, and/or processes described herein in various implementations. As shown in FIG. 58, the memory 5800 may include one or more of code for obtaining 5802, code for determining 5804, code for generating 5806, code for outputting 5808, code for identifying 5810, and code for soliciting 5712. In some aspects, one of more of the code for obtaining 5802, the code for determining 5804, the code for generating 5806, the code for outputting 5808, the code for identifying 5810, or the code for soliciting 5712 may be executed or otherwise used to provide the functionality described herein for the circuit for obtaining 5702, the circuit for determining 5704, the circuit for generating 5706, the circuit for outputting 5708, the circuit for identifying 5710, or the circuit for soliciting 5712. In some aspects, the memory 5800 of FIG. 58 may correspond to the memory 4906 of FIG. 49. Additional Aspects The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein (e.g., computer-readable medium storing computer-executable code, including code to perform the functionality described herein). Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for wireless communication, comprising:
   an interface; and
   a processing system configured to:
      obtaining information from a station (STA) via the interface; and
      output, via the interface for multicast transmission via a multi-user (MU) physical layer protocol data unit (PPDU) to a plurality of access points (APs), a medium access control (MAC) header that includes the information, wherein the information comprises: a received signal strength indication (RSSI) and an indication of an AP of the plurality of APs identified to perform a nulling operation for the STA.

2. The apparatus of claim 1, wherein the MAC header comprises a control field that includes the information.

3. The apparatus of claim 1, wherein the plurality of APs are configured to coordinate beamforming transmissions.

4. The apparatus of claim 3, wherein the information further comprises:
   a first RSSI associated with a first AP of the plurality of APs; and
   a second RSSI associated with a second AP of the plurality of APs.

5. The apparatus of claim 3, wherein the information further comprises:
   a first SINR associated with a first AP of the plurality of APs; and
   a second SINR associated with a second AP of the plurality of APs.

6. The apparatus of claim 1, wherein, to output the MAC header, the processing system is further configured to:
   output a packet comprising the MAC header to at least one AP of the plurality of APs.

7. The apparatus of claim 1, further comprising:
   a transceiver configured to transmit the MAC header, wherein the apparatus is configured as an access point.

8. A method for wireless communication at an apparatus, comprising:
   obtaining information from a station (STA); and
   outputting, for multicast transmission via a multi-user (MU) physical layer protocol data unit (PPDU) to a plurality of access points (APs), a medium access control (MAC) header that includes the information, wherein the information comprises: a received signal strength indication (RSSI) and an indication of an AP of the plurality of APs identified to perform a nulling operation for the STA.

9. The method of claim 8, wherein the MAC header comprises a control field that includes the information.

10. The method of claim 8, wherein the plurality of APs are configured to coordinate beamforming transmissions.

11. The method of claim 10, wherein the information further comprises:
   a first RSSI associated with a first AP of the plurality of APs; and
   a second RSSI associated with a second AP of the plurality of APs.

12. The method of claim 10, wherein the information further comprises:
   a first SINR associated with a first AP of the plurality of APs; and
   a second SINR associated with a second AP of the plurality of APs.

* * * * *